US011746721B2

(12) United States Patent
Yanoto et al.

(10) Patent No.: US 11,746,721 B2
(45) Date of Patent: Sep. 5, 2023

(54) FUEL INJECTION CONTROL DEVICE FOR INTERNAL COMBUSTION ENGINE

(71) Applicant: DENSO CORPORATION, Kariya (JP)

(72) Inventors: Keisuke Yanoto, Kariya (JP); Takayuki Makihara, Kariya (JP); Hatsumi Takeuchi, Kariya (JP); Tomoya Takeuchi, Kariya (JP); Haruki Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/893,603

(22) Filed: Aug. 23, 2022

(65) Prior Publication Data

US 2022/0403795 A1 Dec. 22, 2022

Related U.S. Application Data

(63) Continuation of application No. PCT/JP2021/006940, filed on Feb. 24, 2021.

(30) Foreign Application Priority Data

Feb. 25, 2020 (JP) .................. 2020-029912

(51) Int. Cl.
*F02D 41/20* (2006.01)
*F02D 41/24* (2006.01)

(52) U.S. Cl.
CPC ......... *F02D 41/2467* (2013.01); *F02D 41/20* (2013.01); *F02D 41/247* (2013.01); *F02D 41/249* (2013.01); *F02D 2200/0602* (2013.01); *F02D 2200/063* (2013.01); *F02D 2200/0606* (2013.01); *F02D 2200/0614* (2013.01)

(58) Field of Classification Search
CPC .............. F02D 41/2467; F02D 41/247; F02D 2041/2055; F02D 2200/0602; F02D 2200/0606; F02D 2200/0614; F02D 2200/063
See application file for complete search history.

(56) References Cited

U.S. PATENT DOCUMENTS

| 2018/0112618 | A1 | 4/2018 | Yanoto |
| 2018/0149124 | A1 | 5/2018 | Yanoto |
| 2018/0223761 | A1* | 8/2018 | Hirchenhein ......... F02D 41/221 |
| 2019/0203687 | A1 | 7/2019 | Yanoto |
| 2019/0331050 | A1* | 10/2019 | Hirchenhein ....... F02D 41/2467 |

FOREIGN PATENT DOCUMENTS

| JP | 2016-196893 | 11/2016 |
| JP | 2019-027299 | 2/2019 |

* cited by examiner

*Primary Examiner* — Erick R Solis
(74) *Attorney, Agent, or Firm* — Nixon & Vanderhye P.C.

(57) ABSTRACT

A fuel injection control device is applied to an internal combustion engine including a fuel injection valve and causes a valve body to be in a valve open state accompanying an energization of the fuel injection valve to inject fuel. The fuel injection control device acquires a dynamic parameter. The fuel injection control device acquires an injection amount parameter. The fuel injection control device calculates, based on the dynamic parameter, a dynamic correction value. The fuel injection control device calculates, based on the injection amount parameter, an injection amount correction value. The fuel injection control device corrects a fuel injection using the dynamic correction value and the injection amount correction value.

14 Claims, 30 Drawing Sheets

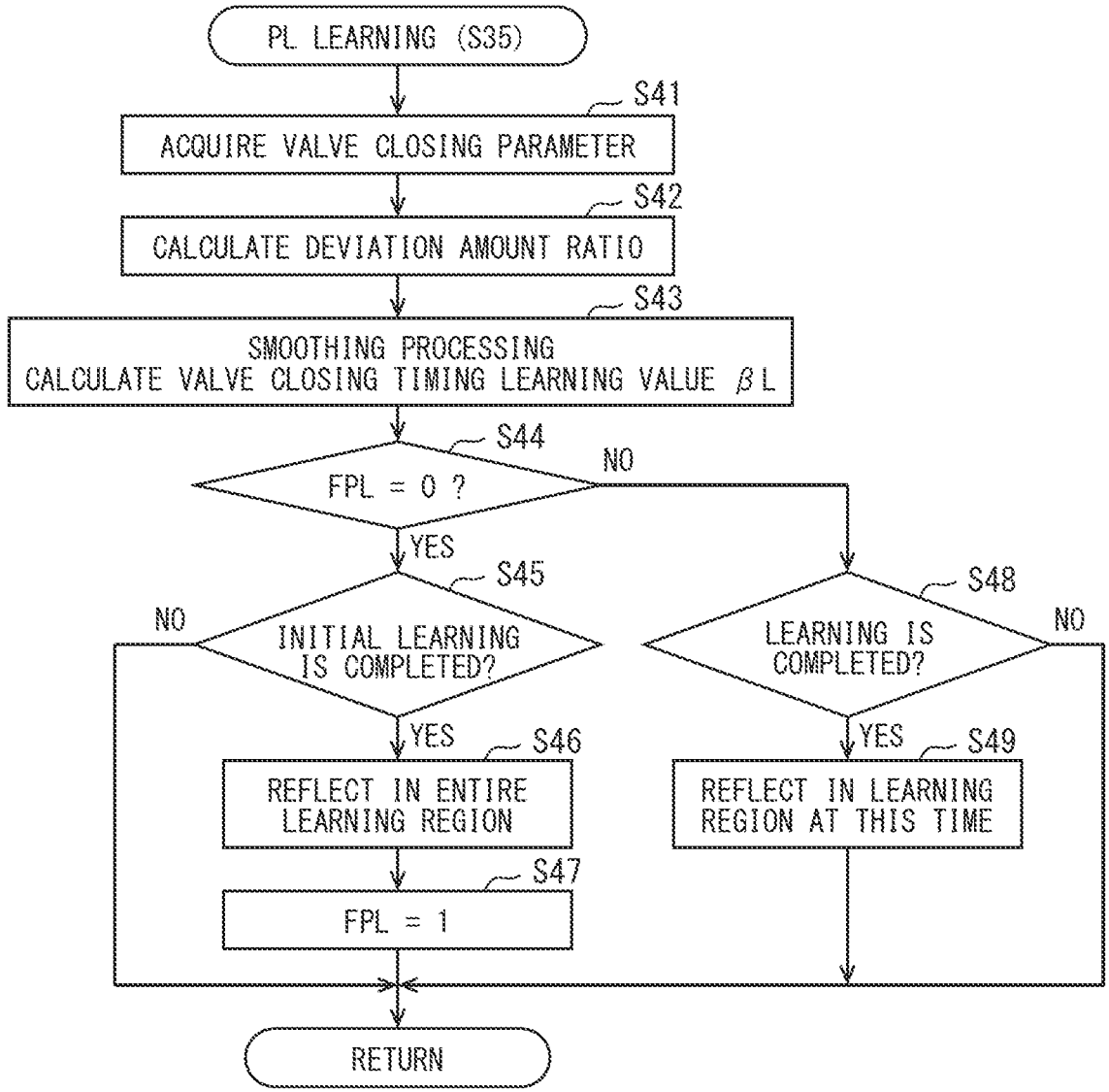

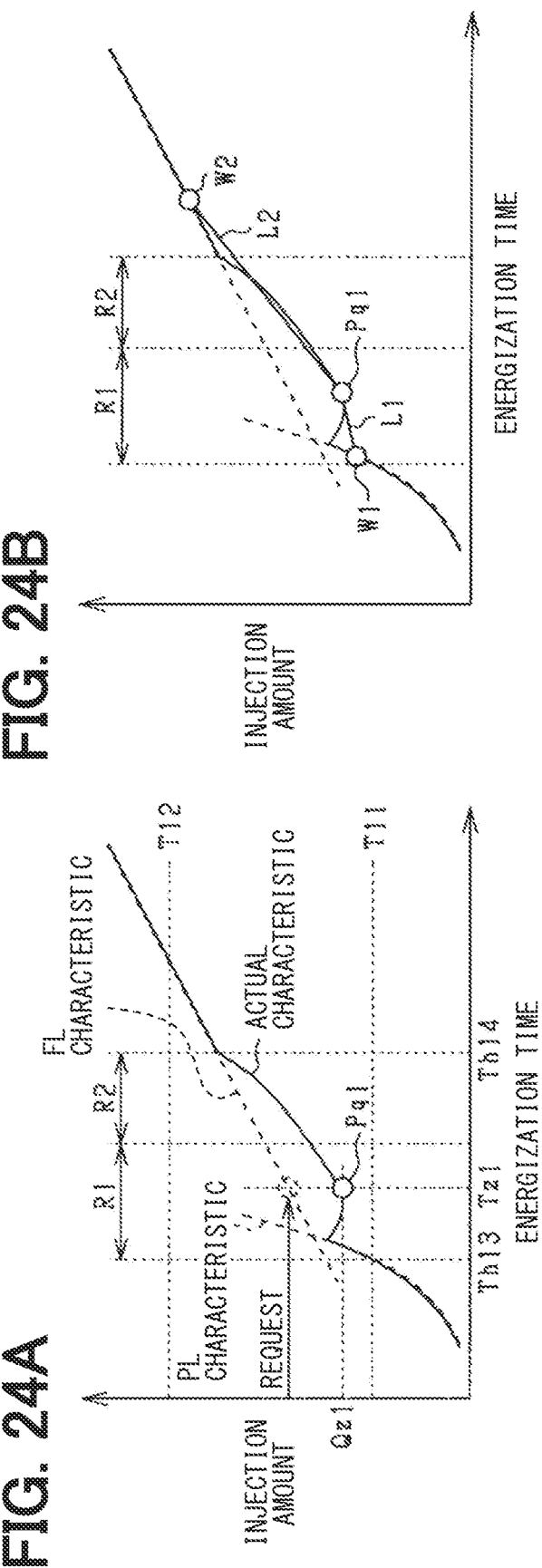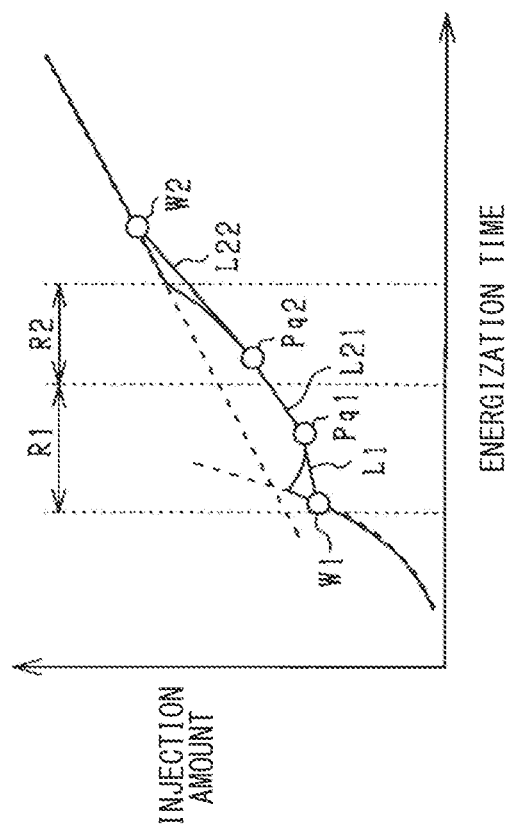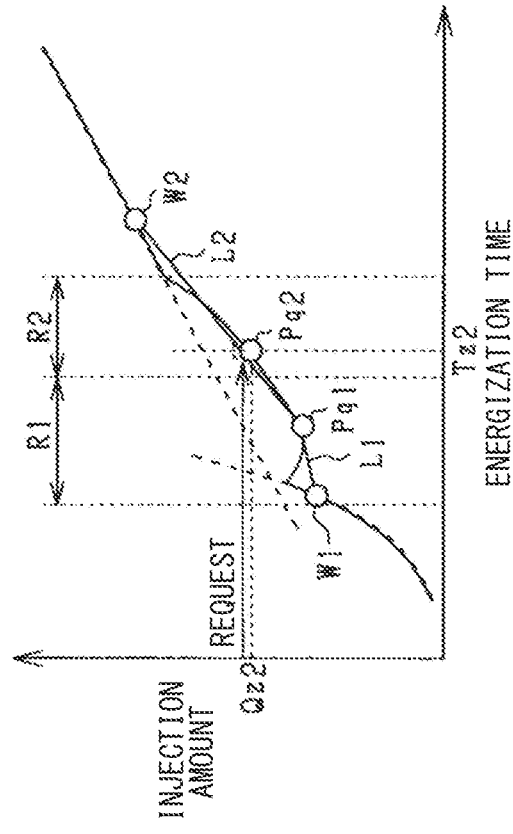

FUEL INJECTION CONTROL DEVICE FOR INTERNAL COMBUSTION ENGINE

CROSS REFERENCE TO RELATED APPLICATIONS

The present application is a continuation application of International Patent Application No. PCT/JP2021/006940 filed on Feb. 24, 2021, which designated the U.S. and claims the benefit of priority from Japanese Patent Application No. 2020-029912 filed on Feb. 25, 2020. The entire disclosures of all of the above applications are incorporated herein by reference.

TECHNICAL FIELD

The present disclosure relates to a fuel injection control device for an internal combustion engine.

BACKGROUND

When fuel is injected into a combustion chamber of an internal combustion engine by a fuel injection valve, there is a difficulty that a variation in a fuel injection amount occurs due to individual differences, aging, and the like. Accordingly, various techniques have been proposed in which occurrence of the variation in the fuel injection amount is grasped and the variation amount is corrected.

SUMMARY

The present disclosure provides a fuel injection control device that is applied to an internal combustion engine including a fuel injection valve and causes a valve body to be in a valve open state accompanying an energization of the fuel injection valve to inject fuel. The fuel injection control device acquires a dynamic parameter. The fuel injection control device acquires an injection amount parameter. The fuel injection control device calculates, based on the dynamic parameter, a dynamic correction value. The fuel injection control device calculates, based on the injection amount parameter, an injection amount correction value. The fuel injection control device corrects a fuel injection using the dynamic correction value and the injection amount correction value.

BRIEF DESCRIPTION OF DRAWINGS

The features and advantages of the present disclosure will become more apparent from the following detailed description made with reference to the accompanying drawings. In the drawings:

FIG. 17 is a flowchart illustrating partial lift learning processing;

FIG. 18 is a diagram illustrating a learning region defined by the fuel temperature and the fuel pressure;

FIGS. 24A to 24D are explanatory diagrams each illustrating a procedure of boundary region learning;

DETAILED DESCRIPTION

Figure 1:
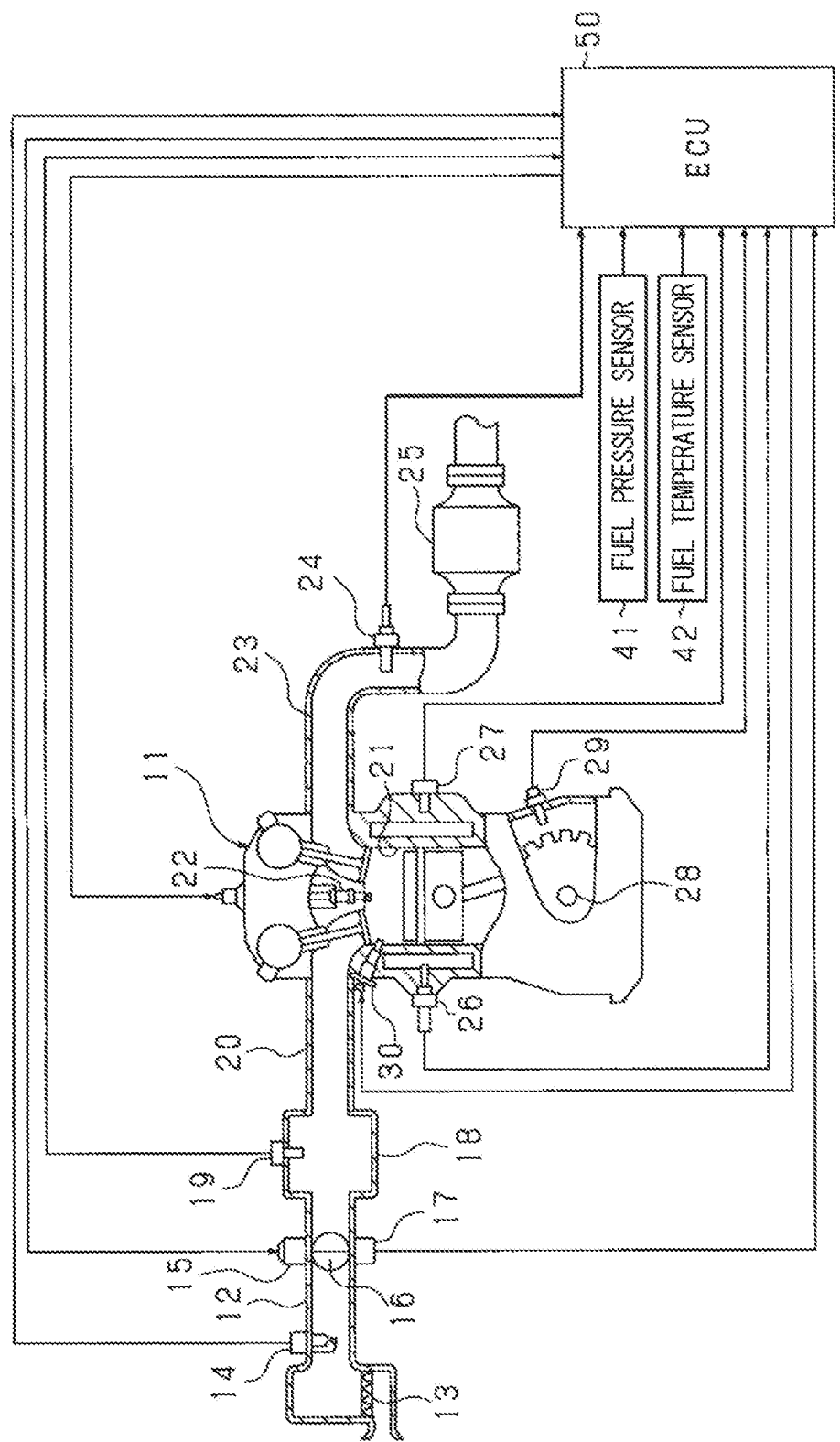
FIG. 1 is a schematic configuration diagram of an engine control system.

For example, as a technique in which occurrence of the variation in the fuel injection amount is grasped and the variation amount is corrected, a bending point is detected on a characteristic curve representing a voltage change between a ground potential side terminal of a solenoid of the fuel injection valve and a ground potential, and a timing at which a valve body comes into contact with a valve seat is detected. Thus, a deviation between an energization pulse and an actual valve behavior that causes the variation in the fuel injection amount is recognized.

There are various factors in the variation in the fuel injection amount, and it is desirable to correct the fuel injection amount according to the various factors. In this case, it is conceivable that factors of the variation in the fuel injection amount affect each other, and in order to achieve a highly accurate fuel injection, it is necessary to appropriately execute fuel injection correction while considering mutual influences of the variation factors.

Specifically, when a fuel injection is performed by the fuel injection valve in accordance with the energization pulse that is a valve opening command, an error in the fuel injection amount with respect to the energization pulse is detected as an injection amount variation, and an injection amount correction is executed in accordance with the injection amount variation. The injection amount variation can be obtained from a difference between a required injection amount and an actual injection amount. The actual injection amount can be obtained from, for example, a fuel pressure change amount before and after injection. In addition to the correction of the injection amount variation, a variation in operation of the valve body of the fuel injection valve is detected, and the injection amount correction is executed according to the valve body operation variation. Here, the injection amount variation among the above corrections occurs due to a static error such as a variation in a lift amount in a full lift state of the valve body or a variation in an injection hole diameter, and the correction thereof can be regarded as a static correction, while the valve body operation variation occurs due to a dynamic error of a valve opening speed or a valve closing timing of the valve body, or the like, and the correction thereof can be regarded as a dynamic correction.

In a case where the static correction and the dynamic correction are executed as described above, when the static correction is executed first and the dynamic correction is executed in a state where the static correction has been executed, there is a concern that the correction of the amount of the dynamic error is performed substantially doubly, and as a result, the fuel injection amount is overcorrected. That is, when the correction of the injection amount variation corresponding to the static error is executed as the static correction, the error of the fuel injection amount with respect to the energization pulse is eliminated by the static correction. However, even in a state where the injection amount variation is eliminated, the dynamic error of the valve opening speed or the valve closing timing of the valve body, or the like still remains, and by performing the dynamic correction according to the dynamic error, it is conceivable that the fuel injection amount is overcorrected. When the corrections interfere with each other in this way, hunting or the like of the correction amount occurs, and there is a disadvantage that it takes time for the fuel correction amount to converge.

The present disclosure provides a fuel injection control device for an internal combustion engine capable of appropriately executing correction of the fuel injection amount.

An exemplary embodiment of the present disclosure provides a fuel injection control device that is applied to an internal combustion engine including a fuel injection valve and causes a valve body to be in a valve open state accompanying an energization of the fuel injection valve to inject fuel. An injection amount parameter indicating an injection amount in response to an energization command signal in the fuel injection valve and a dynamic parameter indicating characteristics of a valve opening operation and a valve closing operation of the valve body accompanying a start of the energization and an end of the energization in response to the energization command signal are defined as parameters indicating an injection amount characteristic of the fuel injection valve. The fuel injection control device includes a first acquisition unit, a second acquisition unit, a first calculation unit, a second calculation unit, and a correction unit. The first acquisition unit is configured to acquire the dynamic parameter when the fuel injection valve injects the fuel. The second acquisition unit is configured to acquire the injection amount parameter when the fuel injection valve injects the fuel. The first calculation unit is configured to calculate, based on the dynamic parameter, a dynamic correction value that compensates for a deviation in an operation characteristic of the valve body. The second calculation unit is configured to calculate, based on the injection amount parameter, an injection amount correction value that compensates for a deviation in the injection amount in response to the energization command signal. The correction unit is configured to correct a fuel injection using the dynamic correction value calculated by the first calculation unit and the injection amount correction value calculated by the second calculation unit. The second calculation unit calculates the injection amount correction value on condition that the correction unit corrects the fuel injection using the dynamic correction value.

A variation in the fuel injection amount in the fuel injection valve includes a variation in which an injection amount deviation such that the actual fuel injection amount deviates with respect to the energization command signal occurs, and a variation in which an operation characteristic deviation in the valve opening operation and the valve closing operation of the valve body accompanying start of energization and end of the energization by the energization command signal, and the injection amount deviation is acquired as the injection amount parameter, and the operation characteristic deviation is acquired as the dynamic parameter. The dynamic correction value for compensating for the deviation in the operation characteristic of the valve body is calculated on the basis of the dynamic parameter, and the injection amount correction value for compensating for the deviation in the actual injection amount with respect to the energization command signal is calculated on the basis of the injection amount parameter. The implementation mode of the fuel injection is corrected using the dynamic correction value and the injection amount correction value.

In the exemplary embodiment of the present disclosure, the injection amount correction value is calculated on condition that the fuel injection correction by the dynamic correction value has been executed. That is, the processing order of the fuel injection correction for the operation characteristic deviation and the calculation of the injection amount correction value for the injection amount deviation is determined, the fuel injection correction for the operation characteristic deviation is executed first, and the injection amount correction value is calculated in a state where the correction is executed. Thus, it is possible to assign the optimum correction method according to the error factor, and it is possible to avoid inconvenience that the correction of the amount of the dynamic error is performed substantially doubly, that is, overcorrection of the fuel injection amount. Consequently, correction of the fuel injection amount can be appropriately executed.

First Embodiment

Hereinafter, a first embodiment will be described with reference to the drawings. The present embodiment is embodied as a control system that controls a cylinder injection type multi-cylinder gasoline engine for a vehicle. First, a schematic configuration of an engine control system will be described with reference to FIG. 1. Among the following embodiments, the same or equivalent parts are denoted by the same reference numerals in the drawings, and their descriptions will be referred to for the parts of the same reference numerals.

On an engine 11, an air cleaner 13 is provided most upstream of an intake pipe 12, and an air flow meter 14 that detects an intake air amount is provided downstream of the air cleaner 13. A throttle valve 16 whose opening is adjusted by a motor 15 and a throttle opening sensor 17 that detects the opening (throttle opening) of the throttle valve 16 are provided downstream of the air flow meter 14.

A surge tank 18 is provided downstream of the throttle valve 16. The surge tank 18 is provided with an intake pipe pressure sensor 19 that detects an intake pipe pressure. An intake manifold 20 that introduces air into each cylinder 21 of the engine 11 is connected to the surge tank 18. An electromagnetic fuel injection valves 30 that directly injects fuel into each cylinder is attached to each cylinder 21 of the engine 11. In a cylinder head of the engine 11, an ignition plug 22 is attached to each cylinder 21, and an air-fuel mixture in the cylinder is ignited by spark discharge of the ignition plug 22 of each cylinder 21.

An exhaust pipe 23 of the engine 11 is provided with an exhaust sensor 24 that detects an air-fuel ratio, rich or lean, or the like of exhaust gas. The exhaust sensor 24 is an air-fuel ratio sensor, an oxygen sensor, or the like. A catalyst 25 such as a three-way catalyst that purifies exhaust is provided downstream of the exhaust sensor 24.

A cooling water temperature sensor 26 that detects a cooling water temperature and a knock sensor 27 that detects knocking are attached to a cylinder block of the engine 11. A crank angle sensor 29 that outputs a pulse signal every time a crankshaft 28 rotates by a predetermined crank angle is attached to an outer peripheral side of the crankshaft 28. A crank angle and an engine rotation speed are detected on the basis of a crank angle signal of the crank angle sensor 29. A fuel supply system (for example, a delivery pipe) that supplies fuel to the fuel injection valve 30 is provided with a fuel pressure sensor 41 that detects the pressure (fuel pressure) of the fuel supplied to the fuel injection valve 30 and a fuel temperature sensor 42 that detects the temperature (fuel temperature) of the fuel. Although not illustrated, in the fuel supply system, the fuel increased in pressure by a fuel pump is supplied to the delivery pipe.

An ECU 50 is an electronic control unit mainly constituted by a microcomputer, and performs various controls of the engine 11 on the basis of detection signals of various sensors using a control program stored in a built-in ROM (storage medium). The ECU 50 corresponds to a fuel injection control device. The ECU 50 includes, as functional blocks, a first acquisition unit, a second acquisition unit, a first calculation unit, a second calculation unit, a correction unit, a partial lift injection permission unit, a setting unit, an injection division unit, and a third calculation unit. The ECU 50 calculates a required injection amount according to an engine operating state, and controls drive of the fuel injection valve 30 on the basis of the required injection amount. In the fuel injection valve 30 of each cylinder, the fuel injection is executed on the basis of the required injection amount in at least one of an intake stroke or a compression stroke in one combustion cycle for each cylinder. The ECU 50 performs ignition timing control for controlling ignition timing of the ignition plug 22 and fuel pressure control by adjusting the fuel discharge amount of the fuel pump.

As the fuel injection control, either a full lift injection in which a valve body of the fuel injection valve 30 reaches a full lift position and then a desired amount of fuel is injected in a full lift state or a partial lift injection in which movement of the valve body to a valve opening side is finished in a partial lift state before the valve body of the fuel injection valve 30 reaches the full lift position and then a desired minute amount of fuel is injected in this state is executed. The partial lift injection is executed, for example, as the fuel injection (for example, compression stroke injection) performed after main injection (for example, intake stroke injection) at the time of executing the divided injection.

Figure 2A:
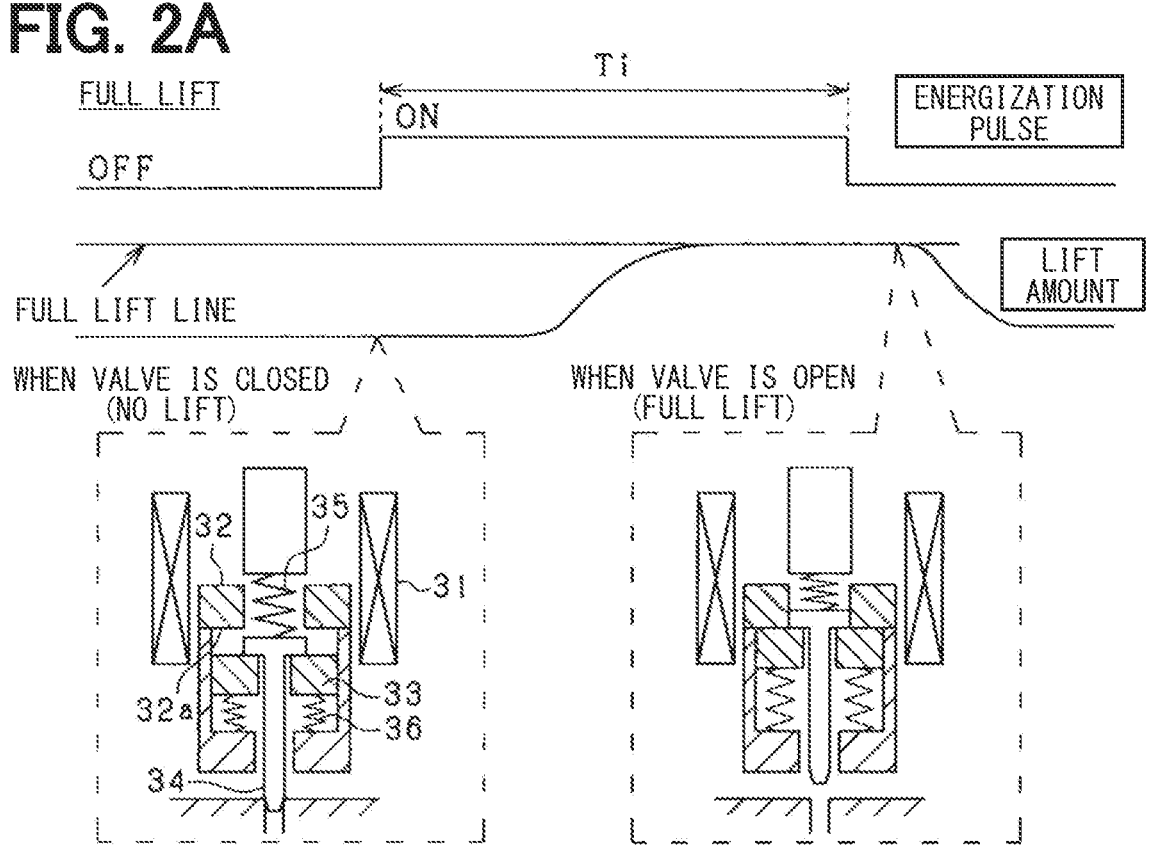
FIG. 2A is a diagram illustrating a full lift injection of a fuel injection valve.

The full lift injection and the partial lift injection will be described with reference to FIGS. 2A and 2B. FIG. 2A illustrates an operation at the time of the full lift injection, and FIG. 2B illustrates an operation at the time of the partial lift injection.

Figure 2B:
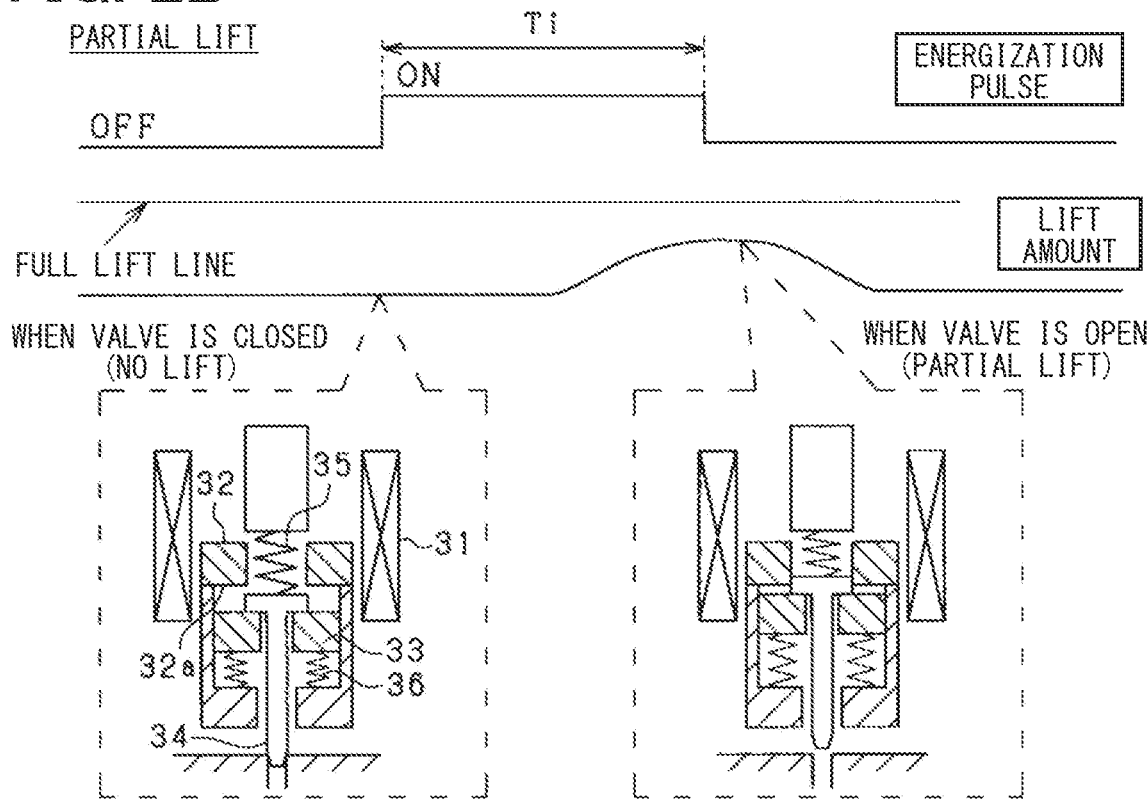
FIG. 2B is a diagram illustrating a partial lift injection of the fuel injection valve.

As illustrated in FIGS. 2A and 2B, the fuel injection valve 30 includes a coil 31 as an electromagnetic part that generates an electromagnetic force by energization, a fixed core 32 formed by a magnetic material, a movable core 33 formed by a magnetic material and attracted toward the fixed core 32 side by the electromagnetic force, a needle-shaped valve body 34 integrally driven with the movable core 33, a first spring 35 that biases the valve body 34 toward a valve closing side, and a second spring 36 that biases the movable core 33 toward a valve anti-closing side. Accompanying energization of the coil 31, the valve body 34 moves away from the valve seat to the valve opening side to thereby bring the fuel injection valve 30 to a valve open state, and the fuel injection is performed. A biasing force of the second spring 36 is set to be smaller than a biasing force of the first spring 35.

In FIGS. 2A and 2B, energization times Ti, which are energization pulse widths, are different. As illustrated in FIG. 2A, when the valve body lift amount becomes a full lift amount, the energization time Ti becomes relatively long. In this case, the valve body 34 reaches the full lift position where the movable core 33 abuts a stopper 32a on the fixed core 32 side. On the other hand, as illustrated in FIG. 2B, when the valve body lift amount is the partial lift amount, the energization time Ti becomes relatively short. In this case, the valve body 34 is in a state before the movable core 33 abuts the stopper 32a, and is in a partial lift state in which it does not reach the full lift position. When the energization of the coil 31 is stopped accompanying lowering of an energization pulse, the movable core 33 and the valve body 34 return to a valve closing position to thereby bring the fuel injection valve 30 to a valve closed state, and the fuel injection is stopped. Since the movable core 33 and the valve body 34 are configured separately, when the valve body 34 reaches a closed position, the valve body 34 is held at the closed position, whereas the movable core 33 alone moves farther to a distal end side.

Figure 3:
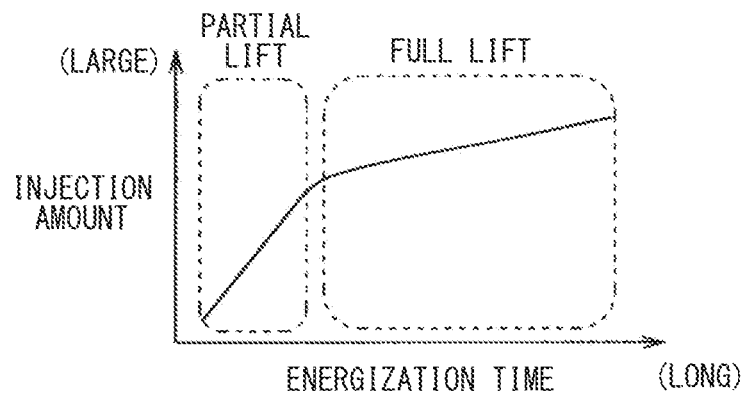
FIG. 3 is a view illustrating a partial lift region and a full lift region.

FIG. 3 is a diagram illustrating a partial lift region in which the partial lift injection is executed and a full lift region in which the full lift injection is executed. As illustrated in FIG. 3, in both the partial lift region and the full lift region, the fuel injection amount tends to increase as the energization time (that is, an energization pulse width) is longer.

Figure 4:
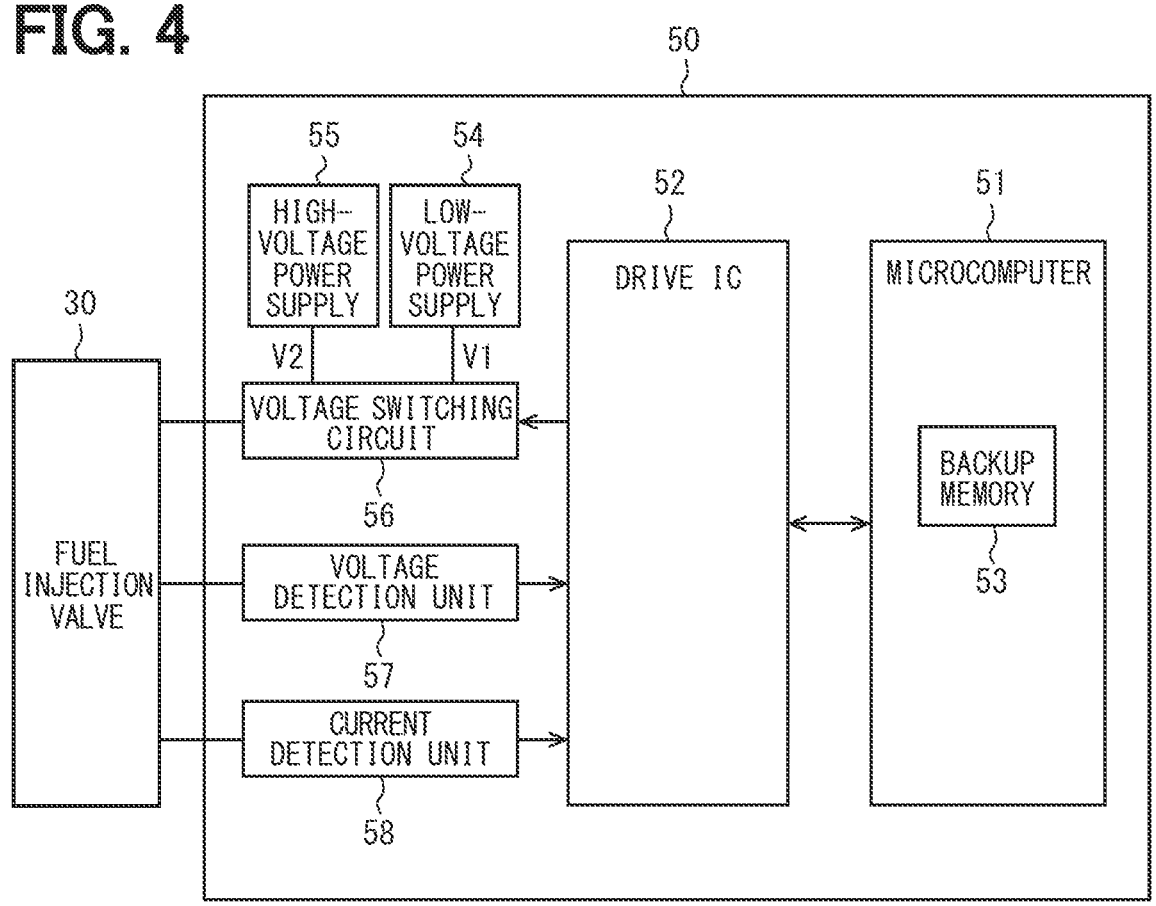
FIG. 4 is a block diagram illustrating a configuration of an ECU.

FIG. 4 illustrates a configuration related to the fuel injection in the ECU 50. The ECU 50 includes an engine control microcomputer 51 that executes fuel injection control, and a drive IC 52 for driving the fuel injection valve. The microcomputer 51 calculates the required injection amount on the basis of the engine operating state such as an engine rotation speed and an engine load, sets an energization pulse that is an energization command signal on the basis of the calculated required injection amount, and outputs the energization pulse to the drive IC 52. The drive IC 52 drives the fuel injection valve 30 by the energization pulse input from the microcomputer 51, and injects the fuel corresponding to the required injection amount from the fuel injection valve 30.

The microcomputer 51 has a backup memory 53 including a backup RAM, an EEPROM, and the like. The backup memory 53 is a memory that retains stored contents even after the power of the vehicle is turned off (after an ignition switch is turned off), and various learning values and diagnostic data are stored and retained in the backup memory 53.

The ECU 50 includes a low-voltage power supply 54, a high-voltage power supply 55, and a voltage switching circuit 56. A drive voltage of the fuel injection valve 30 is switched between a low voltage V1 supplied from the low-voltage power supply 54 and a high voltage V2 supplied from the high-voltage power supply 55 by the voltage switching circuit 56. For example, the low-voltage power supply 54 is a battery rated at 12 V, and the high-voltage power supply 55 is a booster circuit that boosts a battery voltage. The ECU 50 includes a voltage detection unit 57 that detects a negative terminal voltage Vm of the fuel injection valve 30 and a current detection unit 58 that detects a drive current flowing through the electromagnetic part (coil).

Figure 5:
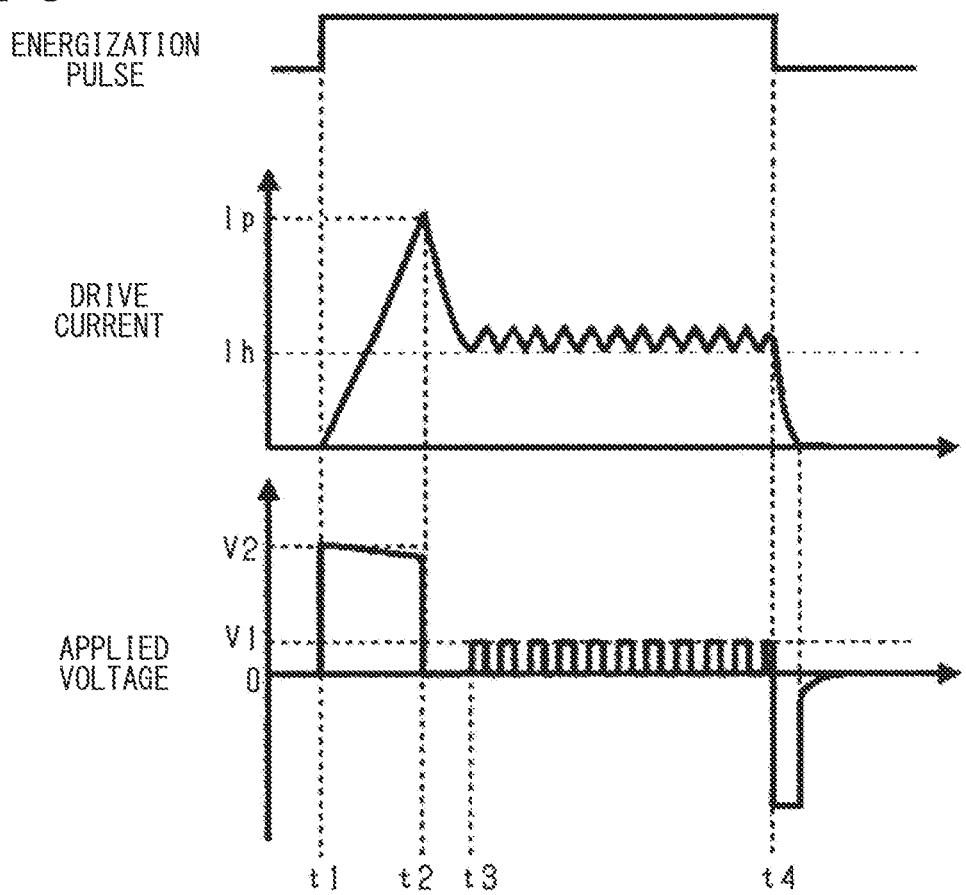
FIG. 5 is a time chart illustrating a transition of a drive current and an applied voltage at the time of driving the fuel injection valve.

Here, a transition of a drive current and an applied voltage at the time of driving the fuel injection valve 30 will be described using a time chart of FIG. 5. FIG. 5 illustrates a current pattern in a case where the full lift injection is performed.

In FIG. 5, at timing t1, the high voltage V2 is applied to the fuel injection valve 30 accompanying a rise of the energization pulse. Thereafter, when the drive current reaches a predetermined peak current Ip determined in advance at timing t2, the application of the high voltage V2 is stopped. At this time, the valve body lift is started at a timing when the drive current reaches the peak current Ip or at a timing before or after the timing, and the fuel injection is started accompanying the valve body lift. Determination as to whether or not the drive current has reached the peak current Ip is executed on the basis of a detected current of the current detection unit 58. That is, in a boosting period (t1 to t2), it is determined whether or not the detected current becomes equal to or more than Ip, and when the detected current the peak current Ip is satisfied, the voltage switching circuit 56 switches the applied voltage (stops applying V2). In the boosting period (t1 to t2), energy corresponding to a current integrated value that is an integrated value of the drive current is applied to the fuel injection valve 30 as valve opening energy.

At timing t3, the low voltage V1 that is a battery voltage is intermittently applied to the fuel injection valve 30. Thus, the drive current is maintained near a hold current Ih. In this case, after the valve body 34 reaches the full lift position, the fuel injection is continued by maintaining the full lift state. Thereafter, when the energization pulse is lowered at timing t4, the voltage application to the fuel injection valve 30 is stopped, and the drive current becomes zero. At timing t4, the applied voltage temporarily increases to the negative side by induced electromotive force that occurs accompanying stop of the energization. The valve body lift is ended accompanying stop of the coil energization of the fuel injection valve 30, and the fuel injection is stopped accordingly.

Figure 6:
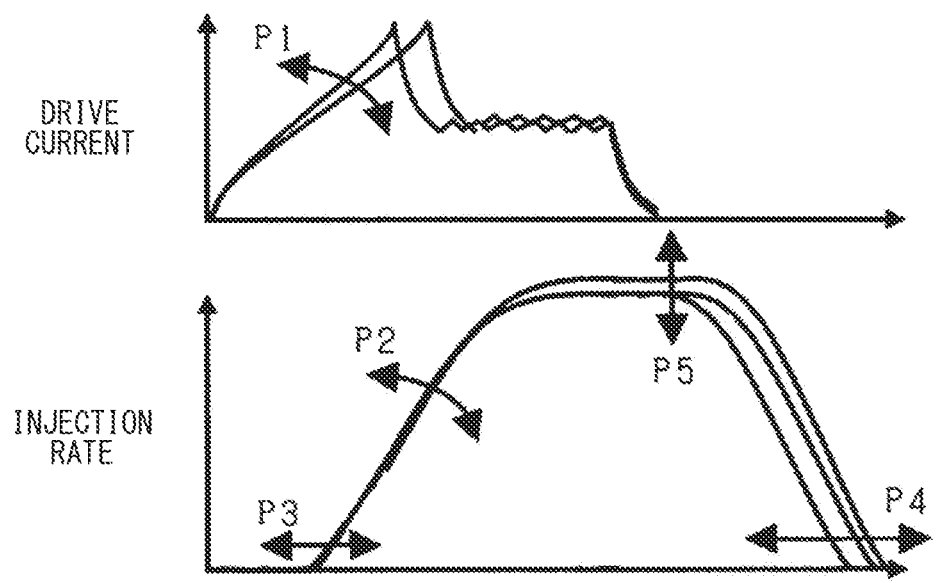
FIG. 6 is a time chart illustrating factors of variations in a fuel injection amount.

Incidentally, when the fuel injection is performed by the fuel injection valve 30, there are various factors for variations in the fuel injection amount, and specifically, each factor illustrated in FIG. 6 is conceivable. FIG. 6 illustrates a transition of the drive current and a transition of an injection rate when the fuel injection valve 30 is driven. The transition of the injection rate substantially matches a transition of the lift amount of the valve body 34.

As illustrated in FIG. 6, the factors of the injection amount variation include an operation variation (variation in valve opening behavior) generated at the time of opening the valve body 34 accompanying start of energization to the fuel injection valve 30 and an operation variation (variation in valve closing behavior) generated at the time of closing the valve body 34 accompanying end of the energization, and these operation variations can be all regarded as error factors in the dynamic characteristics. Among these, an error factor at the time of valve opening is mainly due to a deviation in valve opening energy input to the fuel injection valve 30 at the time of valve opening, and specifically, a slope of a rise of the drive current, that is, a deviation in a current rise rate (P1 in FIG. 6), a deviation in a valve opening speed of the valve body 34 (P2 in FIG. 6), and a deviation in a valve opening timing (P3 in FIG. 6) occur. An error factor at the time of valve closing is mainly due to an individual difference of the fuel injection valve 30 or a change over time, and a deviation in valve closing timing (P4 in FIG. 6) occurs due to the error factor.

The variation factor of the fuel injection amount includes an error factor in a static characteristic in addition to the above dynamic factor. The error factor of the static characteristic is mainly due to a deviation in the fuel injection amount per unit time in a state where the valve body 34 is opened, that is, a deviation in the injection rate in the full lift state (P5 in FIG. 6), and more specifically, a deviation in the full lift position (lift amount in the full lift state) of the fuel injection valve 30 and the injection hole diameter. This error factor of the static characteristic causes a static error such as a deviation in the actual fuel injection amount from the required injection amount.

The ECU 50 acquires a valve opening parameter indicating valve opening energy input for opening the valve body 34 after start of energization to the fuel injection valve 30 as a dynamic parameter indicating a dynamic characteristic at the time of valve opening, and acquires a valve closing parameter indicating a valve closing behavior of the valve body 34 after end of energization to the fuel injection valve 30 as a dynamic parameter indicating a dynamic characteristic at the time of valve closing. The ECU 50 executes valve opening energy correction for compensating for a deviation in a valve opening characteristic on the basis of the valve opening parameter, and executes valve closing timing correction for compensating for a deviation in a valve closing characteristic on the basis of the valve closing parameter.

The ECU 50 acquires an injection amount characteristic indicating the fuel injection amount per unit time in a state where the valve body 34 is opened as a static injection amount parameter, and executes static injection amount correction for compensating a deviation in the static injection amount characteristic on the basis of the injection amount parameter.

In short, the injection amount variation in the fuel injection valve 30 includes a variation in which an injection amount deviation such that the actual fuel injection amount deviates with respect to the energization pulse (energization command signal) occurs, and a variation in which an operation characteristic deviation in a valve opening operation and a valve closing operation of the valve body 34 accompanying start of energization and end of the energization by the energization pulse occurs. The ECU 50 acquires the injection amount deviation as the injection amount parameter, and acquires the operation characteristic deviation as the dynamic parameter. A dynamic correction value for compensating for a deviation in the operation characteristic of the valve body 34 is calculated on the basis of the dynamic parameter, an injection amount correction value for compensating for a deviation in the actual injection amount with respect to the energization pulse is calculated on the basis of the injection amount parameter, and an implementation mode of the fuel injection is corrected using the dynamic correction value and the injection amount correction value. Each of these corrections will be described in detail below.

(Valve Opening Energy Correction)

The ECU 50 calculates, as a "valve opening parameter", a current change time ΔT required for a predetermined current change in a period including a current rise time accompanying application of a high voltage to the fuel injection valve 30. A valve opening energy correction value a for correcting the valve opening energy is calculated on the basis of the current change time ΔT.

Figure 7:
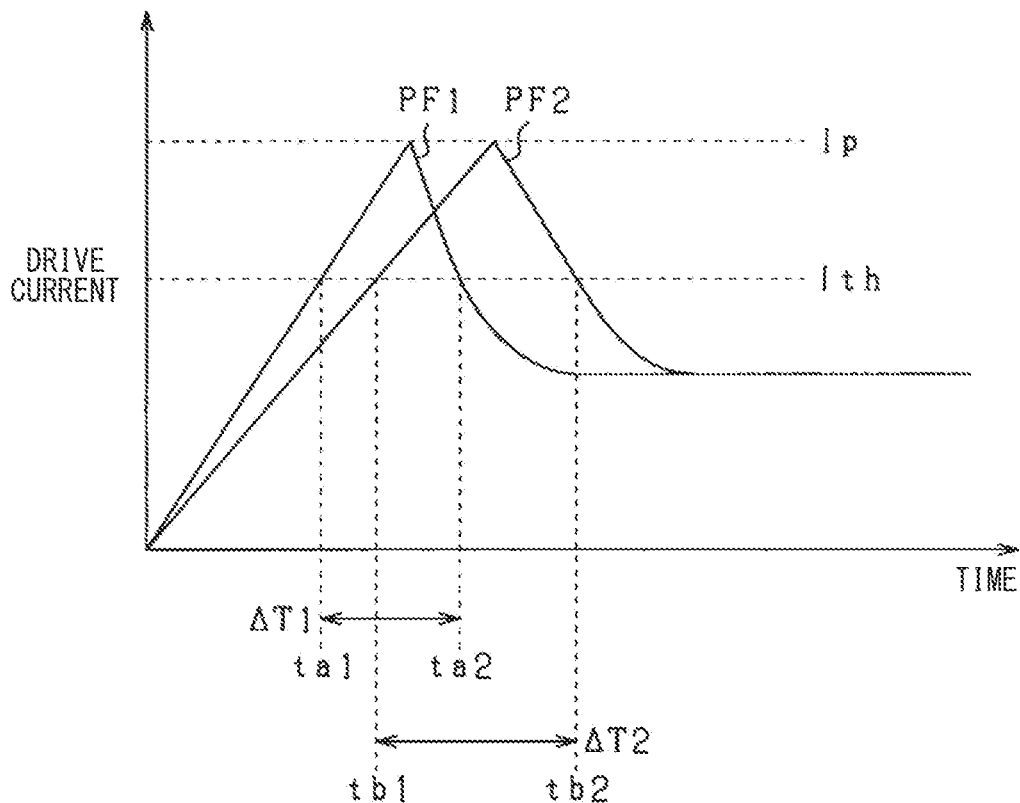
FIG. 7 is a time chart illustrating a transition of a drive current at beginning of start of energization.

FIG. 7 illustrates a transition of the drive current at the beginning of start of energization, and two current profiles PF1 and PF2 illustrated have different slopes of the rise of the drive current. The drive current increases accompanying application of the high voltage, and then reaches the peak current Ip, and turns to drop. In this case, in the current profile PF1, when the drive current rises and falls, the drive current crosses a predetermined current threshold Ith at timings ta1 and ta2, and the time between ta1 and ta2 is a current change time ΔT1. In the current profile PF2, when the drive current rises and falls, the drive current crosses the predetermined current threshold Ith at timings tb1 and tb2, and the time between tb1 and tb2 is a current change time ΔT2. The current threshold Ith may be different between the current rise time and a current drop time.

The current change times ΔT1 and ΔT2 are ΔT1 # ΔT2, and such a variation in the current change time ΔT occurs due to a deviation in valve opening energy. Accordingly, in order to eliminate the deviation in valve opening energy, the valve opening energy correction value a is calculated on the basis of the current change time ΔT. At this time, a reference profile conforming to a reference characteristic is determined in advance as a current profile after the start of energization, and the valve opening energy correction value a is calculated by predetermined feedback calculation based on a deviation between a current change time ΔTref of the reference profile and the current change time ΔT of the actual current profile.

The valve opening energy correction value a is preferably calculated as a voltage correction value for correcting the high voltage V2 applied to the fuel injection valve 30. At this time, the high voltage V2 is corrected by adjusting a boosting width in the boosting circuit of the high-voltage power supply 55.

By such valve opening energy correction, the deviation in the valve opening energy after the start of energization is compensated, and the valve opening characteristic of the valve body 34, such as a slope of rise of the drive current, the valve opening speed of the valve body 34, and the valve opening timing can be matched with a desired valve opening characteristic.

The valve opening parameter is only required to be one obtained while reflecting the valve opening energy, and is not limited to the current change time ΔT described above. For example, at the current rise time from the start of energization, a time required for the drive current to reach the current threshold Ith or a time required for the drive current to reach the peak current Ip may be calculated as the current change time ΔT. Alternatively, a time required for the drive current to reach the current threshold Ith from the peak current Ip may be calculated as the current change time ΔT. Further, the configuration may be such that a change rate of the drive current detected by the current detection unit 58 or a value of the drive current at a timing when a predetermined time has elapsed from the start of energization is calculated as the valve opening parameter in a rising period of the drive current.

In the fuel injection valve 30, since the valve body 34 is held in a valve closed state by the pressure (fuel pressure) of the fuel supplied from the delivery pipe at the time of valve closing, if the fuel pressure is large, a force that hinders the valve opening operation of the valve body 34 increases. That is, when the fuel pressure is large, it is conceivable that the valve opening energy for causing the valve body 34 to perform the valve opening operation as desired is insufficient. Accordingly, the peak current Ip is preferably set variably according to the fuel pressure. That is, the ECU 50 sets the peak current Ip variably on the basis of the fuel pressure using, for example, the relationship of FIG. 8. The relationship between the fuel pressure and the peak current Ip may be determined in stages, and the peak current Ip is only required to be determined in two or more stages.

Figure 9:
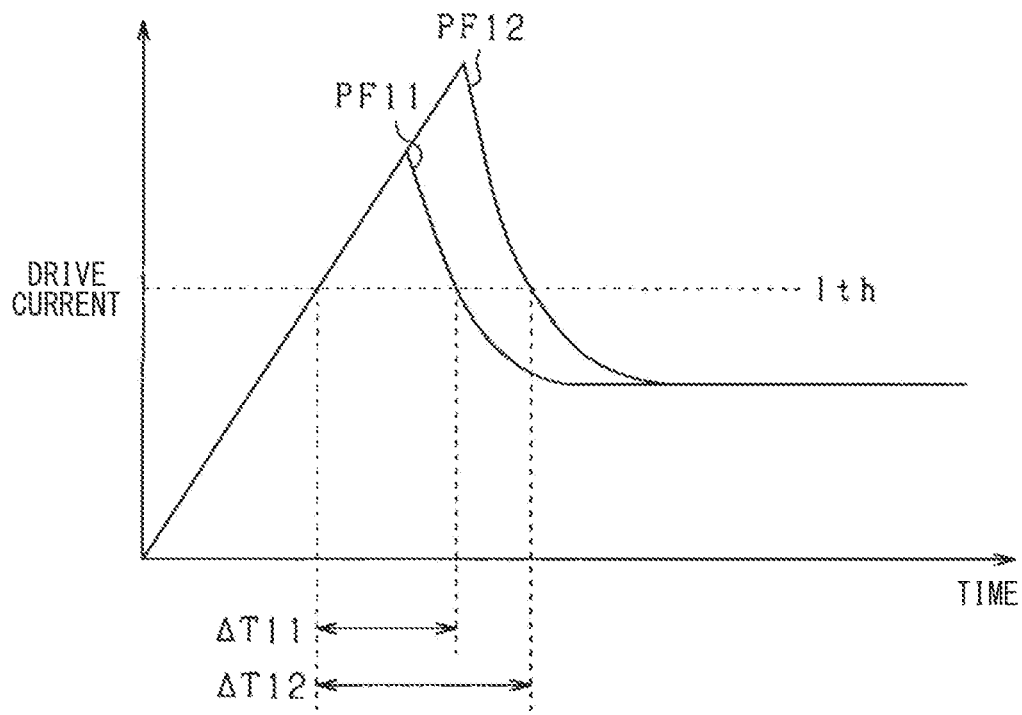
FIG. 9 is a time chart illustrating a transition of the drive current at the beginning of start of energization.

FIG. 9 illustrates a transition of the drive current at the beginning of start of energization, and two current profiles PF11 and PF12 illustrated have different peak currents Ip. The current profiles PF11 and PF12 are current profiles when the fuel pressures are different from each other, and when the fuel pressure is large, the peak current Ip is increased similarly to the current profile PF12. In this case, in each of the current profiles PF11 and PF12, current change times $\Delta T11$ and $\Delta T12$ are calculated as illustrated in the drawing. As described above, the valve opening energy correction value a is calculated on the basis of the current change times $\Delta T11$ and $\Delta T12$, and the high voltage V2 is corrected using the valve opening energy correction value a. Thus, the deviation in the valve opening energy after the start of energization is compensated, and the desired valve opening characteristic can be achieved.

The current threshold Ith may be variably set according to the peak current Ip or the fuel pressure. In this case, when the peak current Ip increases, the current threshold Ith is preferably increased accordingly.

(Valve Closing Timing Correction)

In the present embodiment, a valve closing timing after the end of energization is acquired as the "valve closing parameter", and the ECU 50 calculates a voltage inflection timing Tinf at which a voltage inflection point of the negative terminal voltage Vm of the fuel injection valve 30 occurs after the end of energization as the valve closing timing. A valve closing timing correction value β for correcting the valve closing timing is calculated on the basis of the voltage inflection timing Tinf. The voltage inflection timing Tinf is preferably, for example, time data from when the energization pulse is turned on. The valve closing timing correction value β corresponds to a valve closing behavior correction value for correcting the valve closing behavior of the valve body 34.

Figure 10:
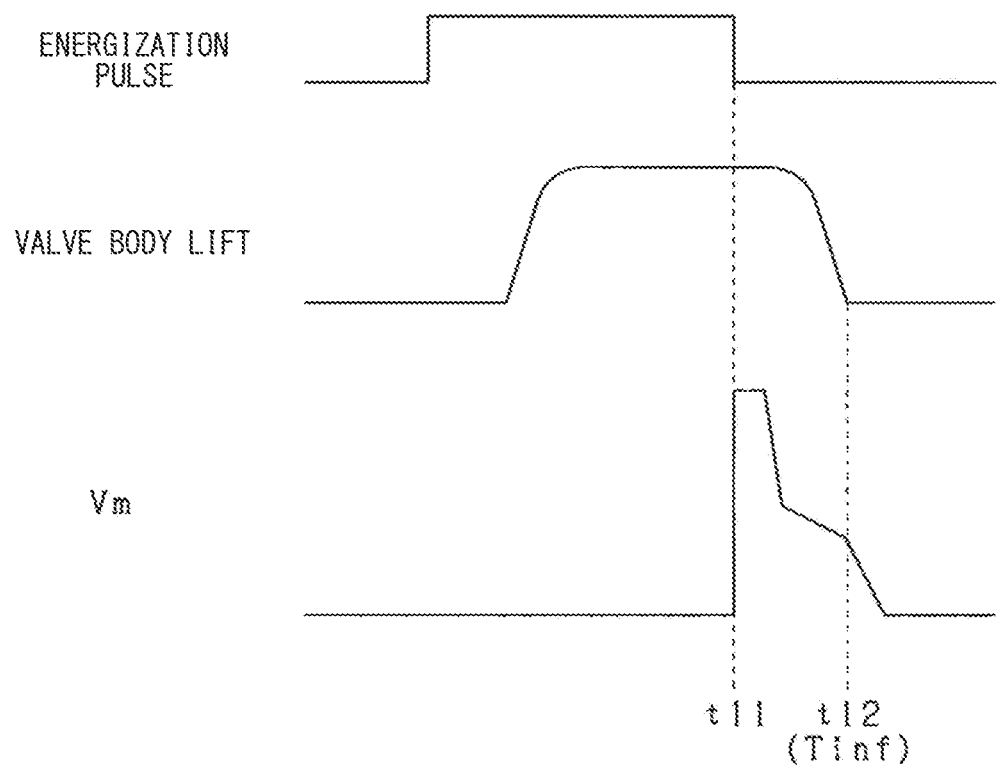
FIG. 10 is a time chart illustrating a valve body lift behavior and a voltage behavior with respect to an energization pulse.

A method of detecting the valve closing timing of the valve body 34 is already known and thus will be briefly described here with reference to FIG. 10. In the fuel injection valve 30, the negative terminal voltage Vm is changed by the induced electromotive force at timing t11 when the energization pulse is turned off. Thereafter, at timing t12 when the valve body 34 reaches the valve closing position, the negative terminal voltage Vm changes due to a speed change of the valve body 34, and the voltage inflection point occurs. In this case, the voltage detection unit 57 observes the change in the negative terminal voltage Vm, to thereby obtain the voltage inflection timing Tinf as the valve closing timing of the fuel injection valve 30.

The valve closing timing correction value β is preferably calculated as a pulse correction value for correcting the energization pulse width that is the energization time Ti. The valve closing timing correction of the fuel injection valve 30 is performed by correcting the energization time Ti with the valve closing timing correction value β (pulse correction value). Thus, the deviation in the valve closing timing in the fuel injection valve 30 is compensated, and the valve closing characteristic of the valve body 34 can be matched with a desired valve closing characteristic.

The configuration may be such that a coil energizing current is used instead of the negative terminal voltage Vm, and the valve closing timing is detected on the basis of the behavior of the energization current. That is, when the negative terminal voltage Vm changes due to the induced electromotive force after the energization pulse is turned off, the coil energizing current changes accompanying the change in the negative terminal voltage Vm. Thus, the valve closing timing of the fuel injection valve 30 can be detected by observing the change in the drive current by the current detection unit 58. The valve closing timing of the fuel injection valve 30 can also be obtained by a position sensor that detects the valve body position.

The valve opening energy correction value a and the valve closing timing correction value β correspond to a "dynamic correction value" for compensating for a deviation in operation characteristics.

(Static Injection Amount Correction)

The ECU 50 calculates an actual injection amount actually injected from the fuel injection valve 30 as an "injection amount parameter" indicating the injection amount characteristic of the fuel injection valve 30. An injection amount correction value γ for correcting the required injection amount is calculated on the basis of the actual injection amount. A deviation amount of the actual injection amount with respect to the required injection amount can also be calculated as the injection amount parameter. By correcting the required injection amount with the injection amount correction value γ, the injection amount correction as the static correction is performed. Thus, the deviation in the actual injection amount with respect to the required injection amount is compensated, and the static injection amount characteristic of the fuel injection valve 30 can be matched with the desired injection amount characteristic.

The actual injection amount can be estimated on the basis of, for example, a pressure change of the fuel supplied to the fuel injection valve 30. Specifically, the ECU 50 calculates a fuel pressure change amount that occurs accompanying the fuel injection for each cylinder from the detected fuel pressure detected by the fuel pressure sensor 41, and estimates an actual injection amount on the basis of the fuel pressure change amount. In this case, the actual injection amount can be estimated on the basis of the change rate of the detected fuel pressure in addition to or instead of the change amount of the detected fuel pressure detected by the fuel pressure sensor 41. In a normal engine operating state, the fuel pressure of the fuel supply system repeats a pressure decrease accompanying the fuel injection and a pressure increase accompanying the pressure-feed of fuel from the fuel pump. Therefore, in order to accurately grasp the pressure decrease accompanying the fuel injection, the actual injection amount is preferably estimated on the basis of the detected fuel pressure of the fuel pressure sensor 41 in a state where the pressure-feed of fuel from the fuel pump is temporarily stopped. In addition, it is also possible to estimate the actual injection amount on the basis of an air-fuel ratio change that occurs accompanying the fuel injection (combustion) for each cylinder.

In the present embodiment, in particular, the valve closing timing correction value β and the injection amount correction value γ are stored in the backup memory 53 as learning values for each cylinder (that is, for each fuel injection valve 30), and these correction values β and γ are stored and held even after the power supply of the vehicle is turned off. In the following description, the valve closing timing correction value β held as the learning value will be referred to as a "valve closing timing learning value βL", and the injection amount correction value γ held as the learning value will be referred to as an "injection amount learning value γL". The processing of calculating the valve closing timing learning value βL will be referred to as "valve closing learning processing", and the processing of calculating the injection amount learning value γL will be referred to as "static learning processing". These learning values βL and γL are appropriately updated for each trip accompanying power-on of the vehicle.

Hereinafter, fuel injection learning and fuel injection correction executed by the microcomputer 51 of the ECU 50 will be described in detail with reference to a flowchart. In the present embodiment, the fuel injection learning and the fuel injection correction are executed for each cylinder. First, learning processing will be described.

(Learning Main Routine)

Figure 11:
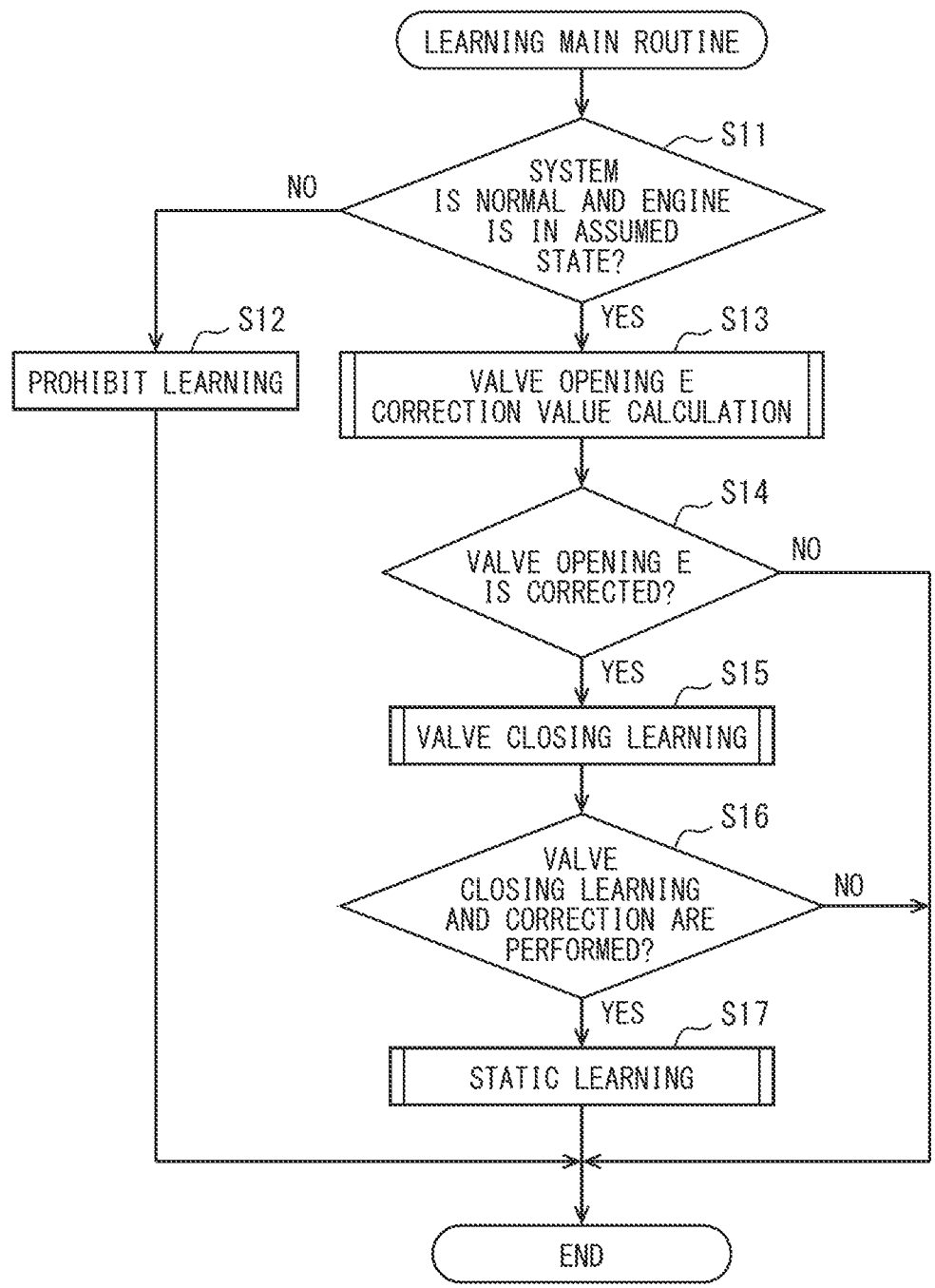
FIG. 11 is a flowchart illustrating a learning main routine.

FIG. 11 is a flowchart illustrating a learning main routine for executing the fuel injection learning of the fuel injection valve 30, and this routine is executed by the microcomputer 51 for each fuel injection of each cylinder. In this routine, the microcomputer 51 appropriately calculates the valve opening energy correction value a, the valve closing timing learning value βL, and the injection amount learning value γL for each cylinder.

In FIG. 11, in step S11, as a learning execution condition, it is determined whether or not this fuel injection system is normal and the engine operating state is in an assumed state determined in advance. Specifically, it is assumed that the fuel injection system is normal when no abnormality occurs in this system. The engine operating state is considered to be in the assumed state when all of the following are satisfied: the engine rotation speed is within a predetermined range (for example, equal to or less than a predetermined rotation speed), an engine water temperature is within a predetermined range, the fuel pressure is within a predetermined range, the battery voltage is within a predetermined range, the engine is not starting, the elapsed time after starting is equal to or longer than a predetermined time, and the engine is not during fuel cut. The condition for determining the engine operating state may be other than the above, and the engine operating state may be considered to be in the assumed state when a part of each of the above conditions is satisfied. Other parameters with which the engine operating state can be grasped, such as the intake air pressure, the EGR rate, and the in-cylinder pressure, may be used as the determination conditions, or substitutable parameters (oil temperature and the like) correlated with each other may be used as the determination conditions.

In step S11, using the residual magnetic flux from the time of the previous fuel injection as a parameter, the execution condition may be satisfied when the residual magnetic flux is equal to or less than a predetermined value. Using an elapsed time from the time of the previous fuel injection as a parameter, the execution condition may be satisfied when the elapsed time is equal to or more than a predetermined value.

When step S11 is negative, the processing proceeds to step S12, or if step S11 is affirmative, the processing proceeds to step S13. In step S12, the calculation of the correction value and the learning value is prohibited.

Figure 12:
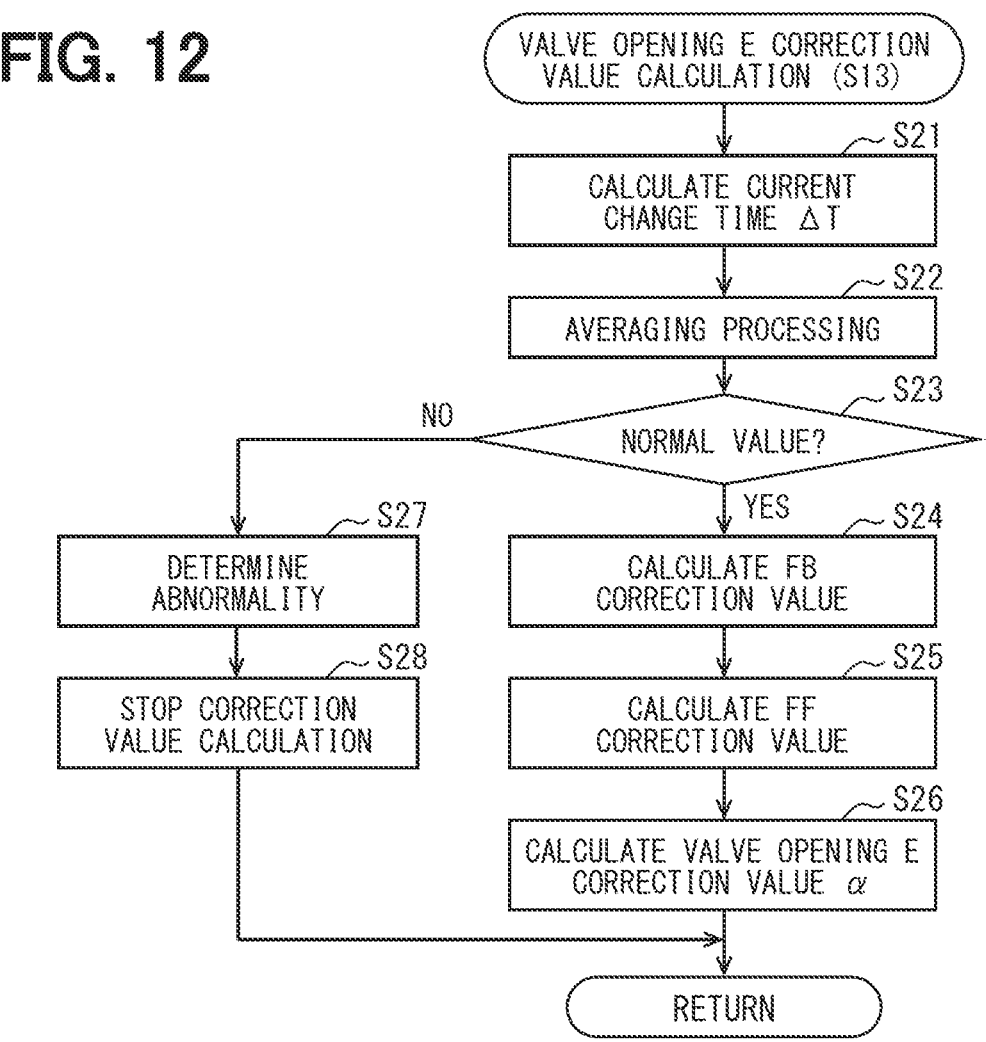
FIG. 12 is a flowchart illustrating valve opening energy correction value calculation processing.

In step S13, valve opening energy correction value calculation processing of calculating the valve opening energy correction value a is executed. In step S13, a subroutine illustrated in FIG. 12 is called, and the valve opening energy correction value a is calculated in the subroutine. However, details thereof will be described later.

Figure 14:
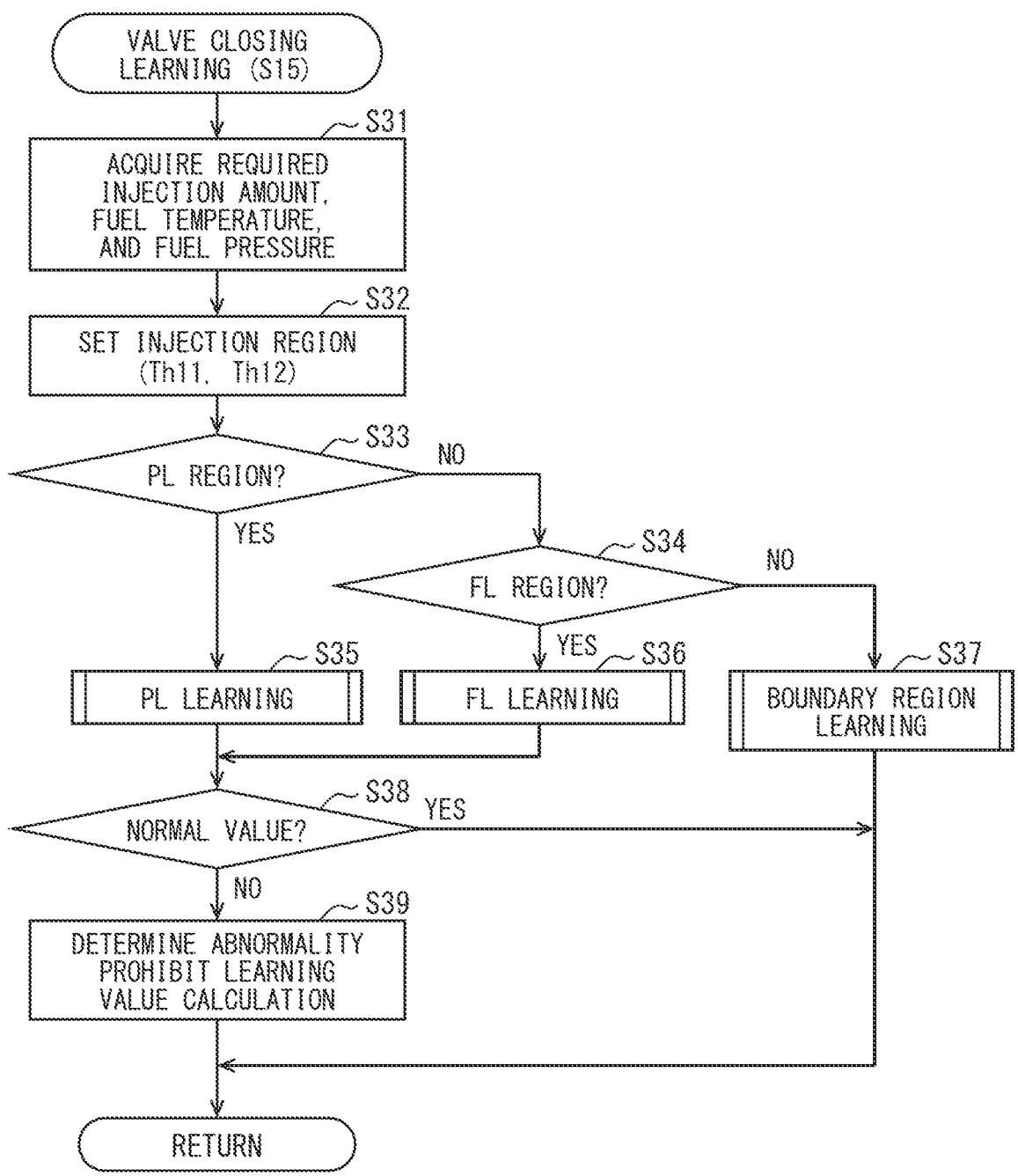
FIG. 14 is a flowchart illustrating valve closing learning processing.

Thereafter, in step S14, it is determined whether or not the valve opening energy correction using the valve opening energy correction value a has been executed in the fuel injection executed this time. If the valve opening energy correction has not been executed, this routine is ended as it is, or if the valve opening energy correction has been executed, the processing proceeds to step S15 and the valve closing learning processing is executed. In step S15, a subroutine illustrated in FIG. 14 is called, and the valve closing timing learning value βL is calculated in the subroutine. However, details thereof will be described later. According to steps S14 and S15, the valve closing timing learning value βL is calculated on condition that the valve opening energy correction by the valve opening energy correction value a.

Figure 26:
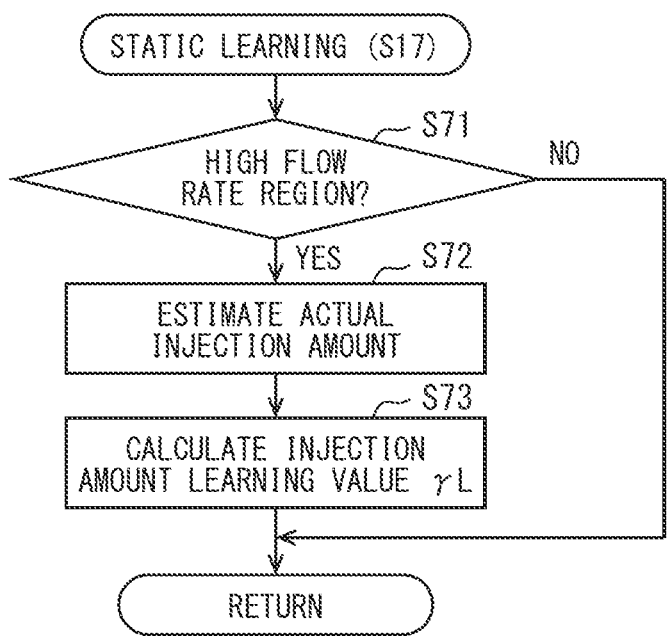
FIG. 26 is a flowchart illustrating static learning processing.

Thereafter, in step S16, it is determined whether or not the valve closing timing correction using the valve closing timing learning value βL has been executed in the fuel injection executed this time. If the valve closing timing correction has not been executed, this routine is ended as it is, or if the valve closing timing correction has been executed, the processing proceeds to step S17 and the static learning processing is executed. In step S17, a subroutine illustrated in FIG. 26 is called, and the injection amount learning value γL is calculated in the subroutine. However, details thereof will be described later. According to steps S16 and S17, the injection amount learning value γL is calculated on condition that the fuel injection correction by the valve closing timing learning value βL has been executed.

(Calculation Processing of Valve Opening Energy Correction Value)

FIG. 12 is a flowchart illustrating the valve opening energy correction value calculation processing executed in step S13 of FIG. 11. In this processing, the microcomputer 51 calculates the valve opening energy correction value a.

In FIG. 12, in step S21, the drive current detected by the current detection unit 58 is acquired, and the current change time $\Delta T$ is calculated according to a transition of the drive current. At this time, the timing at which the drive current crosses the current threshold Ith is acquired in each of a rising period in which the drive current rises accompanying start of energization of the fuel injection valve 30 and a falling period in which the drive current falls from the peak current Ip, and the current change time $\Delta T$ is calculated from the time difference between the timings.

As illustrated in FIG. 9, when the peak current Ip in the boosting period is made variable, the current change time $\Delta T$ changes according to the peak current Ip. Accordingly, in step S21, the normalization processing is preferably executed on the current change time $\Delta T$. In this case, preferably, the relationship between the peak current Ip and the current change time $\Delta T$ is determined in advance, and the current change time $\Delta T$ is normalized according to the peak current Ip each time.

Thereafter, in step S22, averaging processing is executed for each cylinder with respect to the current change time $\Delta T$. Specifically, the current change time $\Delta T$ for a predetermined number of injections is integrated, and an integrated value thereof is divided by the number of injections to calculate an average value of the current change time $\Delta T$. The configuration is preferably such that, when a temperature change equal to or more than a predetermined value occurs in an energization path including the fuel injection valve 30 and the drive IC 52 while the $\Delta T$ data for a predetermined number of injections used to integrate the current change time ΔT is acquired, the current change times ΔT acquired so far are all discarded, and integration of the current change time ΔT is newly started.

Thereafter, in step S23, it is determined whether or not the current change time ΔT after averaging is a normal value. At this time, when the current change time ΔT after averaging is within a normal range determined in advance and it is determined repeatedly a predetermined number of times that the current change time ΔT is within the normal range, preferably, step S23 is affirmative. If step S23 is affirmative, the processing proceeds to step S24, or if step S23 is negative, the processing proceeds to step S27.

In step S24, the FB correction value is calculated on the basis of the current change time ΔT. Specifically, the FB correction value is calculated by predetermined feedback calculation based on the deviation between the current change time ΔTref of the reference profile and the current change time ΔT of the actual current profile. At this time, if a previous value of the FB correction value already exists, a new FB correction value is calculated by adding the current value of the FB correction value to the previous value.

Figure 13:
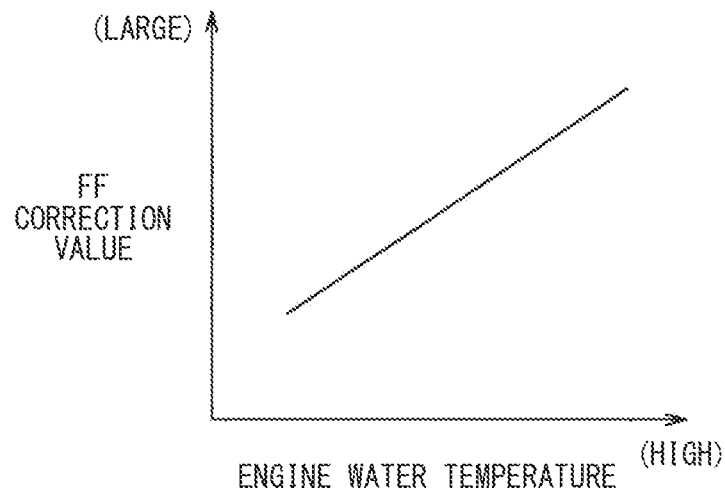
FIG. 13 is a diagram illustrating a relationship between an engine water temperature and an FF correction value.

Thereafter, in step S25, an FF correction value is calculated on the basis of a resistance temperature characteristic in the energization path including the fuel injection valve 30 and the drive IC 52. Specifically, the FF correction value is calculated on the basis of the engine water temperature using the relationship of FIG. 13.

Thereafter, in step S26, the FB correction value and the FF correction value are added to calculate the valve opening energy correction value a. The valve opening energy correction value a is preferably treated as a correction value calculated for each trip, unlike the valve closing timing learning value βL and the injection amount learning value γL to be described later. However, the valve opening energy correction value a can be stored in the backup memory 53 as a learning value.

In the above configuration, the valve opening energy correction value a is calculated by adding the FB correction value and the FF correction value, but this may be changed, and the FB correction value may be used as the valve opening energy correction value a as it is. That is, the configuration may be such that the FF correction value is not be added.

In step S27, it is determined that some kind of abnormality has occurred in the calculation of the valve opening energy correction value a. In this case, a failure warning lamp (MIL) is turned on, and diagnostic data indicating occurrence of abnormality is stored. Thereafter, in step S28, the update of the valve opening energy correction value a after the current time point is stopped.

In the abnormality determination in step S23, when the current change time ΔT after averaging is out of the normal range and it is determined repeatedly a predetermined number of times that the current change time ΔT is out of the normal range, it is preferable determined that the valve opening energy correction value a is an abnormal value, and proceed to step S27.

(Valve Closing Learning Processing)

FIG. 14 is a flowchart illustrating the valve closing learning processing executed in step S15 of FIG. 11. In this processing, the microcomputer 51 calculates the valve closing timing learning value βL.

In FIG. 14, in step S31, the required injection amount, the fuel temperature, and the fuel pressure in the fuel injection at this time are acquired.

Figure 15:
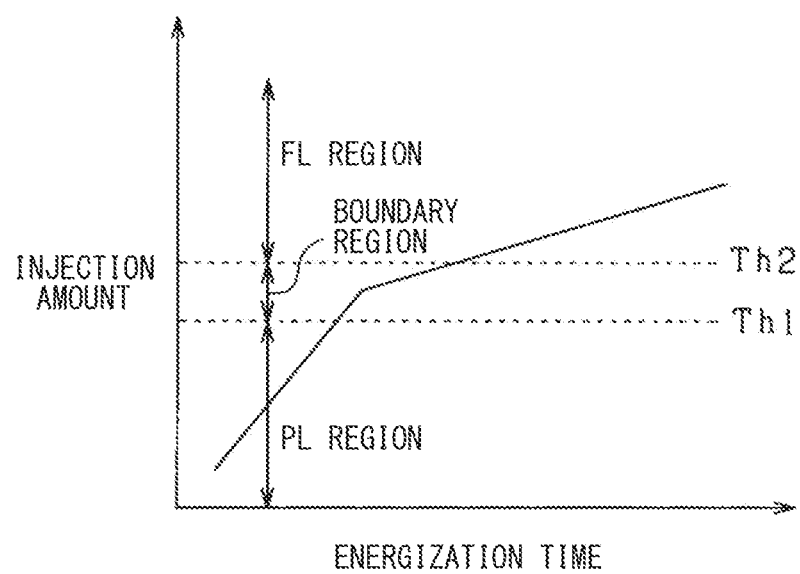
FIG. 15 is a diagram illustrating a plurality of injection regions in a relationship between an energization time and an injection amount.

In subsequent step S32, a plurality of injection regions including at least the partial lift region and the full lift region is set on the basis of the fuel temperature and the fuel pressure. In the present embodiment, the injection region is divided as illustrated in FIG. 15, in which a region where the fuel injection amount is less than a first threshold Th1 is the partial lift region (PL region), a region where the fuel injection amount is equal to or more than a second threshold Th2 is the full lift region (FL region), and a region where the fuel injection amount is equal to or more than the first threshold Th1 and less than the second threshold Th2, that is, a region including a boundary portion between the partial lift region and the full lift region is a boundary region. In step S32, each injection region is set by variably setting the thresholds Th1 and Th2 on the basis of the fuel temperature and the fuel pressure.

Figure 16A:
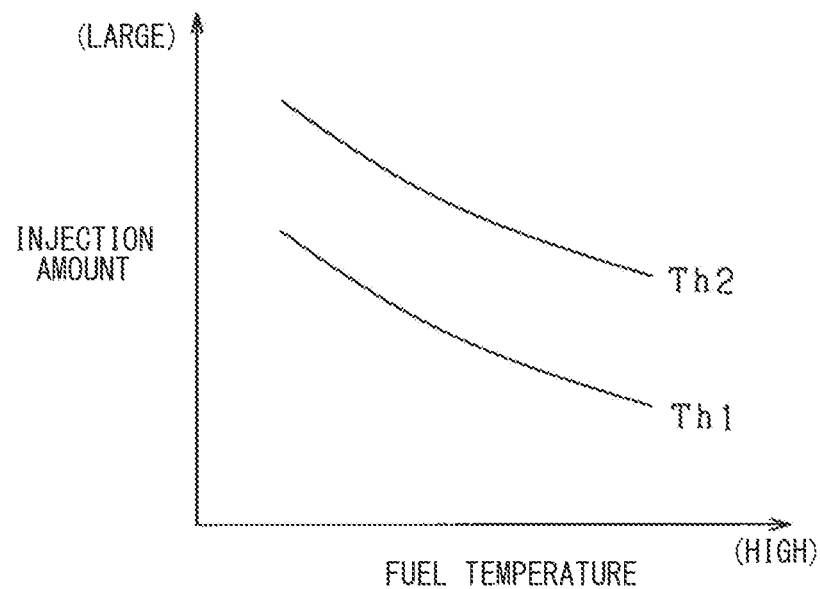
FIG. 16A is a diagram illustrating a relationship between a fuel temperature and thresholds Th1 and Th2.

The thresholds Th1 and Th2 are variably set on the basis of the fuel temperature using the relationship of FIG. 16A. In this case, the thresholds Th1 and Th2 are set to smaller values as the fuel temperature is higher. The thresholds Th1 and Th2 are variably set on the basis of the fuel pressure using the relationship of FIG. 16B. In this case, the thresholds Th1 and Th2 are set to larger values as the fuel pressure is higher. The relationship between FIG. 16A or 16B may be defined as a plurality of steps.

Figure 16B:
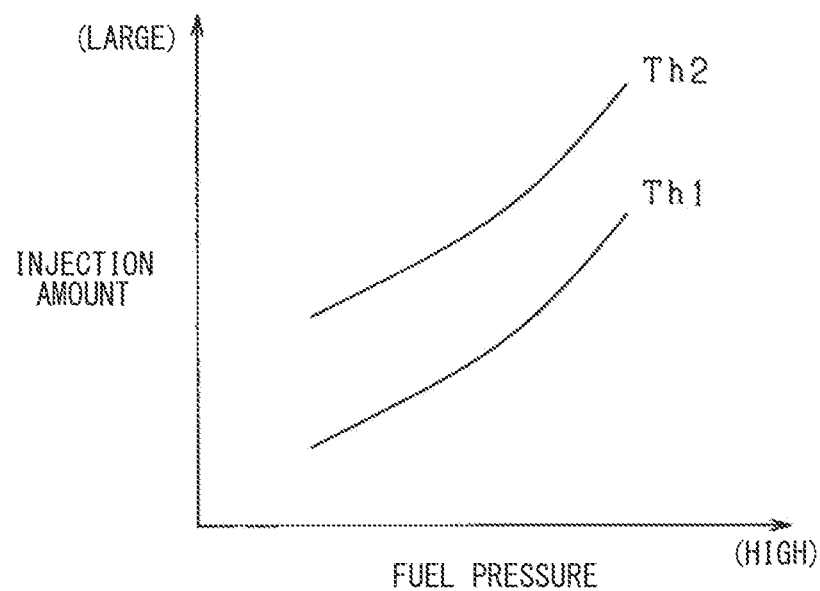
FIG. 16B is a diagram illustrating a relationship between a fuel pressure and thresholds Th1 and Th2.

The thresholds Th1 and Th2 may be set using only one of the relationships of FIGS. 16A and 16B. One of the thresholds Th1 and Th2 may be a variable value, and the other may be a fixed value. That is, only the upper limit of the partial lift region is variably set, or only the lower limit of the full lift region is variably set. Both of the thresholds Th1 and Th2 may be fixed values.

A lower limit value of the fuel injection amount may be determined in the partial lift region. An upper limit value of the fuel injection amount may be determined in the full lift region.

Thereafter, in step S33, it is determined whether or not the required injection amount in the fuel injection at this time belongs to the partial lift region, and in step S34, it is determined whether or not the required injection amount in the fuel injection at this time belongs to the full lift region. If step S33 is affirmative, the processing proceeds to step S35, or if step S34 is affirmative, the processing proceeds to step S36. If both steps S33 and S34 are negative, the processing proceeds to step S37.

In step S35, partial lift learning processing of calculating the valve closing timing learning value βL in the partial lift injection is executed. In step S35, a subroutine illustrated in FIG. 17 is called, and the valve closing timing learning value βL in the partial lift injection is calculated in the subroutine. However, details thereof will be described later.

Figure 20:
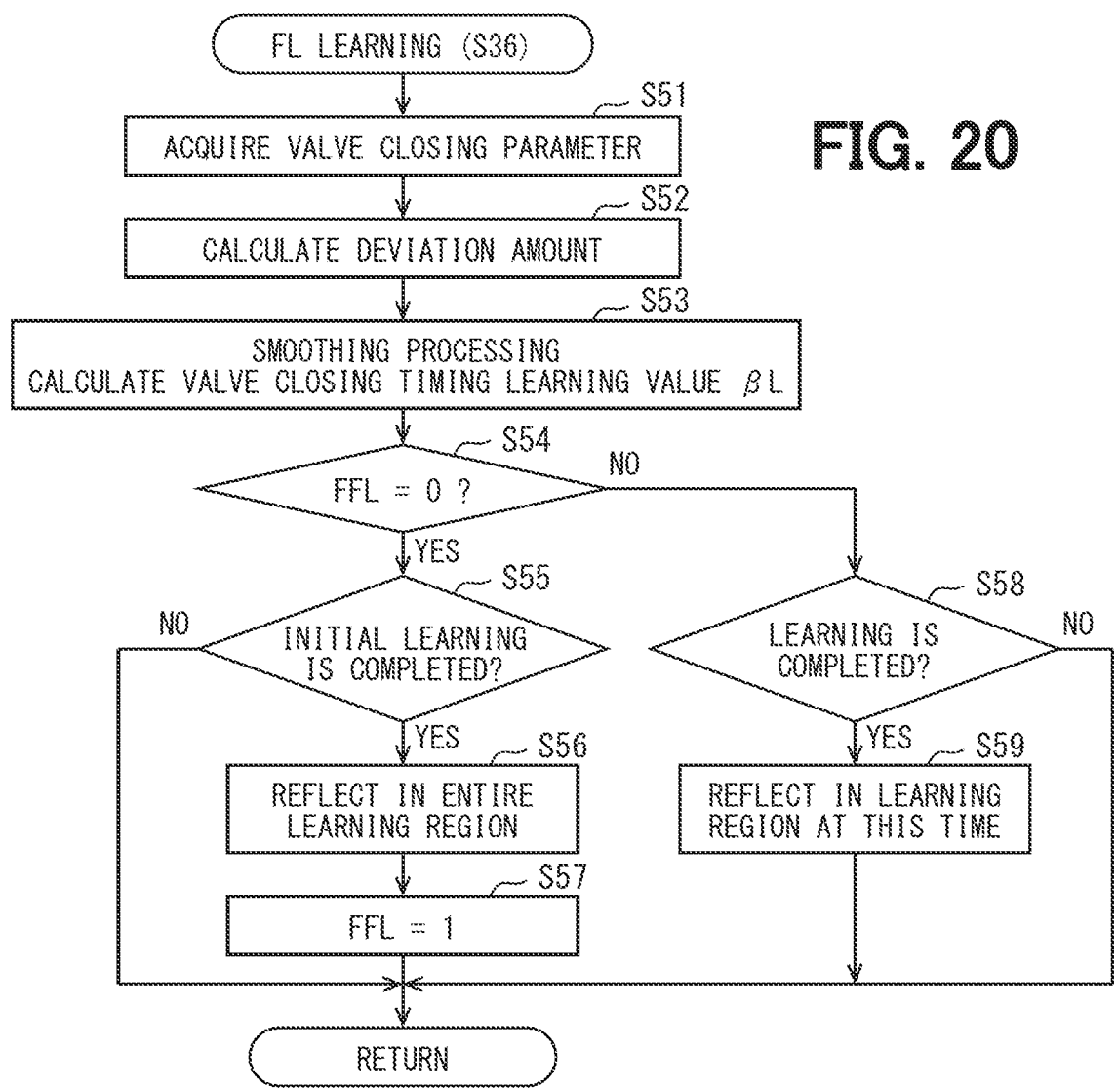
FIG. 20 is a flowchart illustrating full lift learning processing.

In step S36, full lift learning processing of calculating the valve closing timing learning value βL in the full lift injection is executed. In step S36, a subroutine illustrated in FIG. 20 is called, and the valve closing timing learning value βL in the full lift injection is calculated in the subroutine. However, details thereof will be described later.

Figure 25:
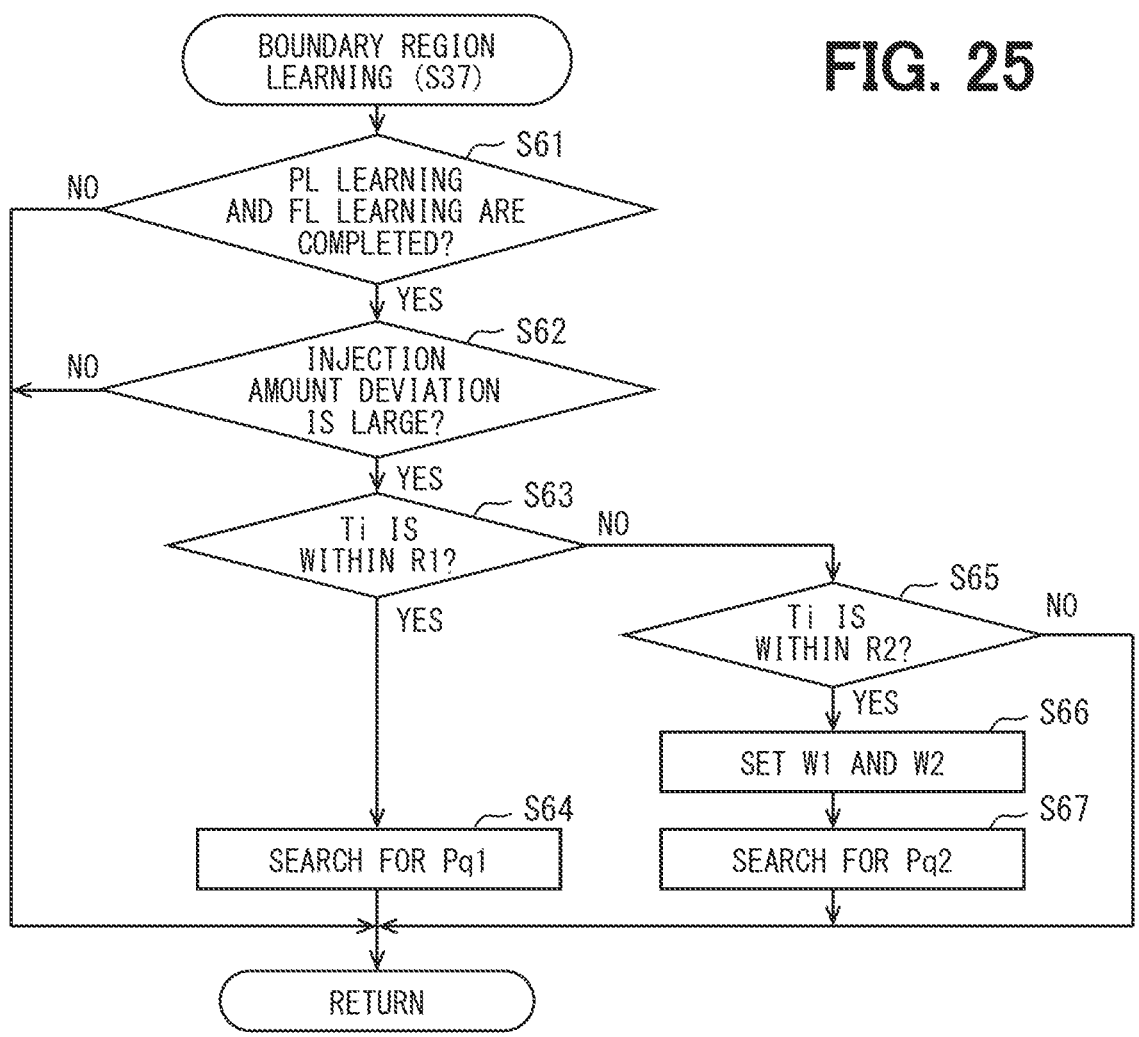
FIG. 25 is a flowchart illustrating boundary region learning processing.

In step S37, boundary region learning processing of compensating for characteristic variations in the fuel injection in the boundary region between the partial lift region and the full lift region is executed. In step S37, a subroutine illustrated in FIG. 25 is called, and the boundary region learning is executed in the subroutine. However, details thereof will be described later.

In step S38, it is determined whether or not the valve closing timing learning value βL in the partial lift injection calculated in step S35 and the valve closing timing learning value βL in the full lift injection calculated in step S36 are normal values. At this time, after the calculation of the valve closing timing learning value βL in the partial lift injection, it is determined whether or not the valve closing timing learning value βL is within a predetermined normal range. After the valve closing timing learning value βL is calculated in the full lift injection, it is determined whether or not the valve closing timing learning value βL is within a predetermined normal range. If each valve closing timing learning value βL is within the normal range, the present processing is terminated as it is. If each valve closing timing learning value βL is not within the normal range, the processing proceeds to step S39. When the deviation in the valve closing timing becomes excessively large due to degradation over time or the like in the fuel injection valve 30, the valve closing timing learning value βL deviates from the normal range and becomes, for example, a state of sticking to a predetermined upper limit value or lower limit value. In such a case, step S38 is negative, and the processing proceeds to step S39.

In step S39, it is determined that some kind of abnormality has occurred in the calculation of the valve closing timing learning value βL, the failure warning lamp (MIL) is turned on, and diagnostic data indicating occurrence of abnormality is stored. The calculation of the valve closing timing learning value βL after the current time point is stopped. In the abnormality determination in step S38, when a predetermined number of times that the valve closing timing learning value βL is outside the normal range, and it is determined repeatedly that the valve closing timing learning value βL is outside the normal range, occurrence of abnormality is preferably determined.

In steps S33 and S34, a parameter other than the required injection amount can be used as determination of checking whether the fuel injection at this time belongs to any injection region, and for example, the energization time Ti (energization pulse width) may be used as a determination parameter.

(Partial Lift Learning Processing)

FIG. 17 is a flowchart illustrating the partial lift learning processing executed in step S35 of FIG. 14. In this learning processing, as illustrated in FIG. 18, learning regions for the partial lift injection divided into a plurality of regions using the fuel temperature and the fuel pressure as parameters are determined, and the valve closing timing learning value βL is stored for each learning region. In the present embodiment, both the fuel temperature and the fuel pressure are divided into three regions, but the number of divisions is arbitrary. As a parameter for partitioning the learning region, only one of the fuel temperature and the fuel pressure may be used, or instead, other factors that affect characteristics of the fuel injection by the fuel injection valve 30 may be used. There may be one learning region.

In FIG. 17, in step S41, the voltage inflection timing Tinf of the negative terminal voltage Vm is acquired as the valve closing parameter indicating the valve closing timing of the fuel injection valve 30 (see FIG. 10).

Thereafter, in step S42, the valve closing characteristic data of the partial lift region defining the relationship between the energization time Ti (energization pulse width) and the valve closing parameter is used to calculate a deviation amount ratio from the reference characteristic as the characteristic deviation in the partial lift injection at this time. The calculation of the deviation amount ratio will be described in detail below.

Figure 19:
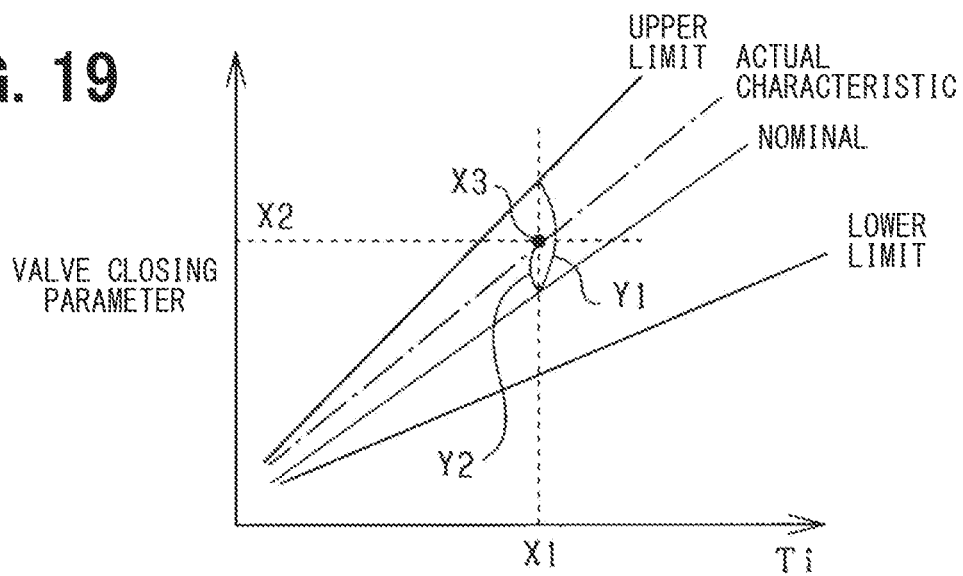
FIG. 19 is a diagram illustrating valve closing characteristic data of the partial lift injection.

FIG. 19 is a diagram illustrating valve closing characteristic data defining the relationship between the energization time Ti and the valve closing parameter in the partial lift injection, and this characteristic data is stored in a memory in the ECU 50 as, for example, map data. In FIG. 19, a nominal characteristic as the reference characteristic, an upper limit characteristic on a side where the valve closing parameter increases (a side where the valve closing timing delays), and a lower limit characteristic on a side where the valve closing parameter decreases (a side where the valve closing timing advances) are defined. The upper limit characteristic and the lower limit characteristic are limit characteristics that are an allowable upper limit and an allowable lower limit. These nominal characteristic, upper limit characteristic, and lower limit characteristic are model values determined by adaptation or the like, and are preferably determined including environmental variations such as individual differences and temperatures. The nominal characteristic, the upper limit characteristic, and the lower limit characteristic are preferably determined such that gains (inclinations) of the valve closing parameters with respect to the energization time Ti are different.

The microcomputer 51 calculates a characteristic deviation with respect to the nominal characteristic on the basis of the energization time Ti and the valve closing parameter in the partial lift injection at this time using the relationship of FIG. 19. In the present embodiment, as the characteristic deviation, the deviation amount ratio on the upper limit side with respect to the nominal characteristic is calculated on the basis of an actual characteristic position between the nominal characteristic and the upper limit characteristic. Alternatively, as the characteristic deviation, the deviation amount ratio on the lower limit side with respect to the nominal characteristic is calculated on the basis of the actual characteristic position between the nominal characteristic and the lower limit characteristic. A plurality of pieces of valve closing characteristic data in FIG. 19 is preferably determined according to at least either the fuel temperature or the fuel pressure.

Regarding the calculation of the deviation amount ratio, more specifically, in FIG. 19, when the energization time Ti in the partial lift injection at this time is X1 and the valve closing parameter is X2, an actual characteristic point is obtained as X3. In this case, the actual characteristic deviates to the upper limit side with respect to the nominal characteristic, and at the energization time X1, the deviation amount ratio is calculated by a ratio (Y2/Y1) of a difference Y1 between the valve closing parameter in the upper limit characteristic and the valve closing parameter in the nominal characteristic and a difference Y2 between the actual valve closing parameter and the valve closing parameter in the nominal characteristic. When the actual characteristic deviates to the lower limit side with respect to the nominal characteristic, the deviation amount ratio is calculated using the lower limit characteristic instead of the upper limit characteristic.

The deviation amount ratio as the characteristic deviation is preferably normalized in the partial lift region. In this case, the deviation amount ratio is preferably calculated by a valve closing parameter at a single point or valve closing parameters at multiple points.

The configuration may be such that only one of the upper limit characteristic and the lower limit characteristic is defined in the valve closing characteristic data in advance, and only one of the processing of calculating the deviation amount ratio on the upper limit side on the basis of the upper limit characteristic and the processing of calculating the deviation amount ratio on the lower limit side on the basis of the lower limit characteristic is executed.

Thereafter, in step S43 of FIG. 17, the previous value of the deviation amount ratio is updated by smoothing calculation using the current value of the deviation amount ratio. The microcomputer 51 calculates the deviation amount ratio as the valve closing timing learning value βL of the partial lift region, and stores the valve closing timing learning value βL for each learning region determined by the fuel temperature and the fuel pressure.

Thereafter, in step S44, it is determined whether or not an initial learning flag FPL indicating that initial learning in the partial lift region is completed is zero. The initial learning flag FPL indicates that learning of the valve closing timing learning value PL (deviation amount ratio) is completed in at least one region in the plurality of learning regions for the partial lift injection. The initial learning flag FPL is set to "0" when the valve closing timing learning value βL is unlearned (that is, no data is present) in all the learning regions of the partial lift region, and is set to "1" when the learning of the valve closing timing learning value PL is completed in at least one learning region.

If step S44 is affirmative, the processing proceeds to step S45, and it is determined whether or not calculation of an initial learning value of the deviation amount ratio has been completed. At this time, a period of the initial learning is determined in advance, and the deviation amount ratio as the initial learning value is preferably calculated from the deviation amount ratio repeatedly calculated in the period. If the calculation of the initial learning value of the deviation amount ratio has been completed, the processing proceeds to the subsequent step S46, or if the calculation of the initial learning value has not been completed, this routine is terminated as it is.

In step S46, the deviation amount ratio that is the initial learning value is reflected in all the learning regions of the partial lift region as the valve closing timing learning value L. At this time, the same learning value is stored in all the learning regions regardless of the fuel temperature and the fuel pressure at the current time point. When the learning values are stored in all the learning regions, the difference between the fuel temperature and the fuel pressure at the current time point and the fuel temperature and the fuel pressure in other learning regions may be considered, and the configuration may be such that the learning value is corrected according to the difference in the fuel temperature and the difference in the fuel pressure, and the learning value after correction is stored in each learning region. In subsequent step S47, the initial learning flag FPL is set to one, and then this routine is terminated.

After one is set to the initial learning flag FPL, step S44 is negative, and the processing proceeds to step S48. In step S48, it is determined whether or not to store the deviation amount ratio as the valve closing timing learning value βL for the learning region at this time where the deviation amount ratio has been calculated. If the calculation of the deviation amount ratio to be the valve closing timing learning value βL has been completed in the corresponding learning region, the processing proceeds to step S49, and the valve closing timing learning value PL (deviation amount ratio) is stored in the learning region.

The configuration may be such that a value different from the deviation amount ratio is calculated as a value indicating the characteristic deviation in the partial lift injection. For example, the configuration may be such that, as the characteristic deviation, the deviation amount of the actual characteristic with respect to the nominal characteristic is calculated.

(Full Lift Learning Processing)

FIG. 20 is a flowchart illustrating the full lift learning processing executed in step S36 of FIG. 14. In this learning processing, similarly to the partial lift learning, a learning region for full lift learning divided into a plurality of regions with the fuel temperature and the fuel pressure as parameters is determined, and the valve closing timing learning value βL is stored for each learning region (see FIG. 18).

In FIG. 20, in step S51, the voltage inflection timing Tinf of the negative terminal voltage Vm is acquired as the valve closing parameter indicating the valve closing timing of the fuel injection valve 30 (see FIG. 10).

Thereafter, in step S52, the deviation amount from the reference characteristic is calculated as the characteristic deviation in the full lift injection at this time using the valve closing characteristic data of the full lift region defining the relationship between the energization time Ti (energization pulse width) and the valve closing parameter. The calculation of the deviation amount will be described in detail below.

Figure 21:
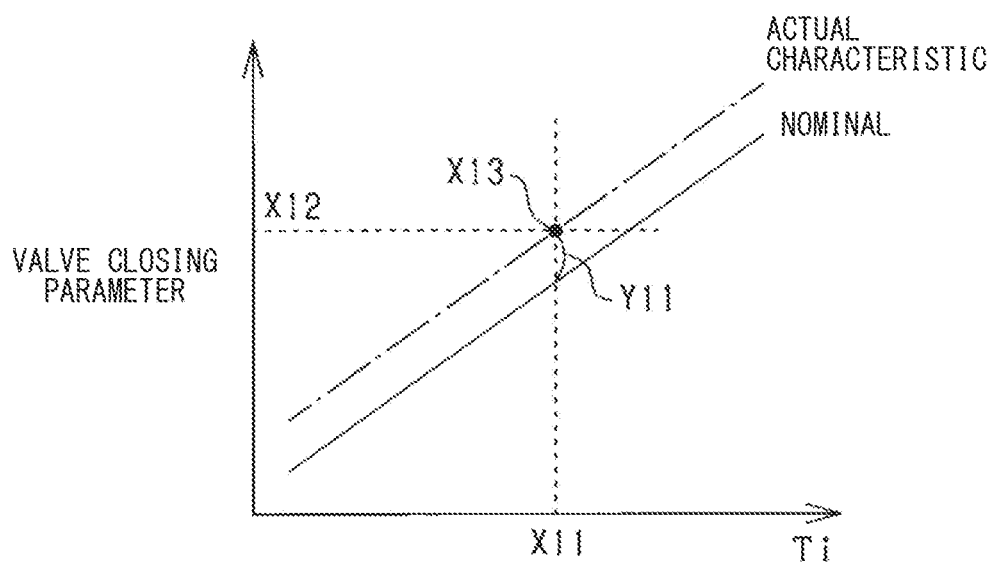
FIG. 21 is a diagram illustrating valve closing characteristic data of the full lift injection.

FIG. 21 is a diagram illustrating valve closing characteristic data that defines the relationship between the energization time Ti and the valve closing parameter in the full lift injection, and this characteristic data is stored in the memory in the ECU 50 as, for example, map data. In FIG. 21, the nominal characteristics as the reference characteristics are defined.

The microcomputer 51 calculates the characteristic deviation with respect to the nominal characteristic on the basis of the energization time Ti and the valve closing parameter in the full lift injection at this time using the relationship of FIG. 21. In the present embodiment, as the characteristic deviation, the deviation amount with respect to the nominal characteristic is calculated on the basis of a difference in the valve closing parameter between the nominal characteristic and the actual characteristic. A plurality of pieces of valve closing characteristic data in FIG. 21 is preferably determined according to at least either the fuel temperature or the fuel pressure. Regarding the calculation of the deviation amount ratio, more specifically, in FIG. 21, when the energization time Ti in the full lift injection at this time is X11 and the valve closing parameter is X12, the actual characteristic point is obtained as X13. In this case, at the energization time X11, the deviation amount is calculated by the difference Y11 in the valve closing parameter of the actual characteristic with respect to the nominal characteristic. The deviation amount is preferably one normalized in the full lift region. In this case, the deviation amount is preferably calculated by the valve closing parameter at a single point or the valve closing parameters at multiple points.

Thereafter, in step S53 of FIG. 20, the current value of the deviation amount is used, and the previous value of the deviation amount is updated by smoothing calculation. The microcomputer 51 calculates the deviation amount as the valve closing timing learning value βL of the full lift region, and stores the valve closing timing learning value βL for each learning region determined by the fuel temperature and the fuel pressure.

Thereafter, in step S54, it is determined whether or not an initial learning flag FFL indicating that the initial learning in the full lift region is completed is zero. The initial learning flag FFL indicates that the learning of the valve closing timing learning value βL (deviation amount) is completed in at least one region in a plurality of learning regions for the full lift injection. The initial learning flag FFL is set to "0" when the valve closing timing learning value βL is unlearned (that is, no data is present) in all the learning regions of the full lift region, and is set to "1" when the learning of the valve closing timing learning value βL is completed in at least one learning region.

If step S54 is affirmative, the processing proceeds to step S55, and it is determined whether or not the calculation of the initial learning value of the deviation amount has been completed. At this time, a period of the initial learning is determined in advance, and the deviation amount as the initial learning value is preferably calculated from the deviation amount repeatedly calculated in the period. If the calculation of the initial learning value of the deviation amount has been completed, the processing proceeds to the subsequent step S56, or if the calculation of the initial learning value has not been completed, this routine is terminated as it is.

In step S56, the deviation amount that is the initial learning value is reflected in all the learning regions of the full lift region as the valve closing timing learning value L. At this time, the same learning value is stored in all the learning regions regardless of the fuel temperature and the fuel pressure at the current time point. When the learning values are stored in all the learning regions, the difference between the fuel temperature and the fuel pressure at the current time point and the fuel temperature and the fuel pressure in other learning regions may be considered, and the configuration may be such that the learning value is corrected according to the difference in the fuel temperature and the difference in the fuel pressure, and the learning value after correction is stored in each learning region. In subsequent step S57, the initial learning flag FFL is set to one, and then this routine is terminated.

After the initial learning flag FFL is set to one, step S54 is negative, and the processing proceeds to step S58. In step S58, it is determined whether or not to store the deviation amount as the valve closing timing learning value βL for the learning region at this time for which the deviation amount has been calculated. If the calculation of the deviation amount to be the valve closing timing learning value βL has been completed in the corresponding learning region, the processing proceeds to step S59, and the valve closing timing learning value βL (deviation amount) is stored in the learning region.

The configuration may be such that a value different from the deviation amount is calculated as a value indicating the characteristic deviation in the full lift injection. For example, the configuration may be such that, as the characteristic deviation, the deviation amount ratio on the upper limit side or the lower limit side with respect to the nominal characteristic is calculated on the basis of the actual characteristic position between the nominal characteristic and the upper limit characteristic.

Figure 22:
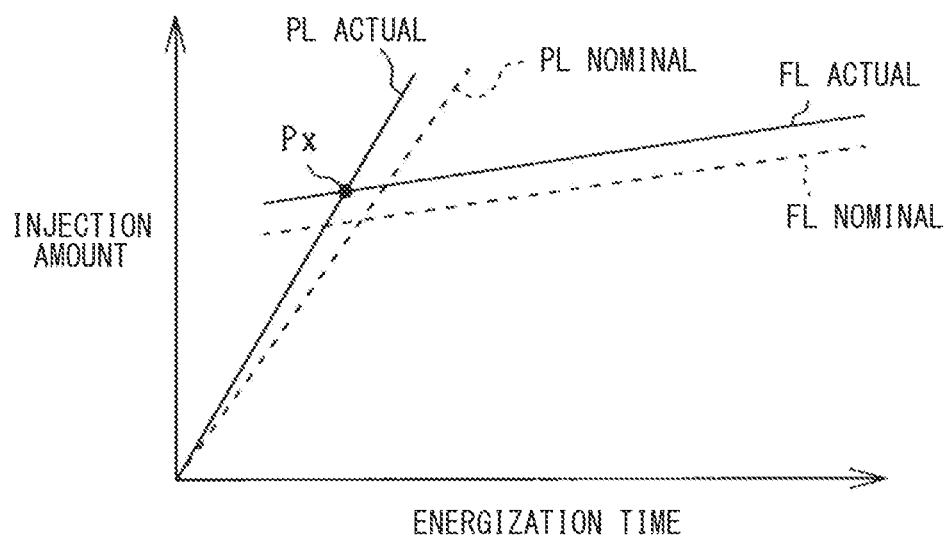
FIG. 22 is a graph illustrating nominal characteristics and actual characteristics of injection characteristics in the partial lift region and the full lift region.

According to the partial lift learning processing and the full lift learning processing described above, as illustrated in FIG. 22, a learned injection amount characteristic is obtained in each of the partial lift region and the full lift region. In FIG. 22, as the injection amount characteristic in the partial lift region, the nominal characteristic is indicated by a broken line, and the actual characteristic is indicated by a solid line. As the injection amount characteristic in the full lift region, the nominal characteristic is indicated by a broken line, and the actual characteristic is indicated by a solid line. In this case, the actual partial lift injection characteristic is defined on the lower flow rate side than an intersection Px of an actual characteristic in the partial lift region and an actual characteristic in the full lift region, and the actual full lift injection characteristic is defined on the higher flow rate side than the intersection Px.

(Boundary Region Learning Processing)

Figure 23:
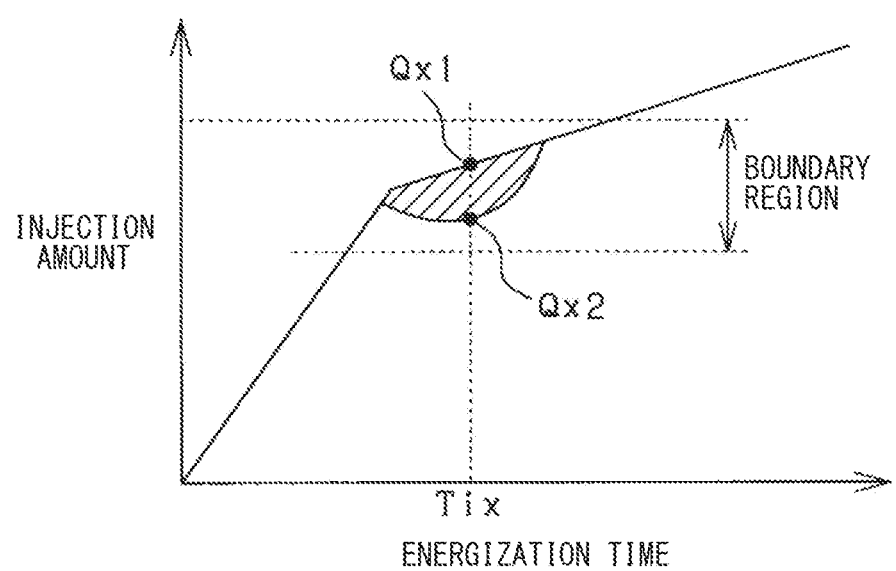
FIG. 23 is a graph illustrating variations in injection amount characteristics in a boundary region.

In the vicinity of the intersection Px of the partial lift injection characteristic and the full lift injection characteristic, disturbance of the injection amount due to the valve body 34 reaching the full lift position easily occurs, and the injection amount unintentionally increases or decreases. As a cause of the disturbance of the injection amount, a rebound of the valve body 34 generated when the valve body 34 reaches the full lift position is considered. In this case, as illustrated in FIG. 23, in the boundary region near the boundary between the partial lift region and the full lift region, the relationship between the energization time and the injection amount is disturbed, and for example, the injection amount becomes excessively small with respect to the energization time (hatched portion).

In the present embodiment, in the boundary region learning processing, the deviation in the injection amount characteristic due to the disturbance of the injection amount in the boundary region is found, and the characteristic deviation is learned. An outline of the boundary region learning will be described below.

FIGS. 24A to 24D are explanatory diagrams illustrating a procedure of boundary region learning, and in each of these diagrams, the partial lift injection characteristic and the full lift injection characteristic learned by the partial lift learning processing and the full lift learning processing are indicated by broken lines. The actual injection amount characteristic (actual characteristic) is indicated by a solid line, and in the actual characteristic, the injection amount drops near the intersection of the partial lift injection characteristic and the full lift injection characteristic. In FIG. 24A, a learning execution range in the boundary region is determined, and specifically, a range in which the injection amount is between injection amount thresholds Th11 to Th12 and the energization time Ti is between energization time thresholds Th13 to Th14 is defined as the learning execution range. The injection amount thresholds Th11 and Th12 are preferably the same as the first threshold Th1 and the second threshold Th2 in FIG. 15 described above. Two search regions R1 and R2 are defined within the learning execution range. These search regions R1 and R2 are regions to search for characteristic points Pq1 and Pq2 on the actual characteristics in the actual characteristics of the boundary region where the drop of the injection amount occurs. In the present embodiment, in the learning execution range, the injection amount characteristic in the boundary region is learned on the basis of the two characteristic points Pq1 and Pq2 found in the search regions R1 and R2 and two characteristic points W1 and W2 which are set on a partial lift characteristic and a full lift characteristic, respectively.

First, FIG. 24A, the search region R1 is searched for the characteristic point Pq1 on the actual characteristic. In this case, an actual injection amount Qz1 of the fuel injection at this time is acquired, an energization time Tz1 corresponding to the required injection amount at this time is obtained using the full lift injection characteristic, and a point (coordinate) determined from the actual injection amount Qz1 and the energization time Tz1 is set as the characteristic point Pq1.

In FIG. 24B, a characteristic point W1 on the partial lift characteristic and a characteristic point W2 on the full lift characteristic are set. A characteristic line L1 is created by linearly interpolating between the characteristic point W1 on the partial lift characteristic and the characteristic point Pq1 on the actual characteristic, and a characteristic line L2 is created by linearly interpolating between the characteristic point W2 on the full lift characteristic and the characteristic point Pq1 on the actual characteristic.

In FIG. 24C, the search region R2 is searched for the characteristic point Pq2 on the actual characteristic. In this case, an actual injection amount Qz2 of the fuel injection at this time is acquired, an energization time Tz2 corresponding to the required injection amount at this time is obtained using the characteristic line L1, and a point (coordinate) determined from the actual injection amount Qz2 and the energization time Tz2 is set as the characteristic point Pq2.

In FIG. 24D, a characteristic line L21 is created by linearly interpolating between the characteristic points Pq1 and Pq2 on the actual characteristic, and a characteristic line L22 is created by linearly interpolating between the characteristic point W2 on the full lift characteristic and the characteristic point Pq2 on the actual characteristic. In this case, the characteristic line L2 described in FIG. 24B is divided into two by the characteristic lines L21 and L22.

Consequently, the injection amount characteristic of the boundary region can be brought closer to the actual characteristic. The characteristic lines L1, L21, L22 illustrated in FIG. 24D indicate the injection amount characteristics of the boundary region.

The number of characteristic points Pq1 and Pq2 on the actual characteristics may be arbitrary, and may be one or three or more. In short, the characteristic line (L1, L21, L22) indicating the injection amount characteristic of the boundary region is created by using the learned characteristic point W1 on the partial lift characteristic, the learned characteristic point W1 on the full lift characteristic, and one or a plurality of characteristic points (Pq1 and Pq2) on the actual characteristic within the boundary region and between the characteristic points W1 and W2, and by connecting these characteristic points as described above.

FIG. 25 is a flowchart illustrating the boundary region learning processing executed in step S37 of FIG. 14. In the main learning processing, it is conceivable that the learning execution range is variably set according to the fuel temperature and the fuel pressure. In this case, since the learning execution range changes according to the fuel pressure when this learning processing is executed, the characteristic points Pq1 and Pq2, and W1 and W2 are preferably normalized and obtained within the learning execution range. Thus, even when the fuel temperature and the fuel pressure are different, each characteristic point can be commonly used. However, the configuration may be such that, as those at the time of the partial lift learning or the full lift learning, the learning value is stored in each of the plurality of divided learning regions (see FIG. 18) using the fuel temperature and the fuel pressure as parameters.

The disturbance of the injection amount in the boundary region varies due to the influence of the battery voltage or the like. Thus, for example, if the battery voltage is equal to or less than a predetermined value, the configuration may be such that the execution of the main learning processing is prohibited.

In FIG. 25, in step S61, it is determined whether or not the learning of the valve closing timing learning value βL in the partial lift region and the full lift region is completed. At this time, if the valve closing timing learning value βL in each of the partial lift region and the full lift region is stored in the learning region corresponding to the fuel temperature and the fuel pressure at the current time point, it is determined that the learning in the partial lift region and the full lift region is completed.

In step S62, it is determined whether or not the injection amount deviation in the boundary region is a predetermined value or more. Specifically, in FIG. 23, an injection amount Qx1 (injection amount on the learned injection characteristic) on the full lift injection characteristic and an actual injection amount Qx2 with respect to an energization time Tix at this time are acquired, and it is determined whether or not a separation amount between these Qx1 and Qx2 is equal to or more than a predetermined value. When both steps S61 and S62 are affirmative, the processing proceeds to the subsequent step S63, or when either one of steps S61 and S62 is negative, the processing ends.

In step S63, it is determined whether or not the energization time Ti (energization pulse width) of the fuel injection at this time is within the search region R1. If step S63 is affirmative, the processing proceeds to step S64, of if step S63 is negative, the processing proceeds to step S65.

In step S64, the search region R1 is searched for the characteristic point Pq1 on the actual characteristic. At this time, as illustrated in FIG. 24A, the characteristic point Pq1 is determined by the energization time Tz1 in the fuel injection at this time and the actual injection amount Qz1. The energization time Tz1 and the actual injection amount Qz1 of the characteristic point Pq1 are preferably obtained by performing smoothing processing on the previous values.

In step S65, it is determined whether or not the energization time Ti (energization pulse width) of the fuel injection at this time is within the search region R2. When step S65 is affirmative, the processing proceeds to step S66, or when step S65 is negative, the processing temporarily ends.

In step S66, the characteristic point W1 on the partial lift characteristic and the characteristic point W2 on the full lift characteristic are set.

In step S67, the search region R2 is searched for the characteristic point Pq2 on the actual characteristic. At this time, as illustrated in FIG. 24B, the characteristic line L2 is created by linearly interpolating between the characteristic point W2 on the full lift characteristic and the characteristic point Pq1 on the actual characteristic. As illustrated in FIG. 24C, the energization time Tz2 corresponding to the required injection amount in the fuel injection at this time is acquired by the characteristic line L2, and the characteristic point Pq2 is determined by the energization time Tz2 and the actual injection amount Qz2 at this time. The energization time Tz2 and the actual injection amount Qz2 of the characteristic point Pq2 are preferably obtained by performing smoothing processing on the previous values.

The energization time (Ti value) and the injection amount (Q value) of the characteristic points Pq1 and Pq2 are obtained as boundary region learning values for compensating for the injection amount deviation (energization time deviation if based on the injection amount) in the boundary region, and the Ti value and the Q value of the characteristic points Pq1 and Pq2 are stored in the backup memory 53. Similarly, the Ti value and the Q value of the characteristic points W1 and W2 are stored in the backup memory 53. The configuration may be such that the Ti value and the Q value of the characteristic points Pq1 and Pq2 are stored for each learning region determined according to the fuel temperature and the fuel pressure of each time.

(Static Learning Processing)

FIG. 26 is a flowchart illustrating the static learning processing executed in step S17 of FIG. 11. The microcomputer 51 calculates the injection amount learning value γL in this processing.

In FIG. 26, in step S71, it is determined whether or not the required injection amount at this time is in a predetermined high flow rate region in the full lift region. If the required injection amount is within the high flow rate region in the full lift region, the processing proceeds to the subsequent step S72, or if the required injection amount has not entered the high flow rate region, the processing ends as it is.

In step S72, the actual fuel injection amount in the fuel injection at this time is estimated as the actual injection amount. Specifically, since an accompanying fuel pressure decrease occurs when the fuel injection is performed, a fuel pressure decrease amount before and after the fuel injection is acquired, and the actual injection amount is estimated on the basis of the fuel pressure decrease amount. At this time, the correlation between the fuel injection amount and the fuel pressure decrease amount is preferably determined in advance, and the actual injection amount is preferably estimated on the basis of the fuel pressure decrease amount. It is preferably estimated that the actual injection amount increases as the fuel pressure decrease amount increases.

When the fuel injected from the fuel injection valve 30 is used for combustion, an accompanying change in the air-fuel ratio of the exhaust gas and change in the engine rotation speed (instantaneous rotation speed per unit rotation angle) occur. Thus, an air-fuel ratio change amount and a rotation speed change amount may be acquired, and the actual injection amount may be estimated on the basis of the change amounts. At this time, a correlation between the fuel injection amount and the air-fuel ratio change amount or a correlation between the fuel injection amount and the rotational speed change amount is preferably determined in advance, and the actual injection amount is preferably estimated on the basis of the air-fuel ratio change amount or the rotational speed change amount. The method of estimating the actual injection amount on the basis of the air-fuel ratio change amount and the rotational speed change amount is limited to a case where the fuel injection of single-stage injection is performed instead of multi-stage injection. The actual injection amount can also be estimated on the basis of the fuel pressure decrease amount that occurs accompanying the fuel injection and at least either the air-fuel ratio change amount or the rotational speed change amount that occurs accompanying the combustion of the fuel.

Thereafter, in step S73, the injection amount learning value γL for correcting the required injection amount is calculated on the basis of the deviation between the required injection amount and the actual injection amount. At this time, the difference between the required injection amount and the actual injection amount is preferably set as the injection amount learning value γL.

(Fuel Injection Main Routine)

Figure 27:
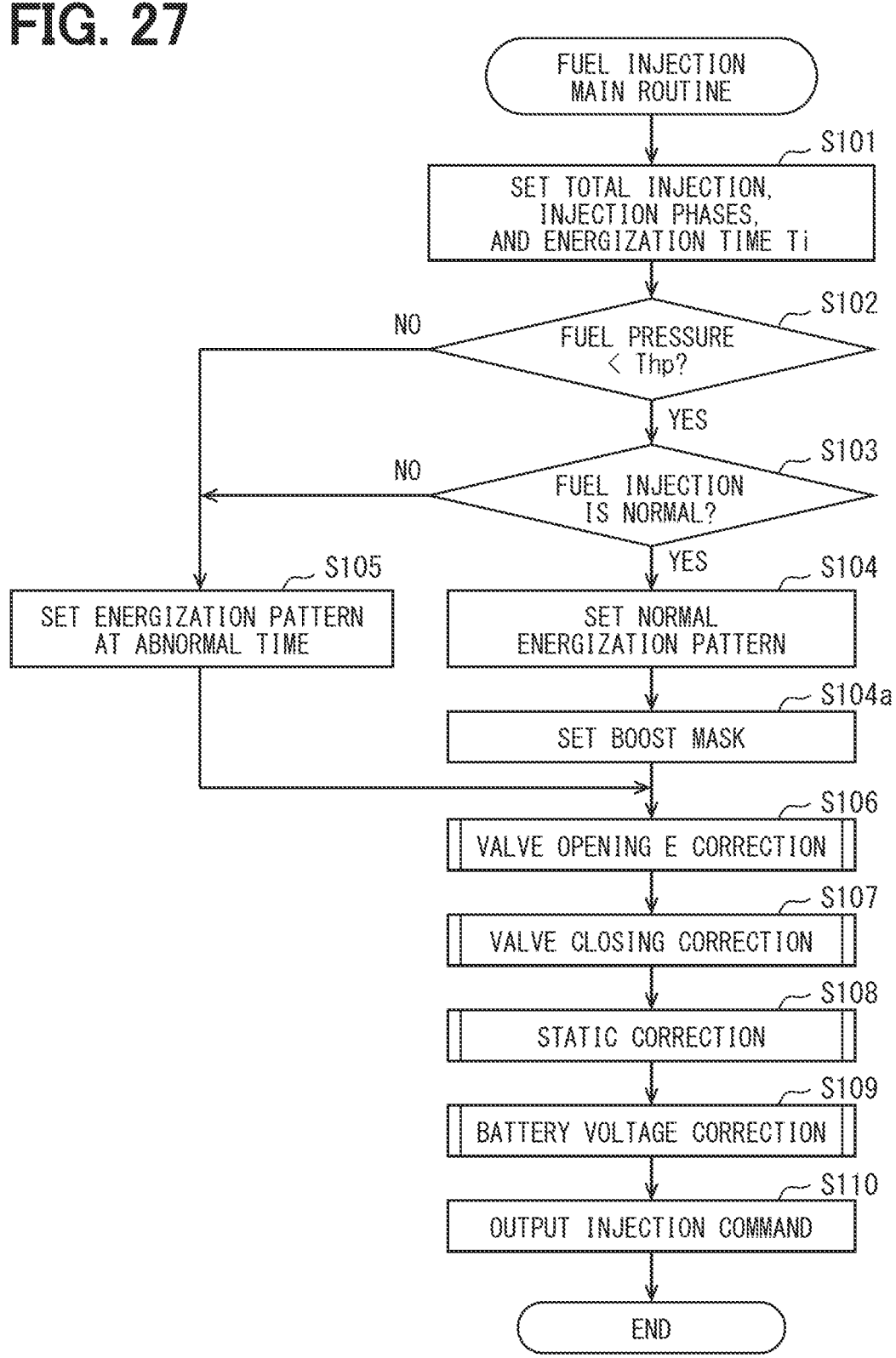
FIG. 27 is a flowchart illustrating a fuel injection main routine.

FIG. 27 is a flowchart illustrating a fuel injection main routine for executing the fuel injection of the fuel injection valve 30, and this routine is executed by the microcomputer 51 of the ECU 50 for each fuel injection of each cylinder. In this routine, the microcomputer 51 appropriately calculates the valve opening energy correction by the valve opening energy correction value a, valve closing correction by the valve closing timing learning value βL, and the static correction by the injection amount learning value γL for each cylinder.

In FIG. 27, in step S101, the total injection amount by the fuel injection valve 30 in the combustion cylinder at this time, the number of injection stages, the required injection amount of injection in each stage, and the energization time Ti are calculated. At this time, a basic injection amount is calculated on the basis of the engine operating state such as the engine rotation speed and the engine load, and various corrections on the basis of the air-fuel ratio, the engine water temperature, and the like are executed to calculate the total injection amount. The number of injection stages when multi-stage injection is executed is set on the basis of the engine operating state such as the engine rotation speed and the engine load. For example, the number of injection stages is set such that the number of injection stages is increased during high-load operation. The required injection amount of the multi-stage injection or the single-stage injection is calculated, and the energization time Ti is calculated according to the required injection amount of each stage.

In steps S102 and S103, it is determined whether or not the fuel injection by the fuel injection valve 30 is normally executed. Specifically, in step S102, it is determined whether or not the fuel pressure detected by the fuel pressure sensor 41 is lower than a predetermined pressure threshold Thp. The pressure threshold Thp is a determination value for determining that the fuel pressure is over pressure that is excessively high, and is determined as a pressure higher than a fuel pressure use range determined in advance. For example, when the fuel pressure use range in the fuel injection system is 10 to 40 MPa, the pressure threshold Thp is 50 MPa.

In step S103, it is determined whether or not the fuel injection is normally performed in the past fuel injections including the last time (last and more previous fuel injections). The determination that the last and more previous fuel injections is not normal (that is, abnormal) are preferably made on the basis of at least one of the following: the change in the engine rotation speed in the last and more previous combustion strokes is equal to or less than a predetermined value, the fuel pressure decrease amount that occurs accompanying the last and more previous fuel injections is equal to or less than a predetermined value, the valve closing timing after the end of energization in the last and more previous fuel injections is earlier than a predetermined timing, the misfire occurs in the last and more previous combustion strokes, and a cranking time at the time of engine start is equal to or more than a predetermined value. When any of these abnormalities occurs and the situation continues for a predetermined time, it is preferable to determine that the fuel injection is not normal.

When both steps S102 and S103 are affirmative, the processing proceeds to step S104, and an energization pattern in a normal mode is set as the energization pattern for energizing the fuel injection valve 30. At this time, the microcomputer 51 sets the high voltage V2 (boosting voltage), the peak current Ip, and the hold current Ih. Each of these values is preferably set as a value at which the normal fuel injection can be executed while considering variations in the fuel injection valve 30 and a drive circuit with respect to the maximum fuel pressure in the present drive system. In this case, the fuel injection valve 30 is energized and driven in the normal mode energization pattern illustrated in FIG. 5 described above. That is, in the energization pattern in the normal mode, the high voltage V2 is applied to the fuel injection valve 30 accompanying turning on of the energization pulse, and the fuel injection is started by the valve opening lift of the valve body 34 accompanying the voltage application. The applied voltage is switched from the high voltage V2 to the low voltage V1 on the basis of the drive current reaching the peak current Ip. Consequently, the drive current is held by the hold current Ih, and the valve open state of the valve body 34 is maintained. Thereafter, when the energization pulse is turned off, the voltage application to the fuel injection valve 30 is stopped, and the fuel injection is stopped when the valve body 34 reaches the valve closing position.

Figure 28:
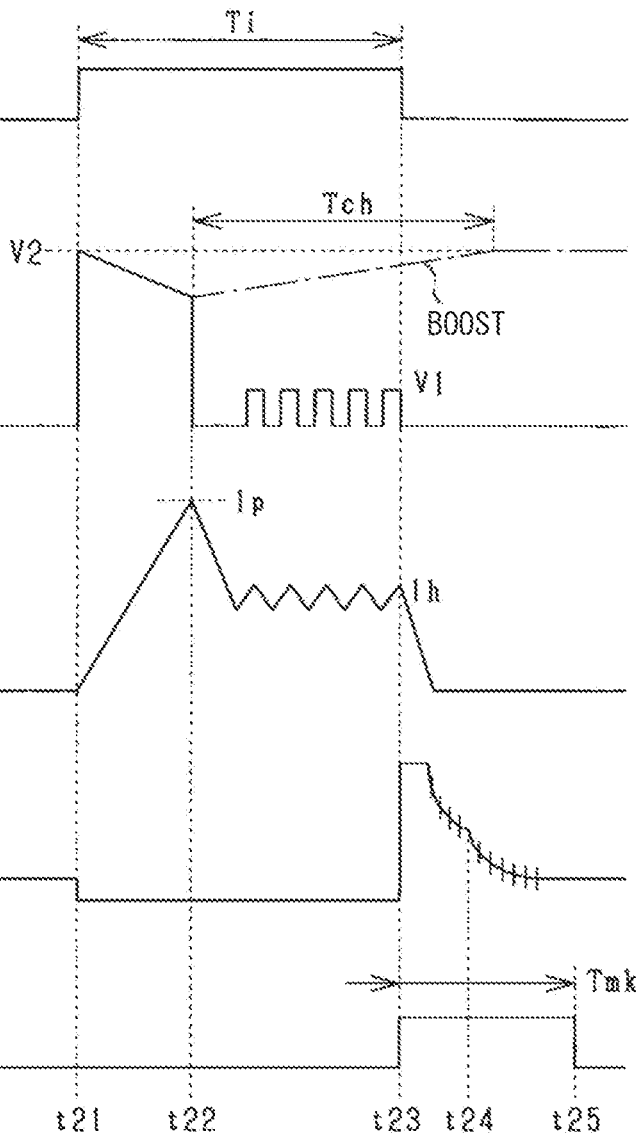
FIG. 28 is a time chart for describing a boost mask period.

Thereafter, in step S104a, a boost mask period that is a period for restricting the boosting operation in the high-voltage power supply 55 is set. Details thereof will be described below with reference to a time chart of FIG. 28. In FIG. 28, at timing t21, the high voltage V2 is applied to the fuel injection valve 30 accompanying the rise of the energization pulse, and the drive current flows accordingly. After timing t22 when the drive current reaches the peak current Ip, the hold current Ih flows due to the intermittent application of the low voltage V1, and the energization pulse is lowered at timing t23. At timing t23, the negative terminal voltage Vm of the fuel injection valve 30 changes, and the valve closing timing of the fuel injection valve 30 is obtained on the basis of the voltage change when the valve body 34 reaches the valve closing position in the voltage waveform (timing t24).

Here, in the period from t21 to t22 in which the high voltage V2 is applied, the high voltage V2 applied by the high-voltage power supply 55 gradually decreases. Accordingly, after the application of the high voltage V2 is finished, the high-voltage power supply 55 performs boosting processing (charging processing). In this case, in a configuration using a boosting chopper circuit that includes a reactor and a switch as the high-voltage power supply 55 and boosts the battery voltage by the switching operation of the switch, for example, it is conceivable that the boosting is performed in the boosting period Tch from the timing t22 when the application of the high voltage V2 ends, and the boosting is performed by a high-speed switching operation of the switch in the boosting period Tch. In this configuration, a voltage fluctuation according to the switching frequency overlaps on the negative terminal voltage Vm, and as a result, there is a concern that detection accuracy of the negative terminal voltage Vm decreases.

Accordingly, in the present embodiment, at least the period from the lowering of the energization pulse to the elapse of the predetermined time is set as the boost mask period, and the boosting operation in the high-voltage power supply 55 is prohibited during the boost mask period. In FIG. 28, a period from timing t23 when the pulse is off to timing t25 when the predetermined time Tmk elapses is set as the mask period. In this case, after timing t25, the boosting by the high-voltage power supply 55 is started.

Figure 29A:
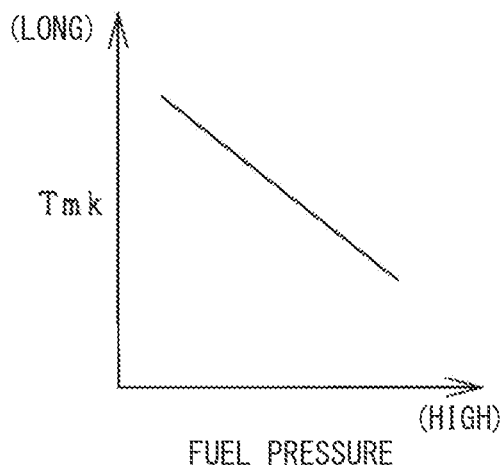
FIG. 29A is a diagram illustrating a relationship between the fuel pressure and a predetermined time Tmk.
Figure 29B:
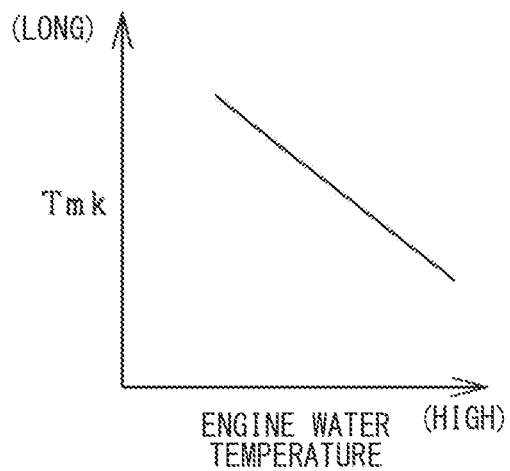
FIG. 29B is a diagram illustrating a relationship between an engine water temperature and the predetermined time Tmk.

The predetermined time Tmk may be variably set on the basis of the fuel pressure, the temperature of the fuel injection valve 30, and the like. For example, the predetermined time Tmk is preferably set on the basis of the fuel pressure using the relationship of FIG. 29A. The predetermined time Tmk is preferably set on the basis of the engine water temperature correlated with the temperature of the fuel injection valve 30 using the relationship of FIG. 29B. According to FIGS. 29A and 29B, the predetermined time Tmk is set in consideration of that a valve closing response of the fuel injection valve 30 is faster as the fuel pressure is higher or the engine water temperature is higher.

The mask period is only required to be determined by a period including at least from the lowering of the energization pulse to the voltage inflection point of the negative terminal voltage Vm. A timing before timing t23 may be set as the start timing of the mask period. For example, timing t22 when the application of the high voltage V2 is stopped may be set as the start timing of the mask period.

Returning to the description of FIG. 27, when either of steps S102 and S103 is negative, the processing proceeds to step S105, and an energization pattern in an abnormal mode is set as the energization pattern of the fuel injection valve 30. The energization pattern in this abnormal mode will be described below.

In the fuel injection valve 30, the normal fuel injection is not performed unless the valve body 34 is normally opened and lifted along with the start of energization. For example, when the pressure (fuel pressure) of the fuel supplied to the fuel injection valve 30 is equal to or more than the pressure threshold Thp, it is conceivable that the force pressing the valve body 34 toward the valve closing side in the fuel injection valve 30 becomes excessively large, and the fuel injection becomes abnormal. Therefore, in the present embodiment, as the energization pattern in the abnormal mode, after the drive current rises to the peak current Ip after the start of energization, the high voltage V2 is repeatedly applied multiple times by the high-voltage power supply 55, and the valve opening energy of the fuel injection valve 30 is satisfied. In this case, the microcomputer 51 sets the high voltage V2, a peak current Ipx, a hold current Ihx, a high-voltage application period Tap1 in a first stage, and a high-voltage application period Tap2 in a second stage as the energization conditions of the abnormal mode. These values can be variably set according to the fuel pressure, for example.

Figure 30:
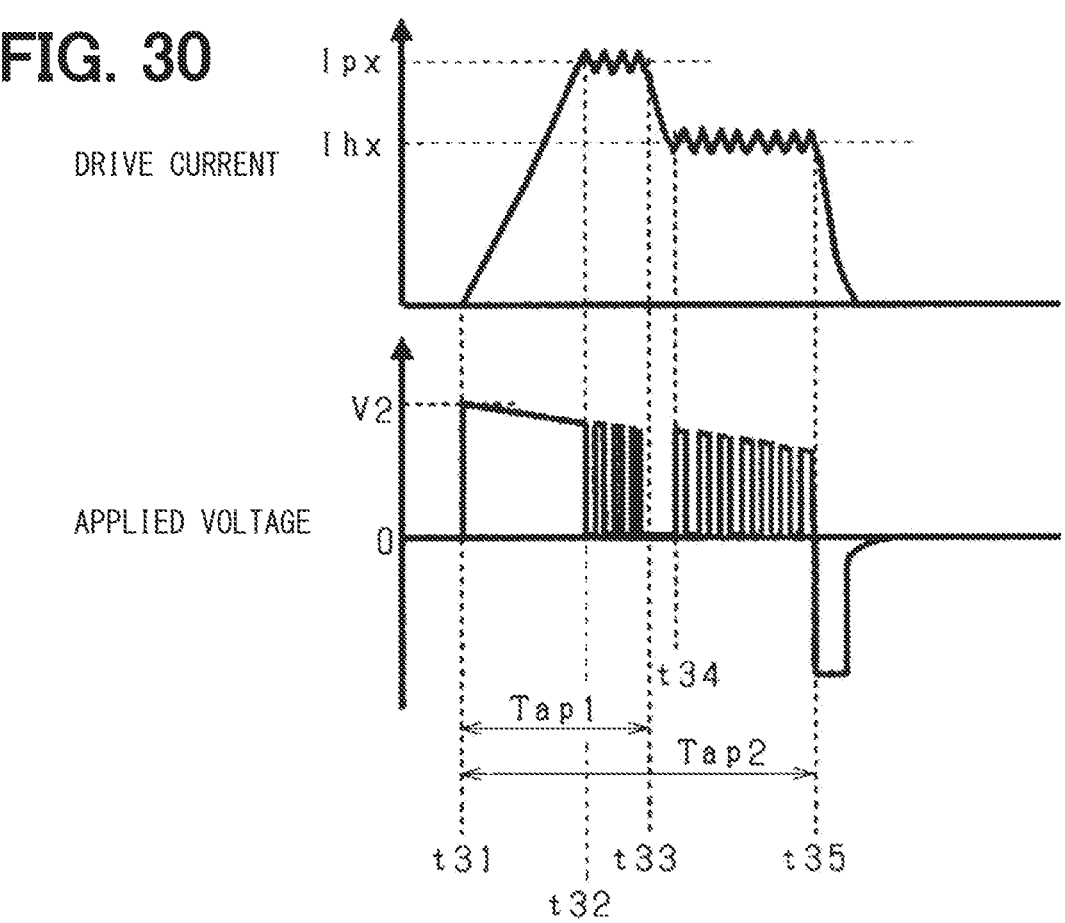
FIG. 30 is a time chart illustrating an energization pattern in an abnormal mode.

FIG. 30 is a time chart illustrating an energization pattern in the abnormal mode. In FIG. 30, at timing t31, the high voltage V2 is applied from the high-voltage power supply 55 to the fuel injection valve 30 accompanying a rise of the energization pulse. Thereafter, when the drive current reaches the peak current Ipx at timing t32, the high voltage V2 of the high-voltage power supply 55 is intermittently applied, so that the drive current is held near the peak current Ipx. This high-voltage application is continued from the start of the energization until timing t33 when the high-voltage application period Tap1 in the first stage elapses.

Thereafter, when the drive current drops to the hold current Ihx at timing t34, the high voltage V2 is intermittently applied again from the high-voltage power supply 55, so that the drive current is held near the hold current Ihx. This high-voltage application is continued from the start of the energization until timing t35 when the high-voltage application period Tap2 in the second stage elapses. At timing t35, the energization pulse is lowered, and the voltage application to the fuel injection valve 30 is stopped.

The energization pattern in the abnormal mode can be achieved by other than the above. For example, the configuration may be such that only the high voltage application in the first stage is executed out of the high voltage applications in the first stage and the second stage. The configuration may be such that the drive current is set as the hold current Ih similar to that of the energization pattern in the normal mode after the high voltage application in the first stage in which the high voltage V2 is intermittently applied is executed by the high-voltage power supply 55. Alternatively, the configuration may be such that the drive current is switched in the order of the hold current Ihx→the hold current Ih after the high-voltage application in the first stage in which the high voltage V2 is intermittently applied is executed by the high-voltage power supply 55.

Figure 31:
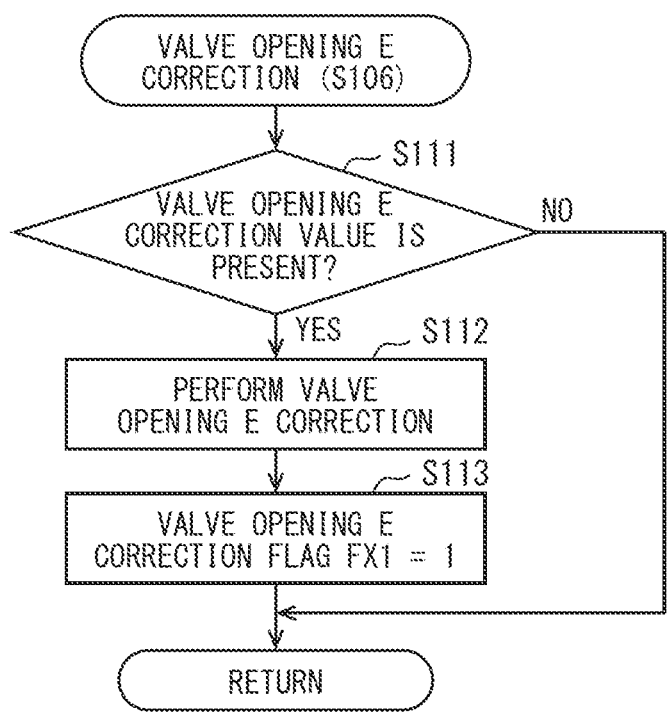
FIG. 31 is a flowchart illustrating valve opening energy correction processing.

Returning to the description of FIG. 27, in step S106, the valve opening energy correction processing using the valve opening energy correction value a is executed. In step S106, a subroutine illustrated in FIG. 31 is called, and the valve opening energy correction is executed in the subroutine. However, details thereof will be described later.

Figure 32:
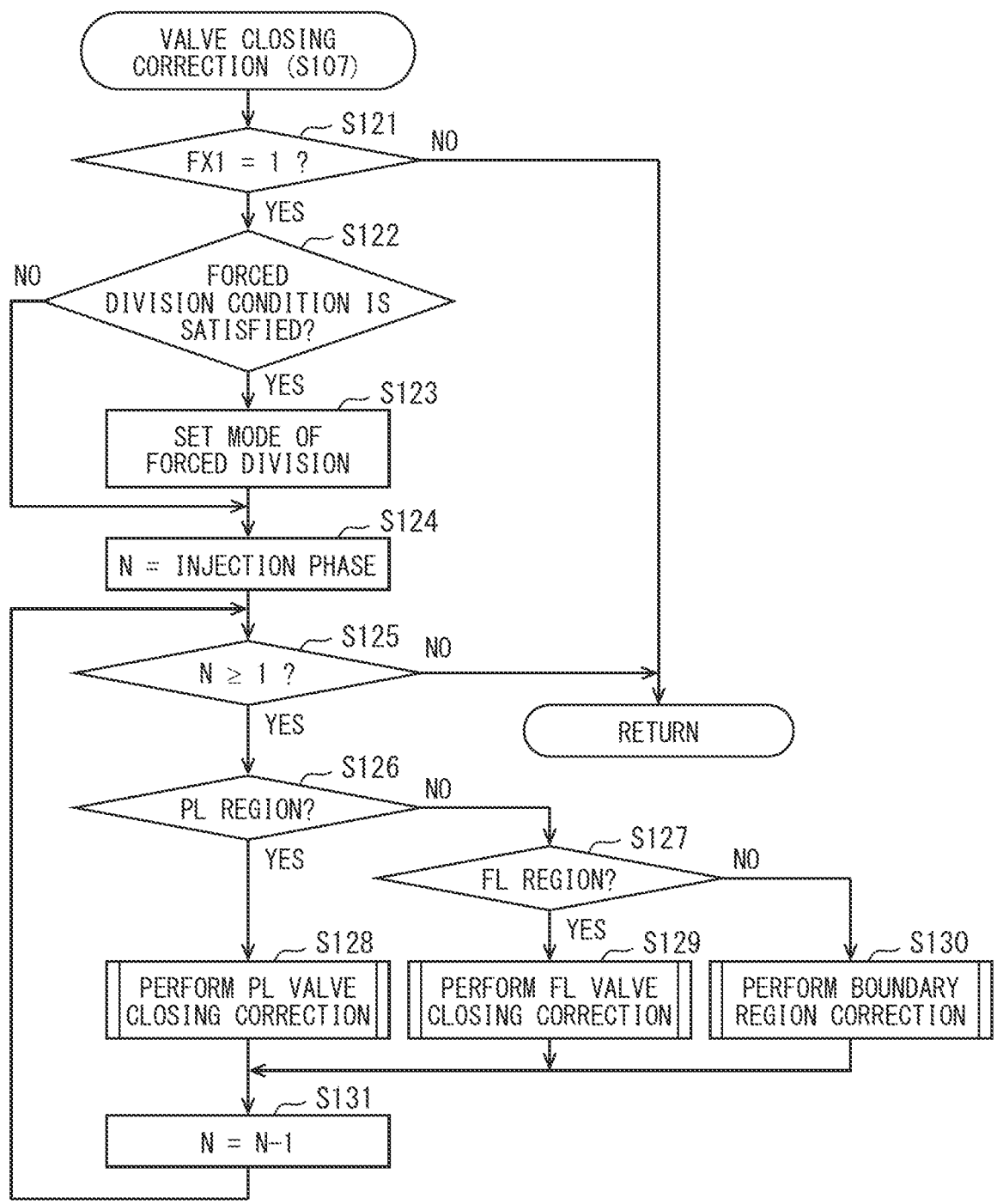
FIG. 32 is a flowchart illustrating valve closing correction processing.

In step S107, valve closing correction processing using the valve closing timing learning value βL is executed. In step S107, a subroutine illustrated in FIG. 32 is called, and the valve closing timing correction is executed in the subroutine. However, details thereof will be described later.

Figure 43:
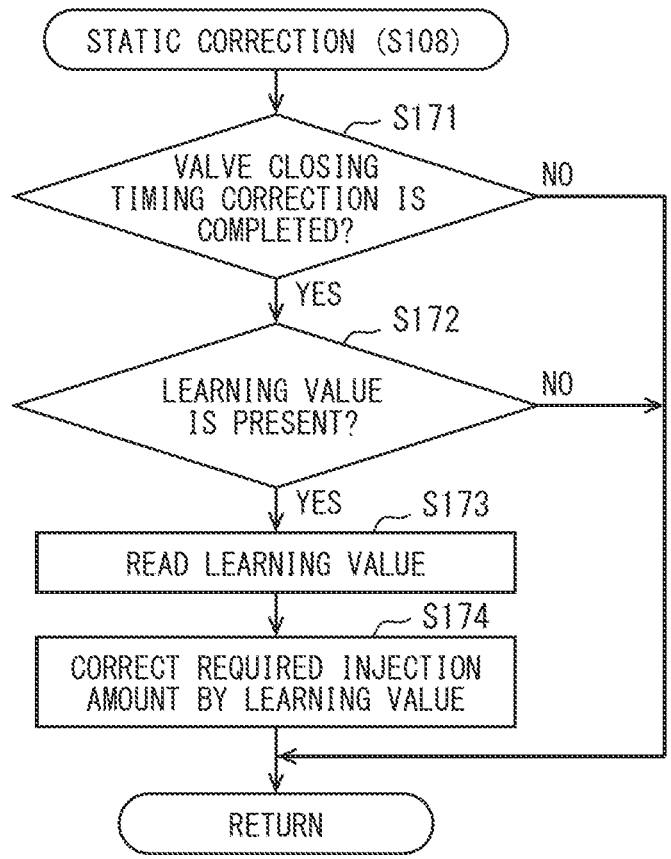
FIG. 43 is a flowchart illustrating static injection amount correction processing.

In step S108, static correction processing using the injection amount learning value γL is executed. In step S108, a subroutine illustrated in FIG. 43 is called, and the static correction is executed in the subroutine. However, details thereof will be described later.

Figure 46:
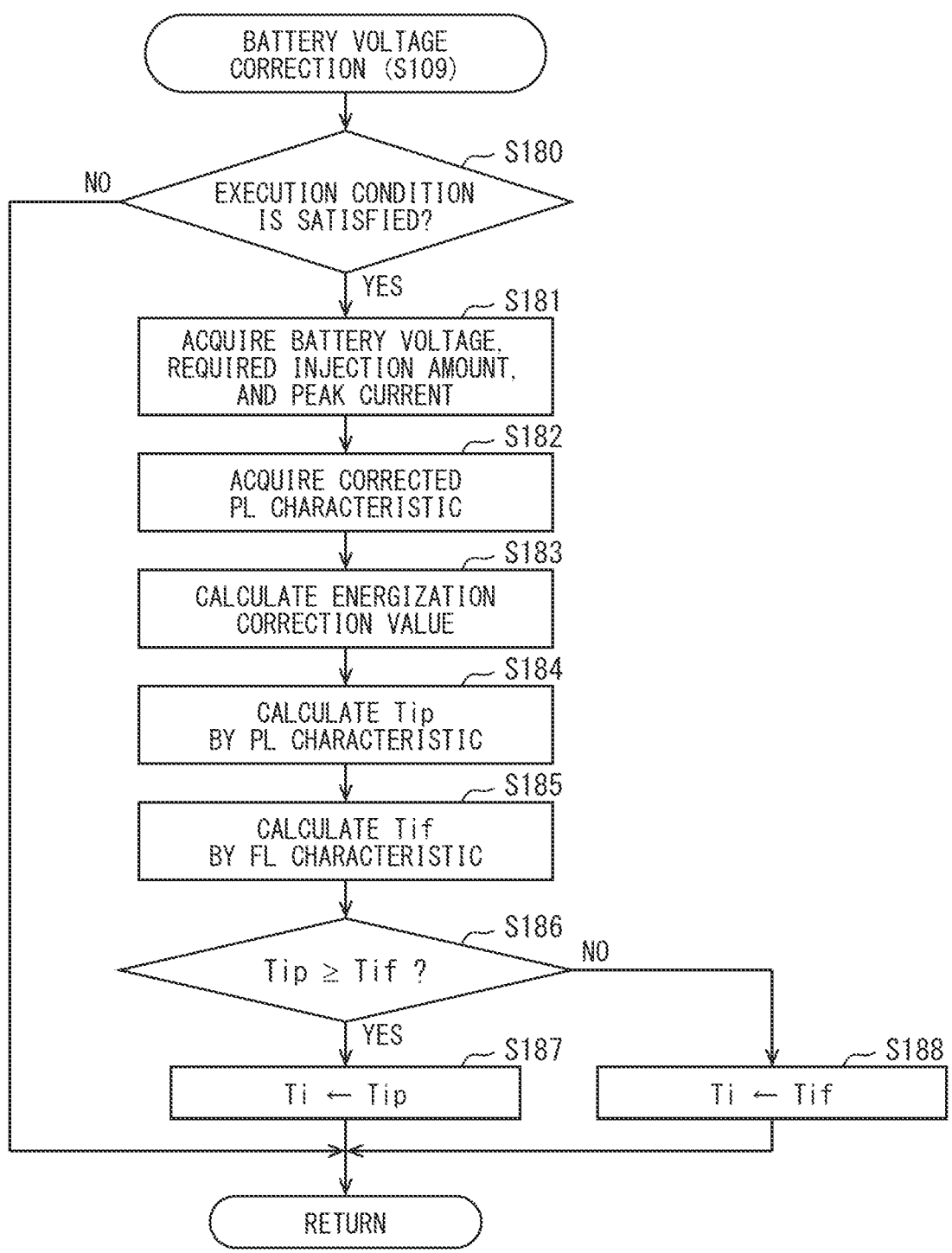
FIG. 46 is a flowchart illustrating battery voltage correction processing.

In step S109, a battery voltage correction processing using a battery voltage is executed. In step S109, a subroutine illustrated in FIG. 46 is called, and the valve closing timing correction is executed in the subroutine. However, details thereof will be described later.

Thereafter, in step S110, the energization pulse is generated as an energization command signal on the basis of the injection amount and the energization time Ti obtained by appropriately executing the various corrections described above, and the energization pulse is output to the drive IC 52.

(Valve Opening Energy Correction Processing)

FIG. 31 is a flowchart illustrating the valve opening energy correction processing executed in step S106 of FIG. 27. In this processing, the microcomputer 51 corrects the high voltage V2 applied at the start of energization using the valve opening energy correction value a.

In FIG. 31, in step S111, the presence or absence of the valve opening energy correction value a is determined. At this time, if the valve opening energy correction value a has already been calculated in the trip at this time, step S111 is affirmative and the processing proceeds to step S112, or if the valve opening energy correction value a has not been calculated, the processing ends as it is. If the valve opening energy correction value a is stored in the backup memory 53 as a learning value, it is determined whether or not the valve opening energy correction value a is stored in the backup memory 53.

In step S112, the high voltage V2 is corrected using the valve opening energy correction value a. Consequently, the deviation in the valve opening energy after the start of energization is compensated. In subsequent step S113, the valve opening energy correction flag FX1 indicating that the valve opening energy correction has been executed is set to one, and then this processing ends. The valve opening energy correction flag FX1 is reset to zero when the vehicle is started (when the IG is turned on), and after the correction of the high voltage V2 by the valve opening energy correction value a is executed, the valve opening energy correction flag FX1 is held in a state of being set to one.

(Valve Closing Correction Processing)

FIG. 32 is a flowchart illustrating the valve closing correction processing executed in step S107 of FIG. 27. In this processing, the microcomputer 51 corrects the energization time Ti using the valve closing timing learning value βL and the characteristic point data (the Ti value and the Q value of the characteristic points Pq1 and Pq2) of the boundary region.

In FIG. 32, in step S121, it is determined whether or not the valve opening energy correction flag FX1 is set to 1. If FX1=1, the processing proceeds to subsequent step S122, or if FX1=0, this processing ends as it is.

In step S122, it is determined whether or not execution conditions of a forced division injection for forcibly dividing the required injection amount into a plurality of parts are satisfied. In the forced division injection, when the required injection amount is larger than the lower limit injection amount of the full lift region, the required injection amount is divided into two stages, and the partial lift injection is executed by the fuel injection in the preceding stage. When the initial learning in the partial lift region is not completed, the partial lift injection by the forced division is executed to complete the initial learning early. Alternatively, when learning after start of traveling (learning for each trip) in the partial lift region is not completed, the partial lift injection by the forcible division is executed so as to complete the learning after the start of traveling early.

Specific implementation conditions include, for example,
  that the partial lift injection has a small influence on the combustion of the fuel in the engine 11, and execution of the partial lift injection is permitted (for example, the engine is not in a fail-safe state),
  that it is at the time of single-stage fuel injection, and the required injection amount is equal to or more than a predetermined value (for example, equal to or more than the lower limit injection amount of the full lift region),
  that the start timing of the fuel injection is within a predetermined range (for example, within the intake stroke),
  that a change amount per unit time of the fuel pressure is equal to or less than a predetermined value, and the fuel pressure is in a stable state,
  that a change amount per unit time of the engine load is equal to or less than a predetermined value, and the engine is in a load stable state,
  that a change amount per unit time of the engine rotation speed is equal to or less than a predetermined value, and it is in an engine rotation speed stable state,
  that the engine rotation speed and the engine water temperature are within predetermined ranges, and
  when all the conditions are satisfied, it is determined that the execution conditions of the forced division injection are satisfied. The above execution conditions can be changed, and in short, the configuration may be such that other determination parameters are substituted as long as they are to determine to avoid execution in the transient operating state and not to cause emission deterioration due to the forced division injection.

Figure 33:
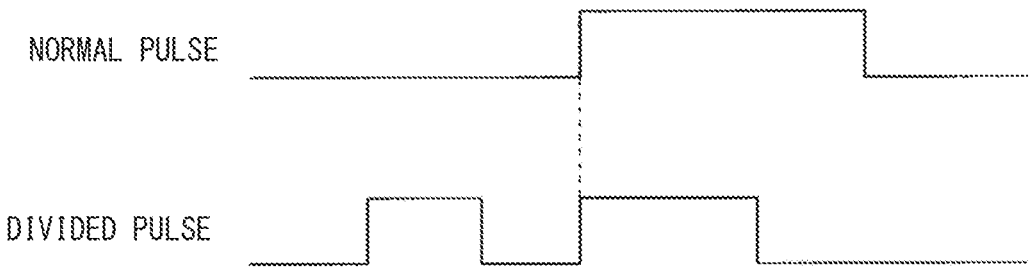
FIG. 33 is a time chart illustrating a normal energization pulse and an energization pulse when a forced division injection is executed.

In a case where the forced division condition is satisfied, the processing proceeds to step S123, and an implementation mode of the forced division is determined. In this case, the injection amount and an injection start timing of a preceding injection and a succeeding injection in the forced division injection are determined. FIG. 33 illustrates, by arranging vertically, the normal energization pulse and the energization pulse when the forced division injection is executed.

In the forced division injection, the predetermined injection amount in the partial lift region is set as the injection amount of the preceding injection, and an injection amount obtained by subtracting the injection amount of the preceding injection from the required injection amount is set as the injection amount of the succeeding injection. The injection amount of the preceding injection is preferably set variably on the basis of the fuel temperature and the fuel pressure.

Figure 34:
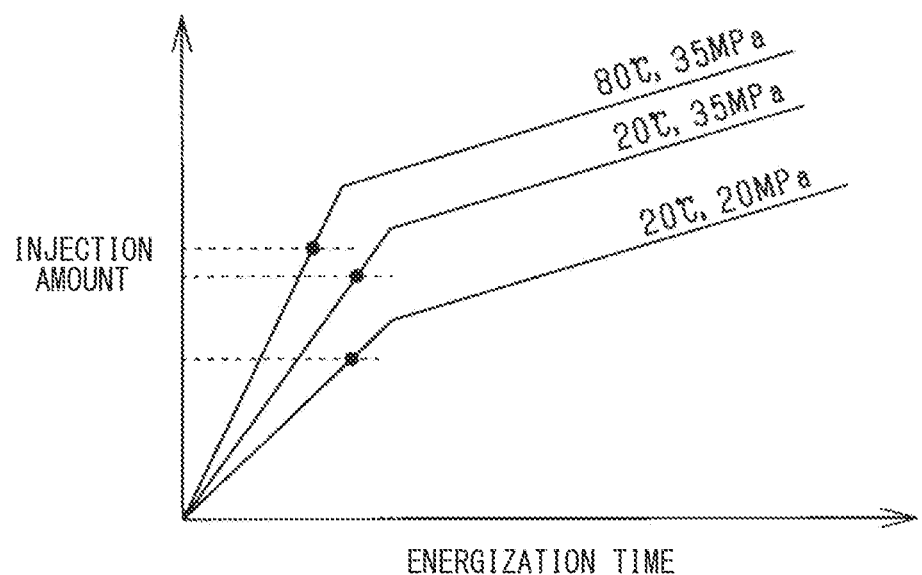
FIG. 34 is a diagram for describing changes in injection amount characteristics due to the fuel temperature and the fuel pressure.
Figure 35A:
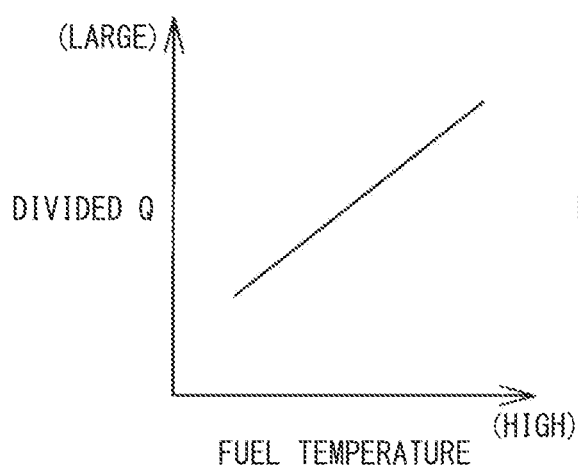
FIG. 35A is a diagram illustrating a relationship between the fuel temperature and a divided injection amount.
Figure 35B:
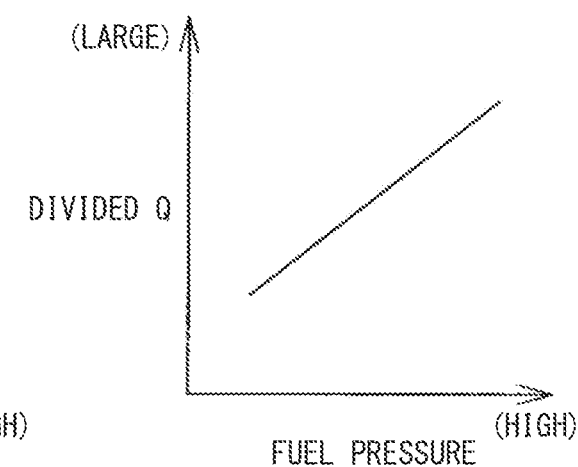
FIG. 35B is a diagram illustrating a relationship between the fuel pressure and the divided injection amount.

As illustrated in FIG. 34, in the partial lift region, the injection amount characteristic changes according to the fuel temperature and the fuel pressure, the injection amount with respect to the energization time increases as the fuel temperature is higher, and the injection amount with respect to the energization time increases as the fuel pressure is higher. In this case, the injection amount range of the partial lift region changes according to the fuel temperature and the fuel pressure. Accordingly, when the preceding injection is performed at a certain point (for example, the central position in the region or the high flow rate position in the region) in the partial lift region, it is desirable to variably set the injection amount of the preceding injection on the basis of at least either the fuel temperature or the fuel pressure. For example, as illustrated in FIG. 35A, when the fuel temperature is high, the injection amount (divided injection amount) of the preceding injection is preferably increased as compared with the case where the fuel temperature is low. As illustrated in FIG. 35B, when the fuel pressure is high, the injection amount (divided injection amount) of the preceding injection is preferably increased as compared with the case where the fuel pressure is low.

In the forced division injection, the injection start timing of the preceding injection is preferably determined on the basis of the engine rotation speed. That is, an advance amount of the preceding injection is set on the basis of the engine rotation speed, and the injection start timing of the preceding injection is determined in consideration of the advance amount. At this time, the injection start timing of the single-stage fuel injection before the division is set as the injection start timing of the succeeding injection, and the timing when the predetermined advance amount determined according to the engine rotation speed is advanced from the injection start timing before the division is set as the injection start timing of the preceding injection.

Figure 36:
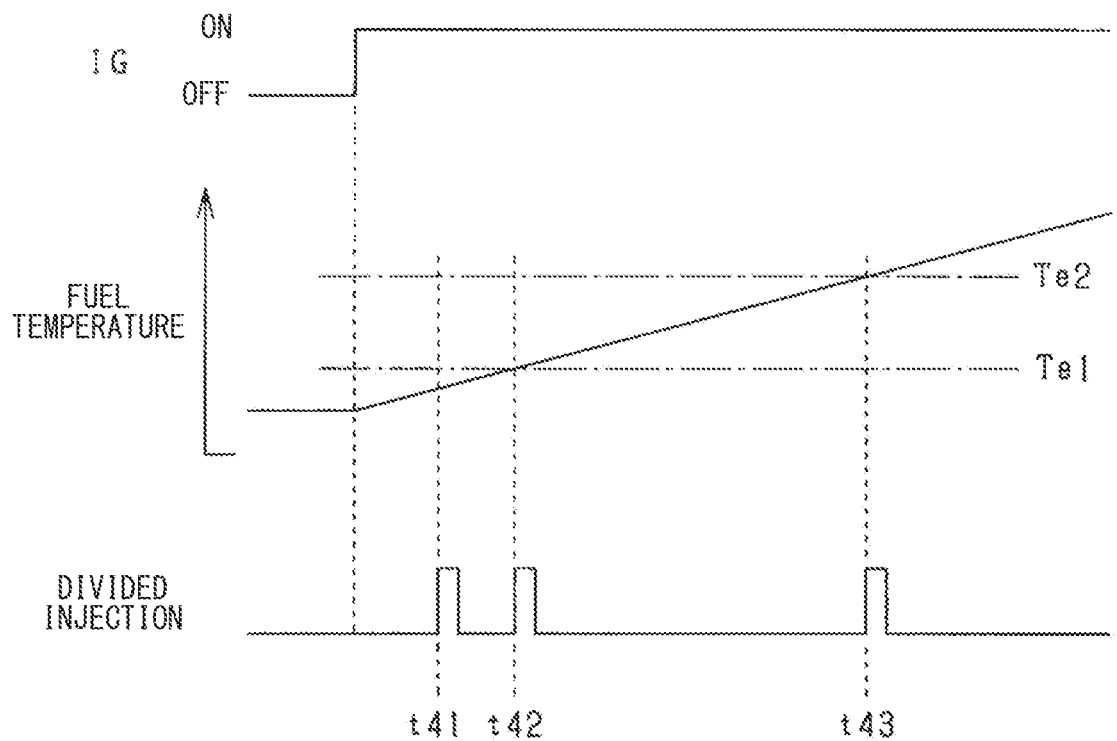
FIG. 36 is a time chart illustrating a fuel temperature change after start of a vehicle and an execution timing of the forced division injection.

The forced division injection is preferably executed in different fuel temperature regions in accordance with an increase in the fuel temperature accompanying the warm-up of the engine 11 after the vehicle is started (after the IG is turned on). Specifically, as illustrated in FIG. 36, the fuel temperature gradually increases after the IG is turned on. In this case, the region of the fuel temperature is divided into three by temperatures Te1 and Te2, and in each temperature region, the forced division injection is appropriately executed in order to learn the valve closing timing learning value βL in the partial lift region. In FIG. 36, the forced division injection is executed at timing t41 when the fuel temperature is less than Te1, at timing t42 when the fuel temperature is Te1 to Te2, and at timing t43 when the fuel temperature is equal to or more than Te2. Each region divided by the temperatures Te1 and Te2 is preferably the same region as a plurality of learning regions in which learning of the valve closing timing learning value βL in the partial lift region is performed. The number of temperature regions in which the forced division injection is executed may be set arbitrary.

Returning to the description of FIG. 32, in step S124, the number of injection stages of the fuel injection at this time is set to N. In this case, when the multi-stage injection that is not the forced division injection is executed, the number of stages of the multi-stage injection is set to N. When the forced division injection is executed, N=1.

Thereafter, in step S125, it is determined whether or not the value of N is 1 or more. If N≥1, the processing proceeds to subsequent step S126. In step S126, it is determined whether or not the required injection amount belongs to the partial lift region, and in step S127, it is determined whether or not the required injection amount belongs to the full lift region. When the forced division injection is executed, the injection amount of the preceding injection corresponds to the required injection amount. If step S126 is affirmative, the processing proceeds to step S128, or if step S127 is affirmative, the processing proceeds to step S129. When both steps S126 and S127 are negative, the processing proceeds to step S130.

Figure 37:
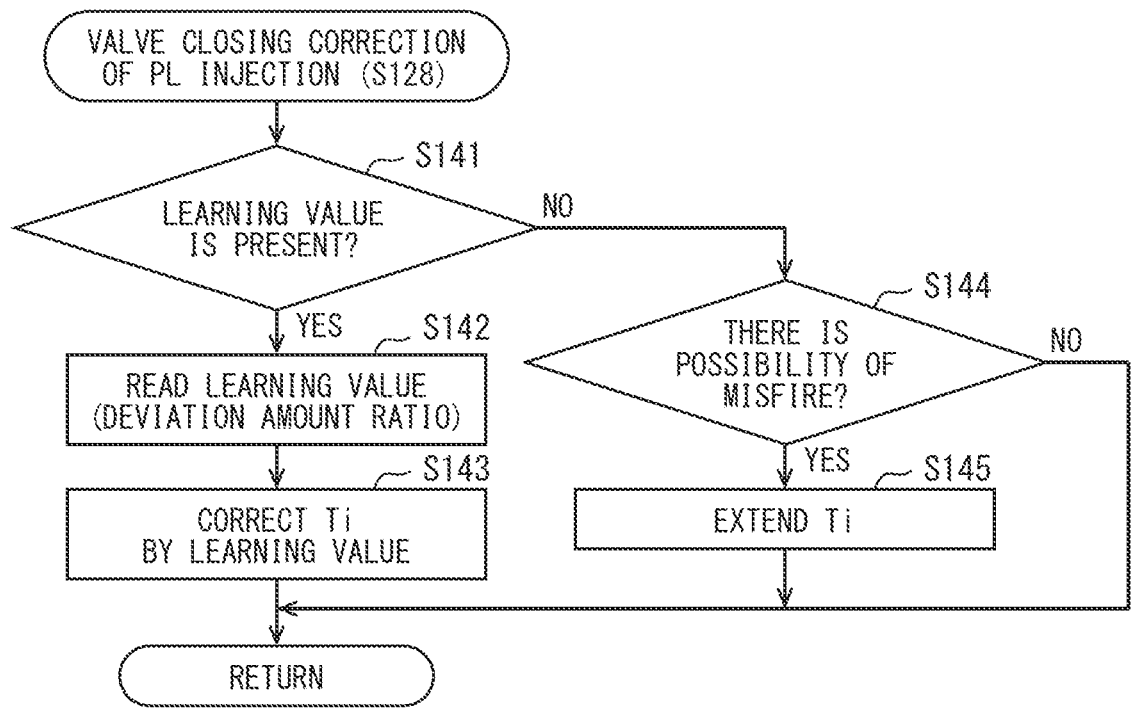
FIG. 37 is a flowchart illustrating the valve closing correction processing of the partial lift injection.

In step S128, the valve closing correction processing of correcting the energization time Ti by the valve closing timing learning value βL of the partial lift injection is executed. In step S128, a subroutine illustrated in FIG. 37 is called, and the valve closing correction in the partial lift injection is executed in the subroutine. However, details thereof will be described later.

Figure 39:
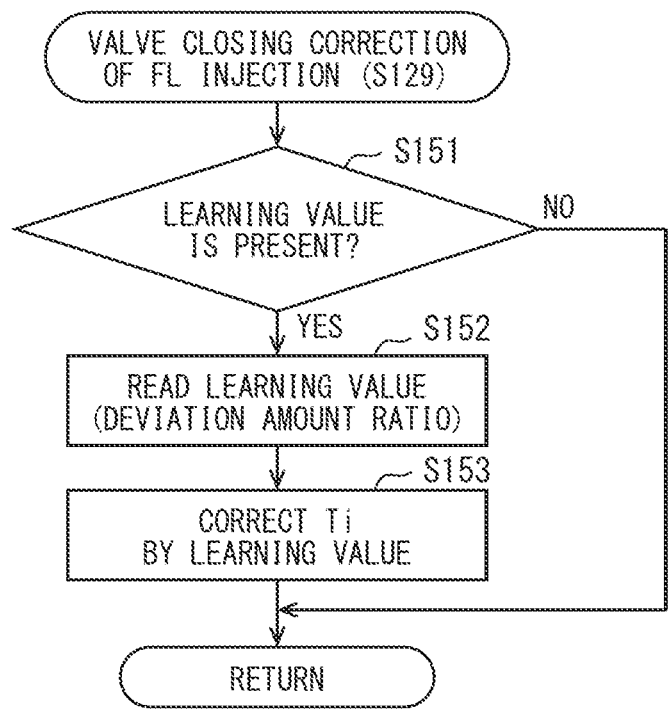
FIG. 39 is a flowchart illustrating the valve closing correction processing of the full lift injection.

In step S129, the valve closing correction processing of correcting the energization time Ti by the valve closing timing learning value βL of the full lift injection is executed. In step S129, a subroutine illustrated in FIG. 39 is called, and the valve closing correction in the full lift injection is executed in the subroutine. However, details thereof will be described later.

Figure 41:
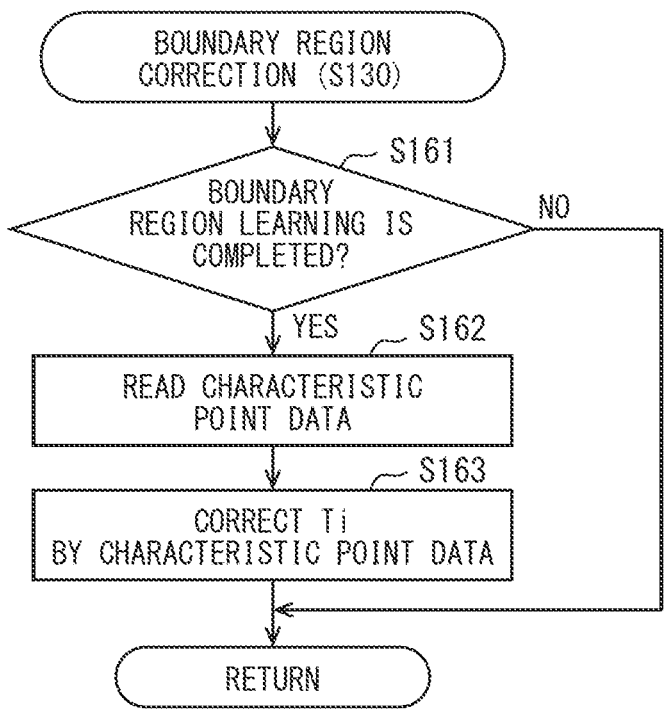
FIG. 41 is a flowchart illustrating boundary region correction processing.

In step S130, boundary region correction processing of correcting the energization time Ti in a boundary region injection is executed using the Ti value and the Q value (see FIG. 24D) of the characteristic points Pq1 and Pq2 obtained as the boundary region learning values. In step S130, a subroutine illustrated in FIG. 41 is called, and the valve closing correction is executed for the fuel injection in the boundary region in the subroutine. However, details thereof will be described later.

Thereafter, in step S131, N is subtracted by one, and the processing returns to step S125. As described above, the processing in and after step S125 is executed. By repeatedly executing steps S125 to S131, correction by the learning values (the valve closing timing learning value βL or the Ti value and the Q value of the characteristic points Pq1 and Pq2) is appropriately executed for each injection corresponding to the number of injection stages in the fuel injection cylinder at this time.

(Valve Closing Correction Processing of Partial Lift Injection)

FIG. 37 is a flowchart illustrating the valve closing correction processing of the partial lift injection executed in step S128 of FIG. 32. In this valve closing correction processing, at the time of executing the partial lift injection, the energization time Ti is corrected on the basis of the valve closing timing learning value βL, and thus the deviation in the valve closing timing in the fuel injection valve 30 is compensated.

In FIG. 37, in step S141, it is determined whether or not there exists the valve closing timing learning value βL that can be used to correct the energization time Ti in the partial lift injection at this time. Specifically, it is determined whether or not the valve closing timing learning value βL of the learning region corresponding to the fuel temperature and the fuel pressure at the current time point is stored. In this case, if some kind of learning value (valve closing timing learning value βL) is stored in all the learning regions for the partial lift injection by execution of the initial learning, step S141 is affirmative. Alternatively, the configuration may be such that if the learning value (valve closing timing learning value βL) is updated in the learning region corresponding to the conditions of the fuel temperature and the fuel pressure at the current time point by executing learning for each trip after the initial learning, step S141 is affirmative. When step S141 is affirmative, the processing proceeds to step S142.

In step S142, the valve closing timing learning value βL is read from the learning region corresponding to the conditions of the fuel temperature and the fuel pressure at the current time point. As described above, the valve closing timing learning value βL at the time of the partial lift injection is obtained by calculating the characteristic deviation with respect to the nominal characteristic as the deviation amount ratio.

Thereafter, in step S143, the correction of the energization time Ti by the valve closing timing learning value βL (deviation amount ratio) is executed. This correction will be described in detail below.

Figure 38:
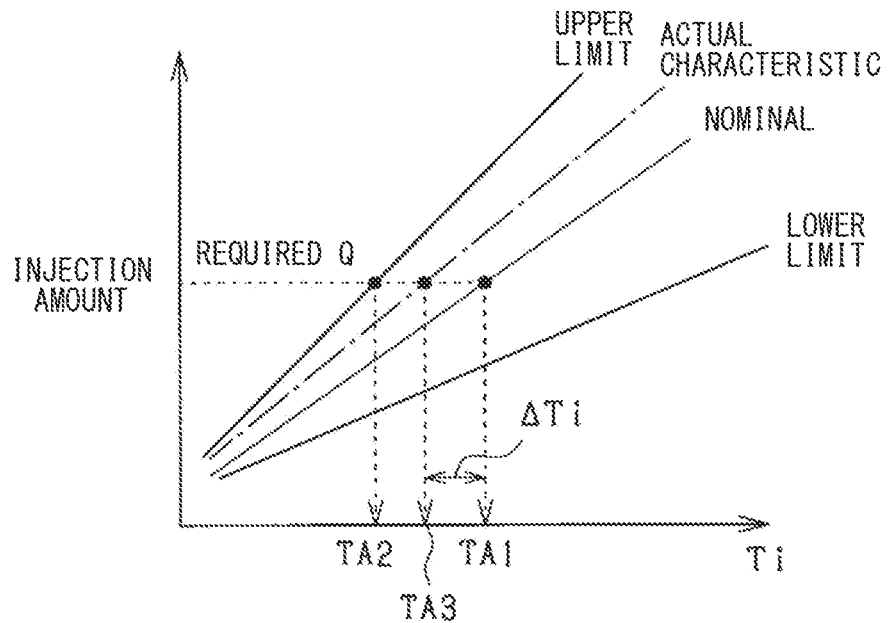
FIG. 38 is a diagram illustrating injection amount characteristic data of the partial lift injection.

FIG. 38 is a diagram illustrating injection amount characteristic data defining the relationship between the energization time Ti and the fuel injection amount in the partial lift injection, and this characteristic data is stored in the memory in the ECU 50 as, for example, map data. In FIG. 38, the nominal characteristic, the upper limit characteristic, and the lower limit characteristic as the reference characteristics are defined. These nominal characteristic, upper limit characteristic, and lower limit characteristic are model values determined by adaptation or the like, and are preferably determined including environmental variations such as individual differences and temperatures. The nominal characteristic, the upper limit characteristic, and the lower limit characteristic are preferably determined such that the gain (inclination) of the fuel injection amount with respect to the energization time Ti is different.

The microcomputer 51 sets the energization time Ti corresponding to the required injection amount at this time as a nominal energization time TA1 in the nominal characteristics of the injection amount characteristic data in FIG. 38. The microcomputer 51 calculates a limit energization time TA2 corresponding to either the upper limit characteristic or the lower limit characteristic on the basis of the required injection amount each time using the upper limit characteristic or the lower limit characteristic in the injection amount characteristic data in FIG. 38. At this time, for example, the limit energization time TA2 on the upper limit side is calculated using the upper limit characteristic. A correction time ΔTi is calculated by multiplying the difference (=TA2−TA1) between the nominal energization time TA1 and the limit energization time TA2 by the deviation amount ratio that is the valve closing timing learning value βL. The correction time ΔTi corresponds to an energization time deviation width with respect to the nominal characteristic. In this case, if the actual characteristic deviates to the upper limit side with respect to the nominal characteristic, a correction value (negative correction value) for correction to reduce the energization time Ti is calculated as the correction time ΔTi, and if the actual characteristic deviates to the lower limit side with respect to the nominal characteristic, a correction value (positive correction value) for correction to increase the energization time Ti is calculated as the correction time ΔTi.

The microcomputer 51 calculates the energization time TA3 after correction from the nominal energization time TA1 and the correction time ΔTi. On the basis of the energization time TA3, injection amount control of the partial lift injection is executed.

The above-described correction method of the energization time Ti using the nominal characteristic and the upper and lower limit characteristics is an example, and the intermediate variable and the like can be arbitrarily changed as long as it is a configuration such that the energization time can be corrected using the nominal characteristic and the upper and lower limit characteristics.

In a case where step S141 is negative, it is determined in step S144 whether or not the fuel injection at this time (partial lift injection) has a possibility that misfire occurs due to the injection amount deviation. For example, when the fuel injection at this time is the partial lift injection in the vicinity of the upper limit including the upper limit injection amount in the partial lift region (relatively large amount of partial lift injection), step S144 is preferably negative, and when the fuel injection at this time is the partial lift injection other than the vicinity of the upper limit (relatively small amount of partial lift injection), step S144 is preferably affirmative. However, the determination processing of step S144 may be deleted, and it may be determined that the fuel injection at this time is the fuel injection that has a possibility of misfire due to the injection amount deviation based on the fact that the fuel injection at this time is the partial lift injection. When step S144 is affirmative, the processing proceeds to step S145, or when step S144 is negative, this processing ends as it is.

In step S145, the energization time Ti of the fuel injection at this time is forcibly extended. Specifically, a predetermined extension time is added to the energization time Ti in the fuel injection at this time (partial lift injection). This extension time is a time for extending the energization time Ti of the fuel injection at this time to a region where there is no possibility of misfire even if the injection amount deviation has occurred, in other words, even in a situation where deviation correction of the valve closing timing is not performed. The extension time may be a predetermined time set in advance, or may be a time variably set by the fuel pressure, for example.

Alternatively, when the fuel injection at this time (partial lift injection) is one injection included in the multi-stage injection, the energization time Ti of the fuel injection at this time may be forcibly extended by adding the energization time Ti of another injection included in the multi-stage injection to the energization time Ti of the fuel injection at this time (partial lift injection). The configuration may be such that, in step S145, instead of forcibly extending the energization time Ti of the fuel injection at this time, the injection amount of the fuel injection at this time is forcibly increased.

(Valve Closing Correction Processing of Full Lift Injection)

FIG. 39 is a flowchart illustrating the valve closing correction processing of the full lift injection executed in step S129 of FIG. 32. In the valve closing correction processing, at the time of executing the full lift injection, the energization time Ti is corrected on the basis of the valve closing timing learning value βL, and thus the deviation in the valve closing timing in the fuel injection valve 30 is compensated.

In FIG. 39, in step S151, it is determined whether or not there exists the valve closing timing learning value βL that can be used to correct the energization time Ti in the full lift injection at this time. Specifically, it is determined whether or not the valve closing timing learning value βL of the learning region corresponding to the fuel temperature and the fuel pressure at the current time point is stored. In this case, if some kind of learning value (valve closing timing learning value βL) is stored in all the learning regions for the full lift injection by the execution of the initial learning, step S151 is affirmative. Alternatively, the configuration may be such that if the learning value (valve closing timing learning value βL) is updated in the learning region corresponding to the conditions of the fuel temperature and the fuel pressure at the current time point by executing learning for each trip after the initial learning, step S151 is affirmative. When step S151 is affirmative, the processing proceeds to step S152, or when step S151 is negative, this processing ends.

In step S152, the valve closing timing learning value βL is read from the learning region corresponding to the conditions of the fuel temperature and the fuel pressure at the current time point. As described above, the valve closing timing learning value βL at the time of the full lift injection is calculated by using the characteristic deviation with respect to the nominal characteristic as the deviation amount.

Thereafter, in step S153, the correction of the energization time Ti is executed by the valve closing timing learning value βL (deviation amount). This correction will be described in detail below.

Figure 40:
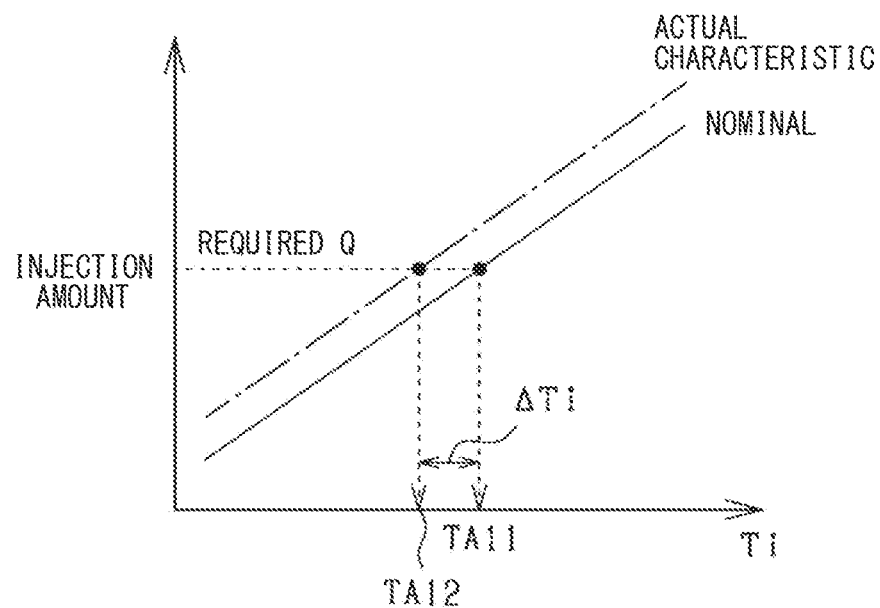
FIG. 40 is a diagram illustrating the injection amount characteristic data of the full lift injection.

FIG. 40 is a diagram illustrating injection amount characteristic data that defines the relationship between the energization time Ti and the fuel injection amount in the full lift injection, and this characteristic data is stored in the memory in the ECU 50 as, for example, map data. In FIG. 40, the nominal characteristic as the reference characteristic is defined.

In the nominal characteristic of the injection amount characteristic data in FIG. 40, the microcomputer 51 sets the energization time Ti corresponding to the required injection amount at this time as the nominal energization time TA11. The microcomputer 51 sets the valve closing timing learning value βL (deviation amount) as the correction time ΔTi. The correction time ΔTi corresponds to the energization time deviation width with respect to the nominal characteristic. In this case, if the actual characteristic deviates to a side where the injection amount is excessive with respect to the nominal characteristic, the correction time ΔTi is used as the negative correction value, and if the actual characteristic deviates to a side where the injection amount is insufficient with respect to the nominal characteristic, the correction time ΔTi is used as the positive correction value. The microcomputer 51 calculates the energization time TA12 after correction by adding the correction time ΔTi to the nominal energization time TA11. On the basis of the energization time TA12, the injection amount control of the partial lift injection is executed.

(Injection Characteristic Correction Processing of Boundary Region)

FIG. 41 is a flowchart illustrating the boundary region correction processing executed in step S130 of FIG. 32. In this correction processing, at the time of executing the boundary region injection, the energization time Ti is corrected on the basis of the characteristic point data (the Ti value and the Q value of the characteristic points Pq1 and Pq2) of the boundary region, and thus the deviation in the valve closing timing in the fuel injection valve 30 is compensated.

In FIG. 41, in step S161, it is determined whether or not there exists the Ti value and the Q value of the characteristic points Pq1 and Pq2 as the boundary region learning values at the time of the fuel injection in the boundary region. When step S161 is affirmative, the processing proceeds to step S162, or when step S161 is negative, this processing ends. The configuration may be such that step S161 is affirmed when the Ti value and the Q value of at least the characteristic point Pq1 exist among the characteristic points Pq1 and Pq2.

In step S162, the Ti value and the Q value of the characteristic points Pq1 and Pq2 and the Ti value and the Q value of the characteristic points W1 and W2 are read as the characteristic point data. In subsequent step S163, the correction of the energization time Ti is executed using the characteristic point data read in step S162. This correction will be described in detail below.

Figure 42:
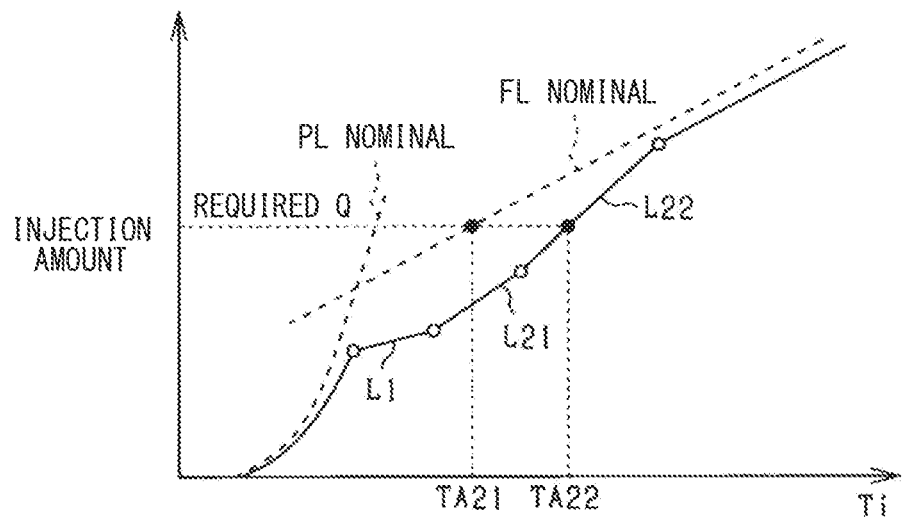
FIG. 42 is a diagram illustrating the injection amount characteristic data in the boundary region.

FIG. 42 is a diagram illustrating injection amount characteristic data in the boundary region, and in the diagram, the nominal characteristic of the partial lift injection and the nominal characteristic of the full lift injection are indicated by broken lines as reference characteristics. Actual injection characteristics in the partial lift region, the full lift region, and the boundary region are indicated by solid lines. The actual characteristics indicated by the solid lines are characteristic lines L1, L21, L22 obtained by linearly complementing the four characteristic points Pq1 and Pq2, and W1 and W2.

In the nominal characteristics of the full lift injection in FIG. 42, the microcomputer 51 sets the energization time Ti corresponding to the required injection amount at this time as the nominal energization time TA21. The microcomputer 51 calculates the energization time TA22 corresponding to the required injection amount as the energization time Ti after correction using the characteristic line L22. The energization time TA22 corresponds to an energization time in which the injection amount deviation in the boundary region is compensated. The injection amount control in the boundary region is executed on the basis of the energization time TA22.

(Correction Processing of Static Injection Amount)

FIG. 43 is a flowchart illustrating static injection amount correction processing executed in step S108 of FIG. 27. In this correction processing, the required injection amount is corrected by the injection amount learning value γL, and thus a static injection amount deviation in the fuel injection valve 30 is compensated.

In FIG. 43, in step S171, it is determined whether or not it is a situation that the valve closing timing correction is being executed, that is, a situation that the energization time correction by the valve closing timing learning value βL or the energization time correction in the boundary region is being executed.

In step S172, it is determined whether or not there exists the injection amount learning value γL usable for the static injection amount correction in the fuel injection at this time. Specifically, it is determined whether or not the injection amount learning value γL of the learning region corresponding to the fuel temperature and the fuel pressure at the current time point is stored. If both of steps S171 and S172 are affirmative, the processing proceeds to step S173, or if either of steps S171 and S172 is negative, the processing ends.

In step S173, the injection amount learning value γL is read from the learning region corresponding to the conditions of the fuel temperature and the fuel pressure at the current time point. Thereafter, in step S174, the correction of the required injection amount is executed by the injection amount learning value γL. At this time, the injection amount learning value γL is added to the required injection amount, and a result of the addition is set as the required injection amount after correction.

(Battery Voltage Correction Processing)

At the time of the fuel injection, by executing the valve opening energy correction, the valve closing timing correction, and the static injection amount correction described above, the fuel injection control with high accuracy becomes possible, but when the battery voltage decreases, it is conceivable that the injection amount variation occurs due to the influence. The battery voltage is a voltage corresponding to the low voltage V1 of the low-voltage power supply 54. Here, the injection amount variation due to the decrease in the battery voltage will be described.

Figure 44:
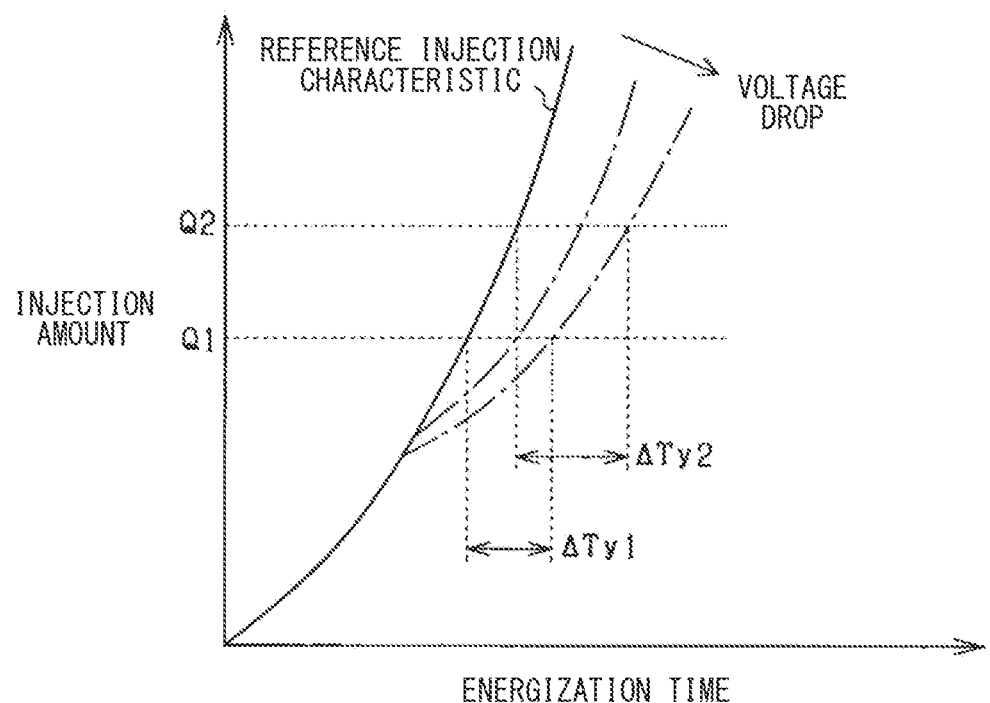
FIG. 44 is a diagram for describing an injection amount variation due to a decrease in a battery voltage.

In FIG. 44, the solid line indicates the injection amount characteristic (reference injection characteristic) as a reference in the partial lift region, and when the battery voltage decreases, the injection amount deviation occurs on a side where the injection amount decreases (low flow rate side) with respect to the reference injection characteristic as indicated by alternate long and short dash lines. In this case, the inclination of the injection amount with respect to the energization time decreases and the degree of the injection amount deviation increases as the degree of decrease in the battery voltage increases. Here, the reference injection characteristic is the injection amount characteristic in which correction of the characteristic deviation by the valve opening energy correction, the valve closing timing correction, and the static injection amount correction is performed in the partial lift region.

When the fuel injection amount is affected by decrease in the battery voltage, the inclination of the fuel injection amount changes according to the degree of the decrease in the battery voltage, and thus the degree of the injection amount variation differs according to the fuel injection amount or the energization time each time. Based on the fuel injection amount, for example, an injection amount Q1 and an injection amount Q2 in FIG. 44 are different in the deviation in the energization time with respect to the reference characteristic, and the time deviation is ΔTy1 at the injection amount Q1 and the time deviation is ΔTy2 at the injection amount Q2 (ΔTy1<ΔTy2). Accordingly, when the battery voltage correction is performed, it is desirable to consider the required injection amount or the energization time.

Figure 45:
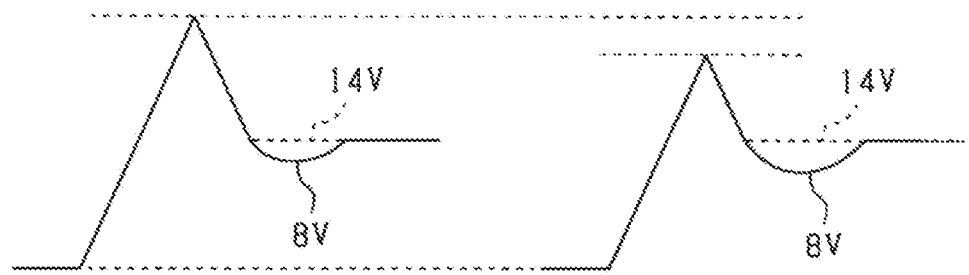
FIG. 45 is a diagram for describing a state of a current drop immediately after stop of application of a high voltage.

When the battery voltage decreases, a drop of the drive current immediately after the stop of application of the high voltage V2 is affected. FIG. 45 is a diagram for describing that a drop amount of the drive current immediately after the stop of application of the high voltage V2 differs depending on the battery voltage when the peak current Ip differs in magnitude. In FIG. 45, (a) illustrates a current waveform when the peak current Ip is relatively high, and (b) illustrates a current waveform when the peak current Ip is relatively low. (a) and (b) of FIG. 45 illustrate waveforms in a state where the battery voltage decreases from 14 V to 8 V, and each illustrate the current drop immediately after the application of the high voltage V2 is stopped is indicated by a solid line and a broken line.

When the battery voltage is 14 V, the drive current is less likely to unintentionally drop excessively after the stop of the application of the high voltage V2 in both cases where the peak current Ip is high and low. On the other hand, when the battery voltage decreases to 8 V, a drop of the drive current easily occurs after the stop of the application of the high voltage V2, and further, comparing the cases where the peak current Ip is high and low, the drop amount at that time differs depending on the peak current Ip. In this case, the degree of decrease in the injection amount increases as the drop amount of the drive current increases. Accordingly, when the battery voltage correction is performed, it is desirable to consider the peak current Ip.

In the fuel injection valve 30, the inductance changes due to the change in the lift amount when the valve body 34 performs the valve opening operation, and accordingly, the current drop occurs immediately after the stop of the application of the high voltage. However, in the long-time injection in which the energization time Ti is long, the influence of the current drop decreases.

FIG. 46 is a flowchart illustrating the battery voltage correction processing executed in step S109 of FIG. 27.

In FIG. 46, in step S180, it is determined whether or not a condition for executing battery voltage correction is satisfied. At this time, when the battery voltage is equal to or less than a predetermined value (for example, 12 V) and the required injection amount or the energization time Ti corresponding thereto is within a predetermined range, it is determined that the execution condition is satisfied. Here, when the energization of the fuel injection valve 30 is ended before the drop of the drive current occurs, or when the energization is performed for a long time beyond the partial lift region, the current drop due to the battery voltage hardly occurs. Thus, the predetermined range is preferably determined in consideration of the fact that occurrence situation of the current drop differs according to the required injection amount and the energization time Ti. In a case where the execution condition of step S180 is satisfied, the processing proceeds to step S181.

In step S181, the battery voltage, the required injection amount, and the peak current Ip at the current time point are acquired. In step S182, the corrected injection amount characteristic subjected to the valve closing timing correction is acquired as the injection amount characteristic in the partial lift region.

Figure 8:
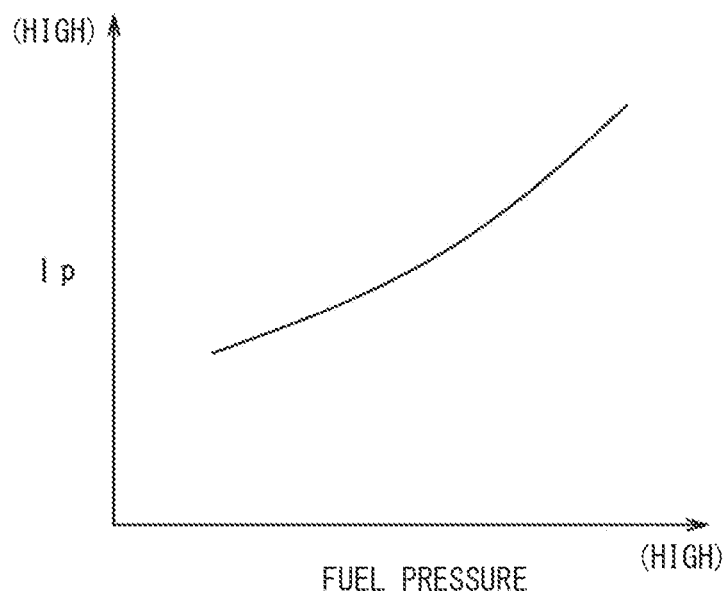
FIG. 8 is a graph illustrating a relationship between a fuel pressure and a peak current Ip.
Figure 47A:
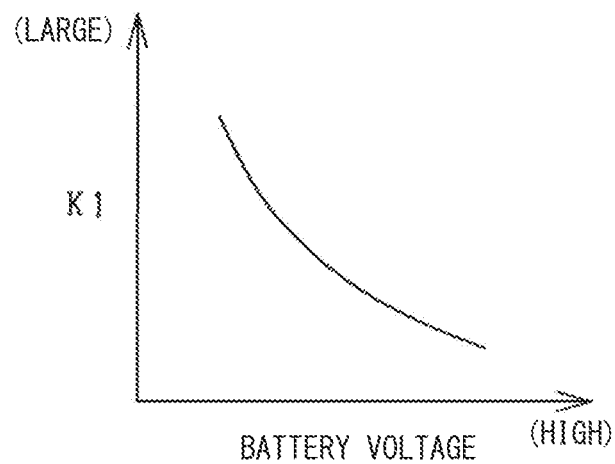
FIG. 47A is a diagram illustrating a relationship between the battery voltage and a correction value K1.
Figure 47B:
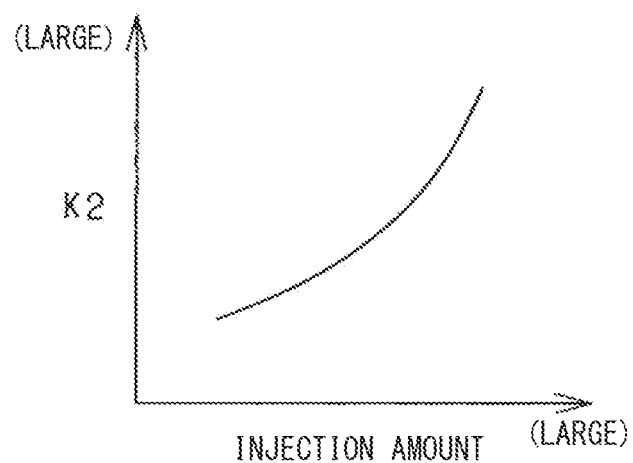
FIG. 47B is a diagram illustrating a relationship between a required injection amount and a correction value K2.
Figure 47C:
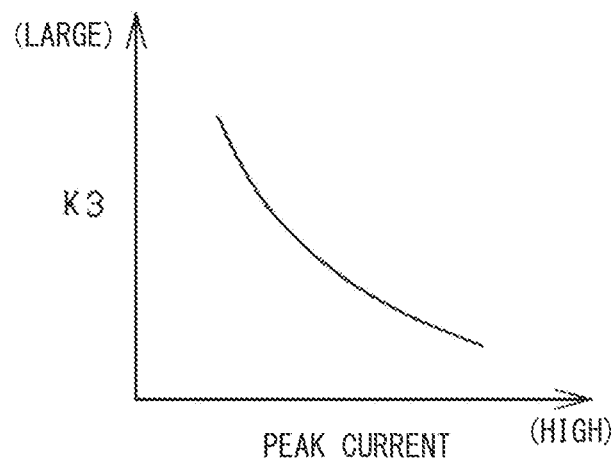
FIG. 47C is a diagram illustrating a relationship between a peak current and a correction value K3.

In step S183, an energization correction value K for correcting the energization time Ti is calculated on the basis of the battery voltage, the required injection amount, and the peak current Ip. Specifically, a correction value K1 is calculated on the basis of the battery voltage using the relationship of FIG. 47A, a correction value K2 is calculated on the basis of the required injection amount using the relationship of FIG. 47B, and a correction value K3 is calculated on the basis of the peak current Ip using the relationship of FIG. 47C. The correction values K1 to K3 are added to calculate the energization correction value K. As illustrated in FIG. 8, the peak current Ip has a correlation with the fuel pressure. Thus, the configuration may be such that instead of calculating the correction value K3 on the basis of the peak current Ip, the correction value K3 is calculated on the basis of the fuel pressure.

Thereafter, in step S184, the energization time Tip on the injection amount characteristic in the partial lift region is calculated. Specifically, the energization time Ti corresponding to the required injection amount at this time or the energization time Ti after correction, in which the correction using the valve closing timing learning value βL of the partial lift injection or the like is performed with respect to the energization time Ti, is corrected by the energization correction value K, and the energization time Tip in the partial lift region is calculated. At this time, the energization time Tip is calculated as an energization time on an actual partial lift characteristic accompanied by a battery voltage decrease.

Thereafter, in step S185, the energization time Tif on the injection amount characteristic in the full lift region is calculated. At this time, since the characteristic deviation due to the battery voltage decrease is less likely to occur in the full lift region as compared to the partial lift region, the battery voltage correction is not performed, and the energization time Tif is calculated using the injection amount characteristic corrected by the valve closing timing correction in the full lift region.

In step S186, it is determined whether or not the energization time Tip (corrected energization time) on the partial lift characteristic is larger than the energization time Tif on the full lift characteristic. If Tip≥Tif, the processing proceeds to step S187, and "Tip" is set as the energization time Ti at this time. If Tip<Tif, the processing proceeds to step S188, and "Tif" is set as the energization time Ti at this time.

Figure 48:
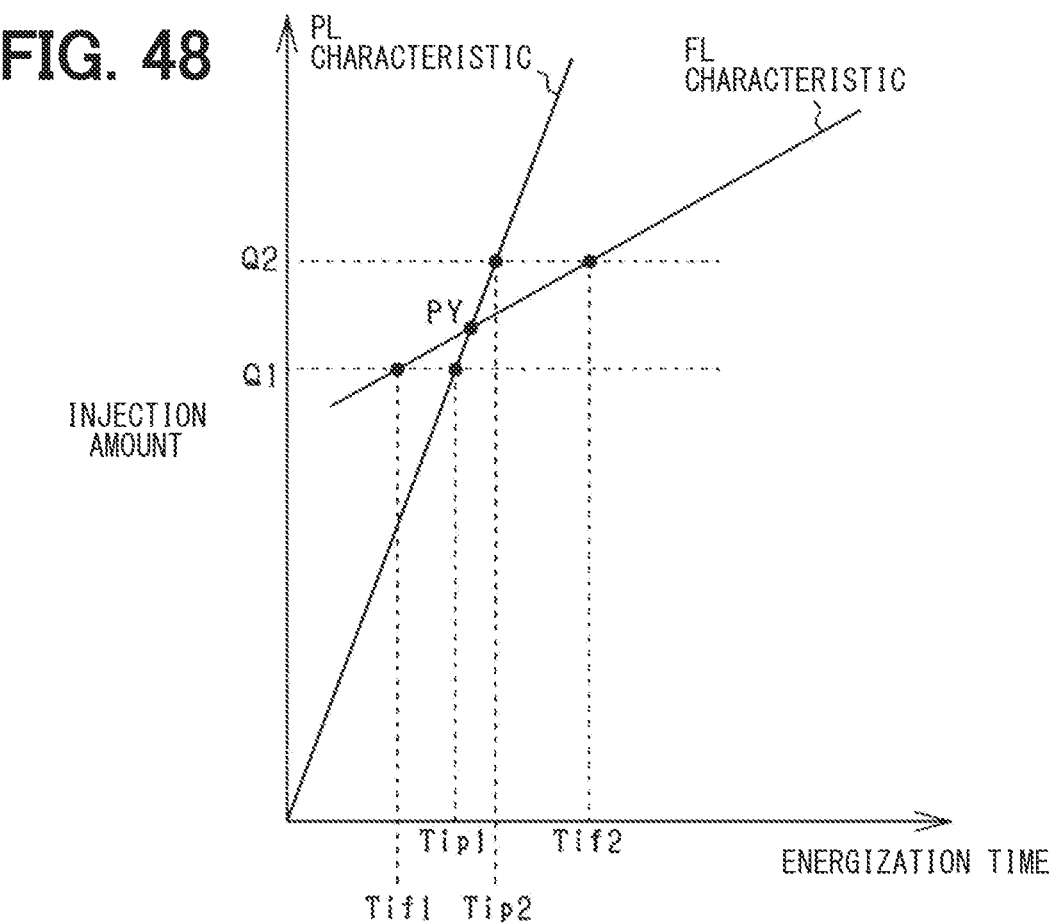
FIG. 48 is a diagram illustrating a partial lift injection region and a full lift injection region.

The processing in steps S186 to S188 will be supplementarily described with reference to FIG. 48. FIG. 48 illustrates the injection amount characteristic of the partial lift region and the injection amount characteristic of the full lift region, and these characteristics intersect at the intersection PY. The partial lift characteristic (PL characteristic) illustrated is a corrected injection amount characteristic in which the valve closing timing correction and the battery voltage correction in the partial lift region are performed, and the full lift characteristic (FL characteristic) illustrated is a corrected injection amount characteristic in which the valve closing timing correction in the full lift region is performed. In the partial lift characteristic, the energization time Ti is "Tip 1" in a case of the injection amount Q1, and the energization time Ti is "Tip 2" in a case of the injection amount Q2. In the full lift characteristic, the energization time Ti is "Tif1" in the case of the injection amount is Q1, and the energization time Ti is "Tif2" in the case of the injection amount is Q2.

Here, in the case of the injection amount Q1, the energization times Ti calculated respectively by the partial lift characteristic and the full lift characteristic are Tip1 and Tif1, and they have a relationship of Tip1>Tif1. In this case, step S186 of FIG. 46 is affirmative, and "Tip 1" is set as the energization time Ti at this time. In the case of the injection amount Q2, the energization times Ti calculated by the partial lift characteristic and the full lift characteristic are Tip2 and Tif2, respectively, and they have a relationship of Tip2<Tif2. In this case, step S186 of FIG. 46 is negative, and "Tif2" is set as the energization time Ti at this time.

In short, the partial lift characteristic and the full lift characteristic intersect at the intersection PY, and the partial lift characteristic is effective on the lower flow rate side than the intersection PY, and the full lift characteristic is effective on the higher flow rate side than the intersection PY. In this case, on the lower flow rate side than the intersection PY, the energization time Tip of the partial lift characteristic is set as the final energization time Ti on the basis of the fact that the energization time Tip on the partial lift characteristic is longer than the energization time Tif on the full lift characteristic. On the higher flow rate side than the intersection PY, the energization time Tif of the full lift characteristic is set as the final energization time Ti on the basis of the fact that the energization time Tif on the full lift characteristic is longer than the energization time Tip on the partial lift characteristic.

According to the above correction processing, a decrease in the injection amount caused by the current drop immediately after the stop of the application of the high voltage V2 can be compensated by an increase in the injection amount by extending the energization time Ti. As the battery voltage correction, instead of setting the energization time Ti as the correction target, it is also possible to set the fuel injection amount as the correction target.

According to the present embodiment described in detail above, the following excellent effects can be obtained.

In the fuel injection control, the injection amount learning value γL is calculated on condition that the fuel injection correction by the valve closing timing learning value βL which is the dynamic correction value has been executed. That is, the processing order of the fuel injection correction for the operation characteristic deviation and the calculation of the injection amount correction value for the injection amount deviation is determined in advance, the fuel injection correction for the operation characteristic deviation is executed first, and calculation of the injection amount correction value is executed in a state where the correction is executed. Thus, it is possible to assign the optimum correction method according to the error factor, and it is possible to avoid inconvenience that the correction of the amount of the dynamic error is performed substantially doubly, that is, overcorrection of the fuel injection amount. Consequently, correction of the fuel injection amount can be appropriately executed.

If the execution order of the valve opening energy correction and the valve closing timing correction is wrong, there is a concern that the dynamic correction is excessively executed. That is, for example, the valve closing timing of the valve body accompanying end of energization is affected by not only the valve closing behavior of the valve body 34 but also the valve opening behavior due to the valve opening energy. Thus, when the valve opening energy correction is executed under the situation where the valve closing timing correction is executed first, the valve opening energy correction is substantially executed doubly, and excessive correction is performed or it takes time for the correction to converge.

In this regard, the valve closing timing learning value βL (valve closing behavior correction value) is calculated on the basis of the valve closing parameter on condition that the valve opening energy correction by the valve opening energy correction value α is performed. That is, the valve closing behavior is matched after matching the valve opening behavior such as the valve opening timing and the valve opening speed of the valve body 34. Thus, it is possible to suppress inconvenience that excessive correction is performed or it takes time for the correction to converge regarding the correction of the valve operating characteristic.

The valve closing timing learning value βL, which is a valve closing behavior correction value, is calculated as a correction value for correcting the energization time Ti, and the injection amount learning value γL is calculated as a correction value for correcting the required injection amount. According to this configuration, the injection amount learning value γL is calculated under the situation where the energization time Ti is corrected by the valve closing timing learning value L. Thus, while appropriately performing an energization command to the fuel injection valve 30, the fuel can be injected and supplied as desired to the engine 11 on the basis of the energization command.

In the partial lift learning processing and the full lift learning processing, when the valve closing timing learning value βL is first calculated in any one of the plurality of learning regions, the valve closing timing learning value βL is reflected as the valve closing timing learning value βL of another region in the plurality of learning regions. Thus, when the correction by the valve closing timing learning value βL is to be executed at the time of the fuel injection, the correction by the valve closing timing learning value βL can be promptly started even in the region where the calculation of the valve closing timing learning value βL is not completed among the plurality of learning regions. In this case, if the valve closing timing learning value βL is calculated in at least one learning region in the plurality of learning regions, a tendency of variation in the individual difference in the fuel injection valve 30 can be grasped, and thus the fuel injection control can be performed in consideration of the tendency of the variation.

When the valve closing timing learning value βL is reflected as the valve closing timing learning value βL of another learning region, the calculation of the injection amount learning value γL is permitted even if the valve closing timing learning value βL is not calculated in the another learning region. In the above configuration, if the calculation of the valve closing timing learning value βL is completed in at least one learning region, restriction of the execution order of the valve closing timing correction by the valve closing timing learning value βL and the calculation of the injection amount learning value γL is released. Thus, it is possible to execute highly accurate fuel injection control at an early stage.

The deviation in the dynamic characteristics occurs when the valve body 34 performs lift operation between the zero lift position and the full lift position, and the partial lift injection and the full lift injection have different operation ranges of the valve body 34. Thus, the deviation amount of the dynamic characteristics is different. In particular, it is conceivable that the deviation amount of the valve closing behavior in the dynamic characteristics is different between the partial lift injection and the full lift injection. When the valve closing timing learning value βL calculated by the partial lift injection is used in the full lift injection, there is a possibility that erroneous correction is performed. In this regard, a configuration is provided such that acquisition of the valve closing parameter and calculation of the valve closing timing learning value βL are individually executed in the partial lift region and the full lift region. Thus, it is possible to calculate the valve closing timing learning value βL with high accuracy according to the fuel injection each time.

In the fuel injection valve 30, when the variation in the valve opening energy and the variation in the valve closing behavior are compared, it is conceivable that the variation in the valve opening energy (valve opening speed variation and the like) is unlikely to be different between the partial lift injection and the full lift injection, whereas the variation in the valve closing behavior (valve closing timing variation and the like) is likely to be different between the partial lift injection and the full lift injection. On the other hand, in the configuration in which the valve closing timing learning value βL is calculated on the basis of the valve closing parameter on condition that the valve opening energy correction is performed by the valve opening energy correction value a, a non-execution period of the valve closing behavior correction is extended unless the valve opening energy correction is completed early.

In this regard, since the valve opening energy correction value a is calculated without distinguishing between the partial lift injection and the full lift injection, and the valve closing timing learning value βL is calculated by distinguishing between the partial lift injection and the full lift injection, it is possible to suppress inconvenience that the non-execution period of the valve closing behavior correction is extended while achieving highly accurate correction in each of the partial lift injection and the full lift injection.

In the partial lift injection, it is conceivable that misfire or the like easily occurs due to the injection amount variation. Thus, in a situation in which the valve closing timing learning value βL is not calculated, that is, in a situation in which the correction by the valve closing timing learning value βL is not executed, the concern of occurrence of misfire or the like increases. In this regard, execution of the partial lift injection is rejected if the valve closing timing learning value βL is yet to be calculated, and execution of the partial lift injection is permitted after the valve closing timing learning value βL is calculated, so that occurrence of misfire and the like can be suppressed.

A configuration is provided such that, when the valve closing timing learning value βL of the partial lift injection is not calculated and the execution of the partial lift injection is rejected, the energization time Ti of the partial lift injection at this time is forcibly extended, and the fuel injection in the fuel injection valve 30 is executed by the extended energization time Ti. Alternatively, a configuration is provided such that, when the valve closing timing learning value βL of the partial lift injection is not calculated and the execution of the partial lift injection is rejected, the energization time Ti of the fuel injection at this time is forcibly extended by adding the energization times Ti of the injection divided into a plurality of parts. Thus, it is possible to suitably perform combustion in the combustion cylinder at this time while suppressing occurrence of misfire and the like.

In the configuration in which the calculation of the injection amount learning value γL is executed on condition that the valve closing timing correction by the valve closing timing learning value βL has been executed, that is, in the configuration in which the execution order of the valve closing timing correction by the valve closing timing learning value βL and the calculation of the injection amount learning value γL is defined, the non-execution period of the correction by the injection amount learning value γL is extended unless the valve closing timing correction (particularly, the valve closing timing correction of the partial lift injection) is completed. In this regard, when the valve closing timing learning value βL in the partial lift injection is not calculated, the required injection amount is forcibly divided, and the fuel injection (forced division injection) corresponding to the partial lift injection is executed by the injection amount of at least one injection. Thus, it is possible to suppress inconvenience that the non-execution period of the correction by the injection amount learning value γL is extended.

In the above configuration, instead of executing the partial lift injection by performing reduction correction of the required injection amount, one injection corresponding to the required injection amount is divided into a plurality of parts and the partial lift injection is achieved by the divided injection, and thus it is possible to minimize the influence on the combustion state in the cylinder.

In the forced division injection, the injection amount of the divided injection corresponding to the partial lift injection is set on the basis of at least one of the fuel temperature or the fuel pressure. Thus, the divided injection can be appropriately executed, and the valve closing timing learning value βL can be calculated with high accuracy.

In the boundary region that is the boundary between the partial lift region and the full lift region, it is conceivable that the injection amount deviation occurs due to a factor different from the partial lift region and the full lift region. That is, for example, since the disturbance of the injection amount due to the valve body 34 reaching the full lift position occurs, the injection amount with respect to the energization time Ti varies.

In this regard, the injection amount characteristic of the partial lift region corrected by the valve closing timing learning value βL and the injection amount characteristic of the full lift region corrected by the valve closing timing learning value βL are used, and the injection amount characteristic for compensating for the injection amount deviation with respect to the energization time Ti of the fuel injection valve 30 is calculated in the boundary region. Specifically, the characteristic point data (the Ti value and the Q value of the characteristic points Pq1 and Pq2) of the boundary region is calculated by learning. In this case, in a state where the injection amount deviation in the partial lift region and the injection amount deviation in the full lift region are corrected, the injection amount deviation in the boundary region can be appropriately grasped, and the injection amount deviation can be appropriately corrected. Thus, the injection amount deviation can be suppressed in the entire region from the partial lift region to the full lift region, and accuracy of the fuel injection control can be further improved.

The injection amount learning value γL for compensating for the deviation in the injection amount with respect to the energization pulse occurs due to a static error such as a variation in the lift amount in the valve body full lift state or a variation in the injection hole diameter, and the static error can be remarkably grasped as the fuel injection amount is larger, in other words, as the energization time of the fuel injection valve 30 is longer. More specifically, in the vicinity of the boundary with the partial lift region in the full lift region, the injection period in the valve body full lift state is short, and even if a static error factor (variation in lift amount or variation in injection hole diameter) occurs, the degree of the amount of the error to be reflected on the actual injection amount becomes relatively small. On the other hand, when the injection period in the valve body full lift state becomes long, the degree of the amount of the error due to the static error factor to be reflected on the actual injection amount becomes large. In this regard, since the injection amount learning value γL is calculated on condition that it is a fuel injection in a predetermined high flow rate region in the full lift region, calculation accuracy of the injection amount learning value γL can be enhanced.

A configuration is provided such that the valve closing timing learning value βL and the injection amount learning value γL are divided into a plurality of learning regions divided by at least one of the fuel temperature or the fuel pressure, and stored in the backup memory 53 as learning values. In this case, even if the injection amount variation occurs due to an individual difference or a temporal factor in the fuel injection valve 30 or a drive unit thereof, appropriate correction for compensating the injection amount variation can be achieved.

A configuration is provided such that, as the learning execution condition, it is determined that the fuel injection system is normal and the engine operating state is in an assumed state determined in advance, and various kinds of learning and the like are executed when the condition is satisfied. As a result, erroneous learning can be suppressed.

A configuration is provided such that, at the time of calculation of the valve opening energy correction value a or at the time of calculation of the valve closing timing learning value βL, it is determined whether or not calculated values and parameters used for the calculation are normal values, and the calculation of the valve opening energy correction value a or the valve closing timing learning value βL is allowed when the normal determination is made. Thus, it is possible to suppress a malfunction of a learning control logic.

Other Embodiments

The above embodiment may be modified as follows, for example.

In the above embodiment, the configuration is such that in the partial lift learning processing and the full lift learning processing, when the valve closing timing learning value βL as the initial learning value is calculated, one valve closing timing learning value βL is reflected in all the learning regions (see FIGS. 17 and 20), but this may be changed. For example, the configuration may be such that one valve closing timing learning value βL is reflected only in a neighboring region including the learning region at the current time point in the entire region.

In the above embodiment, the boundary region learning processing for compensating for a characteristic variation in the fuel injection in the boundary region between the partial lift region and the full lift region is executed, but the configuration may be such that the boundary region learning processing is not executed.

The above embodiment is configured such that
(1) processing of executing calculation of the injection amount learning value γL on condition that the fuel injection correction by the valve closing timing learning value βL which is a dynamic correction value is executed in the fuel injection control, and
(2) processing of calculating the valve closing timing learning value βL on the basis of the valve closing parameter on condition that the valve opening energy correction by the valve opening energy correction value a is performed, are executed together, but the configuration may be changed so that only (1) out of above (1) and (2) is executed.

The configuration may be such that, as the processing of compensating for the deviation in the injection amount characteristic when the battery voltage decreases, the microcomputer 51 executes the following boosting pickup processing. (a) of FIG. 49 illustrates a transition of each parameter in a case where the boosting pickup processing is not executed when the battery voltage decreases, and (b) of FIG. 49 illustrates a transition of each parameter in a case where the boosting pickup processing is executed when the battery voltage decreases.

Figure 49:
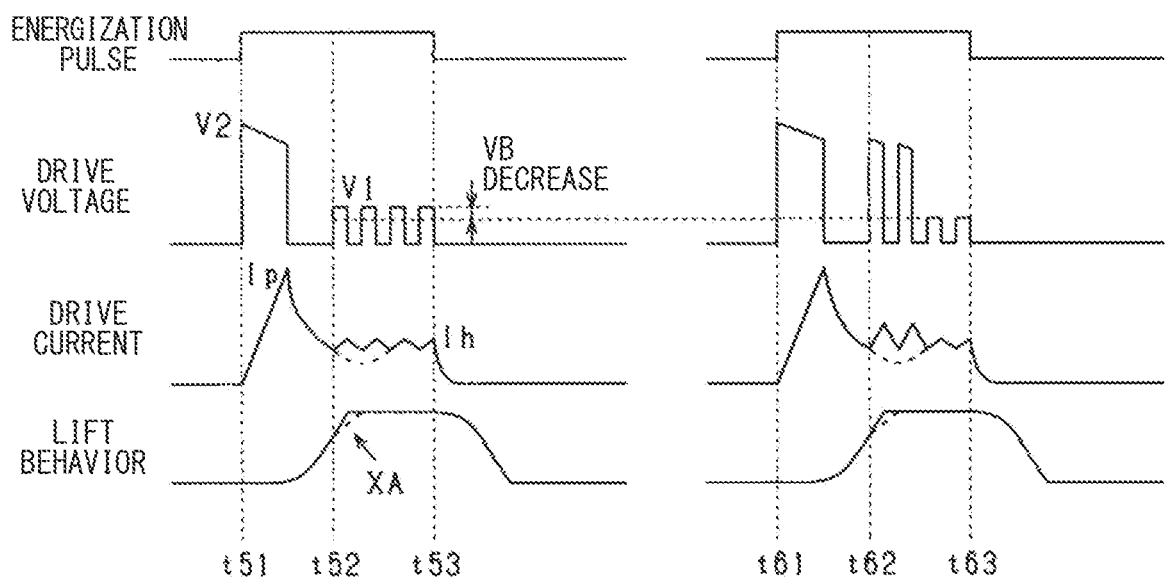
FIG. 49 is a time chart for describing boosting pickup processing when the battery voltage decreases.

As illustrated in (a) of FIG. 49, at timing t51, the high voltage V2 is applied to the fuel injection valve 30 accompanying the rise of the energization pulse, and the drive current flows accordingly. After timing t52 after the drive current reaches the peak current Ip, the hold current Ih flows by intermittent application of the low voltage V1 (battery voltage), and the energization pulse is lowered at timing t53. At this time, when the battery voltage VB decreases, the drive current drops as indicated by a broken line in the drawing. Specifically, the drop of the hold current Ih occurs by a change in inductance due to the lift behavior of the fuel injection valve 30. Accordingly, the injection amount decreases (see XA in the drawing).

On the other hand, when the boosting pickup processing is executed, the high voltage V2 is applied to the fuel injection valve 30 accompanying the rise of the energization pulse at timing t61, and the boosting voltage obtained by boosting the battery voltage is intermittently applied after timing t62 after the drive current reaches the peak current Ip. Thus, the drop of the hold current Ih is avoided, and then the energization pulse is lowered at timing t63. Therefore, a decrease in the injection amount due to a decrease in the battery voltage is suppressed.

The boosting pickup processing is preferably executed in the following manner. For example, as illustrated in (b) of FIG. 49, intermittent application of the boosting voltage obtained by boosting the battery voltage and intermittent application of the non-boosting battery voltage are executed in a period until the energization pulse is lowered after the stop of application of the high voltage V2. At this time, after the valve body 34 reaches the full lift position, the state of application of the boosting voltage is preferably switched to the state of application of the battery voltage. Alternatively, the configuration may be such that only the intermittent application of the boosting voltage is executed in a period until the energization pulse is lowered after the stop of the application of the high voltage V2. Further, the configuration may be such that the boosting voltage is switched in multiple stages. In this case, the boosting voltage is preferably changed to the low voltage side as the energization time elapses. The configuration may be such that, as control of the hold current Ih, the lower limit value of the drive current in the current holding period is set to one stage or multiple stages.

The microcomputer 51 may execute the boosting pickup processing on condition that the battery voltage decreases to be lower than a predetermined value, or may always execute the boosting pickup processing regardless of whether there is a decrease in the battery voltage. When the boosting pickup processing is always executed, boosting of the battery voltage (boosting pickup) is preferably executed according to occurrence of drop of the hold current Ih while monitoring drop of the hold current Ih after the stop of the application of the high voltage V2.

In the above configuration, the valve closing timing learning value βL and the injection amount learning value γL are stored in the backup memory 53, but this may be changed. For example, the configuration may be such that the valve closing timing correction value β and the injection amount correction value γ is calculated every trip, that is, after the IG switch is turned on, and stored in the RAM area.

As the fuel injection valve 30, a core boost type fuel injection valve can also be used. Since the core boost type fuel injection valve is known, a configuration thereof will be briefly described here. A core boost type fuel injection valve includes a movable core that is attracted to a fixed core in accordance with energization, and a valve body (needle) that is engaged with the movable core to perform a valve opening operation after the movable core moves by a predetermined amount. In the non-energized state (valve closed state), the movable core and the valve body are separated (not engaged) from each other in the axial direction, and after energization, the movable core is engaged with the valve body to lift the valve body to the valve opening side. That is, when the movable core starts to move and moves by a predetermined distance, the movable core is engaged with the valve body to start the valve opening operation of the valve body.

The control unit and the control method described in the present disclosure may be realized by a dedicated computer provided by constructing a processor and a memory programmed to execute one or plural functions embodied by a computer program. Alternatively, the control unit and the control method described in the present disclosure may be realized by a dedicated computer provided by constructing a processor by one or more dedicated hardware logic circuits. The control unit and the control method described in the present disclosure may be realized by one or more dedicated computers constructed by combination of a processor and a memory programed to execute one or plural functions and a processor configured by one or more hardware logic circuits. A computer program may be stored, as an instruction to be executed by a computer, in a computer-readable non-transitory tangible recording medium.

What is claimed is:

1. A fuel injection control device that is applied to an internal combustion engine including a fuel injection valve and causes a valve body to be in a valve open state accompanying an energization of the fuel injection valve to inject fuel, and an injection amount parameter indicating an injection amount in response to an energization command signal in the fuel injection valve and a dynamic parameter indicating characteristics of a valve opening operation and a valve closing operation of the valve body accompanying a start of the energization and an end of the energization in response to the energization command signal being defined as parameters indicating an injection amount characteristic of the fuel injection valve, the fuel injection control device comprising:

a first acquisition unit configured to acquire the dynamic parameter when the fuel injection valve injects the fuel;

a second acquisition unit configured to acquire the injection amount parameter when the fuel injection valve injects the fuel;

a first calculation unit configured to calculate, based on the dynamic parameter, a dynamic correction value that compensates for a deviation in an operation characteristic of the valve body;

a second calculation unit configured to calculate, based on the injection amount parameter, an injection amount correction value that compensates for a deviation in the injection amount in response to the energization command signal; and a correction unit configured to correct a fuel injection using the dynamic correction value calculated by the first calculation unit and the injection amount correction value calculated by the second calculation unit, wherein the second calculation unit calculates the injection amount correction value on condition that the correction unit corrects the fuel injection using the dynamic correction value.

2. The fuel injection control device according to claim 1, wherein the dynamic parameter includes a valve opening parameter indicating valve opening energy input when the valve body is opened accompanying the start of the energization to the fuel injection valve, and a valve closing parameter indicating a valve closing behavior of the valve body after the end of the energization to the fuel injection valve, the first acquisition unit acquires the valve opening parameter and the valve closing parameter as the dynamic parameter, the first calculation unit calculates, as the dynamic correction value, a valve opening energy correction value for correcting the valve opening energy based on the valve opening parameter, and calculates, as the dynamic correction value, a valve closing behavior correction value for correcting the valve closing behavior of the valve body based on the valve closing parameter on condition that the valve opening energy is corrected based on the valve opening energy correction value, and the second calculation unit calculates the injection amount correction value on condition that the valve closing behavior is corrected based on the valve closing behavior correction value.

3. The fuel injection control device according to claim 2, wherein the fuel injection control device is configured to set a required injection amount based on an operating state of the internal combustion engine, convert the required injection amount into an energization time that is a time for energizing the fuel injection valve, and drive the fuel injection valve based on the energization time to control the fuel injection, the first calculation unit calculates the valve closing behavior correction value as a correction value for correcting the energization time, and the second calculation unit calculates the injection amount correction value as a correction value for correcting the required injection amount.

4. The fuel injection control device according to claim 2, wherein the first calculation unit calculates the valve closing behavior correction value for each of a plurality of regions divided by at least one of a temperature or a pressure of the fuel supplied to the fuel injection valve, and when the valve closing behavior correction value is first calculated in one of the plurality of regions, the first calculation unit reflects the valve closing behavior correction value of the one of the plurality of regions as the valve closing behavior correction value for each of the plurality of regions other than the one of the plurality of regions.

5. The fuel injection control device according to claim 4, wherein when the first calculation unit reflects the valve closing behavior correction value of the one of the plurality of regions as the valve closing behavior correction value for each of the plurality of regions other than the one of the plurality of regions, the second calculation unit permits calculating the injection amount correction value even when the valve closing behavior correction value is not calculated based on the valve closing parameter in the plurality of regions other than the one of the plurality of regions.

6. The fuel injection control device according to claim 2, wherein the fuel injection control device is configured to execute a partial lift injection in which the fuel injection valve is driven to open at an energization time when the valve body is yet to reach a full lift position and a full lift injection in which the fuel injection valve is driven to open at an energization time when the valve body reaches the full lift position, the first calculation unit calculates the valve closing behavior correction value for the partial lift injection based on the valve closing parameter acquired when the partial lift injection is executed, and calculates the valve closing behavior correction value for the full lift injection based on the valve closing parameter acquired when the full lift injection is executed.

7. The fuel injection control device according to claim 6, wherein the first calculation unit calculates the valve opening energy correction value without distinguishing between the partial lift injection and the full lift injection, and calculates the valve closing behavior correction value by distinguishing between the partial lift injection and the full lift injection.

8. The fuel injection control device according to claim 6, further comprising a partial lift injection permission unit configured not to permit executing the partial lift injection when the valve closing behavior correction value is yet to be calculated, and configured to permit executing the partial lift injection after the valve closing behavior correction value is calculated.

9. The fuel injection control device according to claim 6, further comprising:

a setting unit configured to set a required injection amount based on an operating state of the internal combustion engine; and an injection division unit configured to divide the required injection amount set by the setting unit when the valve closing behavior correction value in the partial lift injection is yet to be calculated, and injects the fuel corresponding to the partial lift injection based on at least one injection amount into which the required injection amount is divided.

10. The fuel injection control device according to claim 9, wherein the injection division unit sets an injection amount of divided injection corresponding to the partial lift injection based on at least one of a temperature or a pressure of the fuel supplied to the fuel injection valve.

11. The fuel injection control device according to claim 6, wherein a boundary region serving as a boundary between a partial lift region in which the partial lift injection is executed and a full lift region in which the full lift injection is executed is determined, and the fuel injection control device further comprising a third calculation unit configured to calculate the injection amount characteristic for compensating for an injection amount deviation with respect to an energization time of the fuel injection valve in the boundary region by using an injection amount characteristic of the partial lift region corrected by the valve closing behavior correction value and an injection amount characteristic of the full lift region corrected by the valve closing behavior correction value.

12. The fuel injection control device according to claim 6, wherein the second calculation unit calculates the injection amount correction value on condition that the fuel is injected in a predetermined high flow rate region in a full lift region where the full lift injection is executed.

13. The fuel injection control device according to claim 2, wherein the first calculation unit calculates the valve closing behavior correction value for each of a plurality of regions divided by at least one of a temperature or a pressure of fuel supplied to the fuel injection valve, and stores, as a learning value, the valve closing behavior correction value in a memory for backup, and the second calculation unit calculates the injection amount correction value for each of the plurality of regions, and stores, as a learning value, the injection amount correction value in the memory.

14. A fuel injection control device that is applied to an internal combustion engine including a fuel injection valve and causes a valve body to be in a valve open state accompanying an energization of the fuel injection valve to inject fuel, the fuel injection control device comprising a processor configured to:

acquire a dynamic parameter, as a parameter indicating an injection amount characteristic of the fuel injection valve, when the fuel injection valve injects the fuel, the dynamic parameter indicating characteristics of a valve opening operation and a valve closing operation of the valve body accompanying a start of the energization and an end of the energization in response to an energization command signal;

acquire an injection amount parameter, as the parameter indicating the injection amount characteristic of the fuel injection valve, when the fuel injection valve injects the fuel, the injection amount parameter indicating an injection amount in response to the energization command signal in the fuel injection valve;

calculate, based on the dynamic parameter, a dynamic correction value that compensates for a deviation in an operation characteristic of the valve body;

calculate, based on the injection amount parameter, an injection amount correction value that compensates for a deviation in the injection amount in response to the energization command signal; and correct a fuel injection using the dynamic correction value and the injection amount correction value, wherein the processor calculates the injection amount correction value on condition that the processor corrects the fuel injection using the dynamic correction value.

* * * * *